US011416084B2

(12) United States Patent
Banning

(10) Patent No.: US 11,416,084 B2
(45) Date of Patent: Aug. 16, 2022

(54) MULTI-SENSOR DEVICE WITH AN ACCELEROMETER FOR ENABLING USER INTERACTION THROUGH SOUND OR IMAGE

(71) Applicant: UltimatePointer, L.L.C., Houston, TX (US)

(72) Inventor: Erik Jan Banning, Houston, TX (US)

(73) Assignee: UltimatePointer, L.L.C., Houston, TX (US)

( * ) Notice: Subject to any disclaimer, the term of this patent is extended or adjusted under 35 U.S.C. 154(b) by 0 days.

(21) Appl. No.: 17/355,580

(22) Filed: Jun. 23, 2021

(65) Prior Publication Data
US 2021/0318760 A1  Oct. 14, 2021

Related U.S. Application Data

(63) Continuation of application No. 16/812,339, filed on Mar. 8, 2020, now Pat. No. 11,073,919, which is a
(Continued)

(51) Int. Cl.
*G06F 3/0346* (2013.01)
*G06F 3/033* (2013.01)
(Continued)

(52) U.S. Cl.
CPC ........... *G06F 3/0346* (2013.01); *G03B 21/00* (2013.01); *G03B 21/006* (2013.01); *G06F 3/005* (2013.01);
(Continued)

(58) Field of Classification Search
CPC ........ G06F 3/0346; G06F 3/005; G06F 3/012; G06F 3/033; G06F 3/0338; G06F 3/03549; G06F 3/038; G03B 21/00; G03B 21/006
See application file for complete search history.

(56) References Cited

U.S. PATENT DOCUMENTS 3,983,474 A  9/1976 Kuipers
4,054,881 A  10/1977 Raab
(Continued)

FOREIGN PATENT DOCUMENTS

GB  2324150 A  10/1998
JP  S58-163039 A  9/1983
(Continued)

OTHER PUBLICATIONS

Ramesh Raskar, Jeroen van Baar, Paul Beardsley, Thomas Willwacher, Srinivas Rao, Clifton Forlines; "iLamps: Geometrically Aware and Self-Configuring Projectors"; ACM Transactions on Graphics—Proceedings of Siggraph 2003; Jul. 2003.
(Continued)

*Primary Examiner* — Vijay Shankar
(74) *Attorney, Agent, or Firm* — Jason H. Vick; Sheridan Ross, PC

(57) ABSTRACT

A method for controlling movement of a computer display cursor based on a point-of-aim of a pointing device within an interaction region includes projecting an image of a computer display to create the interaction region. At least one calibration point having a predetermined relation to the interaction region is established. A pointing line is directed to substantially pass through the calibration point while measuring a position of and an orientation of the pointing device. The pointing line has a predetermined relationship to the pointing device. Movement of the cursor is controlled within the interaction region using measurements of the position of and the orientation of the pointing device.

18 Claims, 21 Drawing Sheets

Related U.S. Application Data continuation of application No. 16/582,508, filed on Sep. 25, 2019, now Pat. No. 10,698,502, which is a continuation of application No. 16/395,802, filed on Apr. 26, 2019, now Pat. No. 10,459,535, which is a continuation of application No. 15/696,452, filed on Sep. 6, 2017, now Pat. No. 10,318,019, which is a continuation of application No. 15/098,099, filed on Apr. 13, 2016, now Pat. No. 9,785,255, which is a continuation of application No. 14/712,788, filed on May 14, 2015, now Pat. No. 9,411,437, which is a continuation of application No. 14/463,405, filed on Aug. 19, 2014, now Pat. No. 9,063,586, which is a continuation of application No. 14/175,960, filed on Feb. 7, 2014, now Pat. No. 8,866,742, which is a continuation of application No. 13/239,140, filed on Sep. 21, 2011, now Pat. No. 8,723,803, which is a continuation of application No. 12/782,980, filed on May 19, 2010, now Pat. No. 8,049,729, which is a continuation of application No. 11/135,911, filed on May 24, 2005, now Pat. No. 7,746,321.

(60) Provisional application No. 60/644,649, filed on Jan. 18, 2005, provisional application No. 60/575,671, filed on May 28, 2004.

(51) Int. Cl.
   *G06F 3/0338* (2013.01)
   *G03B 21/00* (2006.01)
   *G06F 3/0354* (2013.01)
   *G06F 3/00* (2006.01)
   *G06F 3/01* (2006.01)
   *G06F 3/038* (2013.01)

(52) U.S. Cl.
   CPC .............. *G06F 3/012* (2013.01); *G06F 3/033* (2013.01); *G06F 3/038* (2013.01); *G06F 3/0338* (2013.01); *G06F 3/03549* (2013.01)

(56) References Cited

U.S. PATENT DOCUMENTS

| | | |
|---|---|---|
| 4,099,719 A | 7/1978 | Dean et al. |
| 4,298,874 A | 11/1981 | Kuipers |
| 4,314,251 A | 2/1982 | Raab |
| 4,328,548 A | 5/1982 | Crow et al. |
| 4,346,384 A | 8/1982 | Raab |
| 4,349,815 A | 9/1982 | Spooner |
| 4,395,045 A | 7/1983 | Baer |
| 4,521,772 A | 6/1985 | Lyon |
| 4,550,250 A | 10/1985 | Mueller et al. |
| 4,562,433 A | 12/1985 | Biferno |
| 4,565,999 A | 1/1986 | King |
| 4,567,479 A | 1/1986 | Boyd |
| 4,613,866 A | 9/1986 | Blood |
| 4,619,616 A | 10/1986 | Clarke |
| 4,641,255 A | 2/1987 | Hohmann |
| 4,654,648 A | 3/1987 | Herrington |
| 4,682,159 A | 7/1987 | Davison |
| 4,682,195 A | 7/1987 | Yilmaz |
| 4,688,037 A | 8/1987 | Krieg |
| 4,719,455 A | 1/1988 | Louis |
| 4,730,186 A | 3/1988 | Koga |
| 4,737,794 A | 4/1988 | Jones |
| 4,742,356 A | 5/1988 | Kuipers |
| 4,745,402 A | 5/1988 | Auerbach |
| 4,768,028 A | 8/1988 | Blackie |
| 4,787,051 A | 11/1988 | Olson |
| 4,796,019 A | 1/1989 | Auerbach |
| 4,823,170 A | 4/1989 | Hansen |
| 4,832,170 A | 5/1989 | Takeuchi et al. |
| 4,833,785 A | 5/1989 | Parent et al. |
| 4,839,838 A | 6/1989 | LaBiche et al. |
| 4,959,721 A | 9/1990 | Micic |
| 5,009,501 A | 4/1991 | Fenner |
| 5,023,943 A | 6/1991 | Heberle |
| 5,045,843 A | 9/1991 | Hansen |
| 5,047,754 A | 9/1991 | Akatsuka |
| 5,095,302 A | 3/1992 | McLean |
| 5,117,375 A | 5/1992 | Worcester et al. |
| 5,179,656 A | 1/1993 | Lisle |
| 5,181,181 A | 1/1993 | Glynn |
| 5,231,674 A | 7/1993 | Cleveland |
| 5,235,363 A | 8/1993 | Vogeley |
| 5,262,777 A | 11/1993 | Low |
| 5,274,363 A | 12/1993 | Koved |
| 5,296,838 A | 3/1994 | Suzuki |
| 5,307,072 A | 4/1994 | Jones, Jr. |
| 5,327,528 A | 7/1994 | Hidaka et al. |
| 5,339,095 A | 8/1994 | Redford |
| 5,349,460 A | 9/1994 | Ogasahara et al. |
| 5,349,529 A | 9/1994 | Masumoto et al. |
| 5,351,969 A | 10/1994 | Smith, III et al. |
| 5,355,148 A | 10/1994 | Andeson |
| 5,359,348 A | 10/1994 | Pilcher |
| 5,363,120 A | 11/1994 | Drumm |
| 5,365,461 A | 11/1994 | Stein et al. |
| 5,367,315 A | 11/1994 | Pan |
| 5,388,199 A | 2/1995 | Kakazu et al. |
| 5,394,360 A | 2/1995 | Fukumoto |
| 5,416,535 A | 5/1995 | Sato |
| 5,436,616 A | 7/1995 | Futatsugi et al. |
| 5,440,326 A | 8/1995 | Quinn |
| 5,448,261 A | 9/1995 | Koike |
| 5,448,263 A | 9/1995 | Martin |
| 5,453,686 A | 9/1995 | Anderson |
| D364,610 S | 11/1995 | Sanchez et al. |
| 5,469,193 A | 11/1995 | Giobbi |
| 5,484,966 A | 1/1996 | Segen |
| 5,488,392 A | 1/1996 | Harris |
| 5,502,459 A | 3/1996 | Marshall |
| 5,506,605 A | 4/1996 | Paley |
| 5,508,719 A | 4/1996 | Gervais |
| 5,515,079 A | 5/1996 | Hauck |
| 5,530,456 A | 6/1996 | Kokubo |
| 5,552,705 A | 9/1996 | Keller |
| 5,564,005 A | 10/1996 | Weber et al. |
| 5,574,479 A | 11/1996 | Odell |
| 5,598,187 A | 1/1997 | Ide et al. |
| 5,602,568 A | 2/1997 | Kim |
| 5,602,569 A | 2/1997 | Kato |
| 5,606,124 A | 2/1997 | Doyle et al. |
| 5,627,565 A | 5/1997 | Morishita et al. |
| 5,629,500 A | 5/1997 | Fukuzaki et al. |
| 5,631,669 A | 5/1997 | Stobbs |
| 5,638,092 A | 6/1997 | Eng |
| 5,646,525 A | 7/1997 | Gilboa |
| 5,654,741 A | 8/1997 | Sampsell |
| 5,664,005 A | 9/1997 | Emery et al. |
| 5,668,574 A | 9/1997 | Jarlance-Huang |
| 5,691,747 A | 11/1997 | Amano |
| 5,703,623 A | 12/1997 | Hall et al. |
| 5,712,658 A | 1/1998 | Arita et al. |
| 5,724,264 A | 3/1998 | Rosenberg et al. |
| 5,734,371 A | 3/1998 | Kaplan |
| 5,760,397 A | 6/1998 | Huguenin et al. |
| 5,760,766 A | 6/1998 | Auber et al. |
| 5,767,669 A | 6/1998 | Hansen et al. |
| 5,774,063 A | 6/1998 | Berry et al. |
| 5,790,076 A | 8/1998 | Sypniewski |
| 5,791,351 A | 8/1998 | Curchod |
| 5,793,354 A | 8/1998 | Kaplan |
| 5,796,386 A | 8/1998 | Lipscomb |
| 5,819,260 A | 10/1998 | Lu et al. |
| 5,835,078 A | 11/1998 | Arita |
| 5,850,304 A | 12/1998 | Elmers et al. |
| 5,851,183 A | 12/1998 | Bucholz |
| 5,870,082 A | 2/1999 | Selker et al. |
| 5,877,748 A | 3/1999 | Redlich |
| 5,883,616 A | 3/1999 | Koizumi |

(56) References Cited

U.S. PATENT DOCUMENTS

| | | | |
|---|---|---|---|
| 5,898,421 A | 4/1999 | Quinn |
| 5,898,424 A | 4/1999 | Flannery |
| 5,898,425 A | 4/1999 | Sekine |
| 5,913,727 A | 6/1999 | Ahdoot |
| 5,914,702 A | 6/1999 | Derocher et al. |
| 5,926,168 A | 7/1999 | Fan |
| 5,929,444 A | 7/1999 | Leichner |
| 5,931,747 A | 8/1999 | Mast |
| 5,952,996 A | 9/1999 | Kim |
| 5,963,134 A | 10/1999 | Bowers |
| 5,986,644 A | 11/1999 | Herder |
| 5,999,167 A | 12/1999 | Marsh |
| 6,002,099 A | 12/1999 | Martin et al. |
| 6,012,980 A | 1/2000 | Yoshida et al. |
| 6,014,139 A | 1/2000 | Watson et al. |
| 6,020,877 A | 2/2000 | Smith |
| 6,037,943 A | 3/2000 | Crone |
| 6,067,085 A | 5/2000 | Modh |
| 6,069,594 A | 5/2000 | Barnes |
| 6,073,043 A | 6/2000 | Schneider |
| 6,075,508 A | 6/2000 | Ono et al. |
| 6,084,556 A | 7/2000 | Zwern |
| 6,094,190 A | 7/2000 | Kodim |
| 6,104,380 A | 8/2000 | Stork |
| 6,104,390 A | 8/2000 | Sturgeon |
| 6,110,039 A | 8/2000 | Oh |
| 6,130,534 A | 10/2000 | Huang et al. |
| 6,130,663 A | 10/2000 | Null |
| 6,130,664 A | 10/2000 | Suzuki |
| 6,134,506 A | 10/2000 | Rosenberg et al. |
| 6,146,278 A | 11/2000 | Kobayahsi |
| 6,171,190 B1 | 1/2001 | Thanasack |
| 6,172,354 B1 | 1/2001 | Adan et al. |
| 6,184,847 B1 | 2/2001 | Fateh |
| 6,184,863 B1 | 2/2001 | Sibert |
| 6,186,630 B1 | 2/2001 | Miyashita |
| 6,191,773 B1 | 2/2001 | Maruno et al. |
| 6,195,085 B1 | 2/2001 | Becker et al. |
| 6,212,296 B1 | 4/2001 | Stork |
| 6,271,831 B1 | 8/2001 | Escobosa |
| 6,275,214 B1 | 8/2001 | Hansen |
| 6,285,379 B1 | 9/2001 | Gallery |
| 6,292,171 B1 | 9/2001 | Fu |
| 6,297,804 B1 | 10/2001 | Kashitani |
| 6,317,118 B1 | 11/2001 | Yoneno |
| 6,326,979 B1 | 12/2001 | Radeztsky |
| 6,335,723 B1 | 1/2002 | Wood |
| 6,342,878 B1 | 1/2002 | Chevassus |
| 6,346,933 B1 | 2/2002 | Lin |
| 6,353,434 B1 | 3/2002 | Akebi et al. |
| 6,373,961 B1 | 4/2002 | Richardson |
| 6,385,331 B2 | 5/2002 | Harakawa |
| 6,388,656 B1 | 5/2002 | Chae |
| 6,400,139 B1 | 6/2002 | Khalfin |
| 6,404,416 B1 | 6/2002 | Kahn |
| 6,411,277 B1 | 6/2002 | Shah-Nazaroff |
| 6,417,840 B1 | 7/2002 | Daniels |
| 6,424,340 B1 | 7/2002 | Holtzman |
| 6,426,741 B1 | 7/2002 | Goldsmith et al. |
| 6,452,606 B1 | 9/2002 | Luzzatto |
| 6,456,567 B1 | 9/2002 | Blevins et al. |
| 6,466,198 B1 | 10/2002 | Feinstein |
| 6,466,232 B1 | 10/2002 | Newell |
| 6,467,184 B1 | 10/2002 | Wust et al. |
| 6,469,624 B1 | 10/2002 | Whan et al. |
| 6,483,499 B1 | 11/2002 | Li |
| 6,492,981 B1 | 12/2002 | Stork |
| 6,504,526 B1 | 1/2003 | Mauritz |
| 6,507,339 B1 | 1/2003 | Tanaka |
| 6,509,888 B1 | 1/2003 | Tuovinen et al. |
| 6,509,896 B1 | 1/2003 | Saikawa |
| 6,520,647 B2 | 2/2003 | Raskar |
| 6,529,186 B1 | 3/2003 | Thayer |
| 6,531,999 B1 | 3/2003 | Trajkovic |
| 6,545,661 B1 | 4/2003 | Goschy |
| 6,545,664 B1 | 4/2003 | Kim |
| 6,558,002 B1 | 5/2003 | Miyashita |
| 6,559,833 B2 | 5/2003 | Rowe |
| 6,567,071 B1 | 5/2003 | Curran |
| 6,569,094 B2 | 5/2003 | Suzuki |
| 6,592,461 B1 | 7/2003 | Raviv et al. |
| 6,600,478 B2 | 7/2003 | White |
| 6,606,083 B1 | 8/2003 | Murray |
| 6,608,668 B2 | 8/2003 | Gharib |
| 6,608,688 B1 | 8/2003 | Faul et al. |
| 6,618,076 B1 | 9/2003 | Sukthankar |
| 6,642,918 B2 | 11/2003 | Uchida |
| 6,704,000 B2 | 3/2004 | Carpenter |
| 6,712,692 B2 | 3/2004 | Basson |
| 6,727,877 B2 | 4/2004 | Itakura |
| 6,727,885 B1 | 4/2004 | Ishino et al. |
| 6,750,848 B1 | 6/2004 | Pryor |
| 6,757,068 B2 | 6/2004 | Foxlin |
| 6,764,185 B1 | 7/2004 | Beardsley et al. |
| 6,766,066 B2 | 7/2004 | Kitazawa |
| 6,774,869 B2* | 8/2004 | Biocca ............... G02B 27/0172 345/8 |
| 6,784,660 B2 | 8/2004 | Ashe |
| 6,788,289 B2 | 9/2004 | Kitazawa |
| 6,795,068 B1 | 9/2004 | Marks |
| 6,809,726 B2 | 10/2004 | Kavanagh |
| 6,847,356 B1 | 1/2005 | Hasegawa |
| 6,852,032 B2 | 2/2005 | Ishino |
| 6,877,863 B2 | 4/2005 | Wood |
| 6,952,198 B2 | 10/2005 | Hansen |
| 6,982,699 B1 | 1/2006 | Lenssen et al. |
| 7,031,875 B2 | 4/2006 | Ellenby et al. |
| 7,035,897 B1 | 4/2006 | Devereaux |
| 7,075,514 B2 | 7/2006 | Tanaka |
| 7,081,051 B2 | 7/2006 | Himoto et al. |
| 7,091,949 B2 | 8/2006 | Hansen |
| 7,102,616 B1 | 9/2006 | Sleator |
| 7,145,551 B1 | 12/2006 | Bathiche et al. |
| 7,158,117 B2 | 1/2007 | Sato et al. |
| 7,158,118 B2* | 1/2007 | Liberty ............... G06F 3/0346 |
| 7,161,578 B1 | 1/2007 | Schneider |
| 7,176,881 B2 | 2/2007 | Nishimura et al. |
| 7,176,887 B2 | 2/2007 | Marvit et al. |
| 7,176,888 B2 | 2/2007 | Marvit et al. |
| 7,223,173 B2 | 5/2007 | Masuyama et al. |
| 7,236,156 B2 | 6/2007 | Liberty et al. |
| 7,239,301 B2 | 7/2007 | Liberty et al. |
| 7,262,760 B2 | 8/2007 | Liberty |
| 7,301,648 B2 | 11/2007 | Foxlin |
| 7,367,809 B2* | 5/2008 | Takahashi ............ H04N 13/344 434/262 |
| 7,414,611 B2 | 8/2008 | Liberty |
| 7,432,879 B2 | 10/2008 | Schonlau |
| 7,489,298 B2 | 2/2009 | Liberty et al. |
| 7,489,299 B2* | 2/2009 | Liberty ................ G06F 3/017 345/163 |
| 7,535,456 B2 | 5/2009 | Liberty et al. |
| 7,559,656 B2 | 7/2009 | Yumiki et al. |
| 7,601,066 B2 | 10/2009 | Masuyama et al. |
| 7,646,372 B2 | 1/2010 | Marks et al. |
| 7,746,321 B2 | 6/2010 | Banning |
| 7,796,116 B2 | 9/2010 | Salsman et al. |
| 7,830,362 B2 | 11/2010 | Finley |
| 7,852,317 B2 | 12/2010 | Grunnet-Jepsen et al. |
| 7,859,523 B2 | 12/2010 | Kong |
| 7,907,154 B2 | 3/2011 | Ryowski et al. |
| 8,049,729 B2 | 11/2011 | Banning |
| 8,072,424 B2 | 12/2011 | Liberty |
| 8,537,231 B2 | 9/2013 | Mekenkamp et al. |
| 8,723,803 B2 | 5/2014 | Banning |
| 8,866,742 B2 | 10/2014 | Banning |
| 8,982,050 B2 | 3/2015 | Solomon |
| 9,063,586 B2 | 6/2015 | Banning |
| 9,210,376 B2 | 12/2015 | Yu |
| 9,285,897 B2 | 3/2016 | Banning |
| 9,411,437 B2 | 8/2016 | Banning |
| 9,414,125 B2 | 8/2016 | Ferren et al. |
| 9,479,721 B2 | 10/2016 | Ivanich et al. |
| 9,602,584 B2 | 3/2017 | Chen |

(56) References Cited

U.S. PATENT DOCUMENTS

| | | |
|---|---|---|
| 9,721,466 B2 | 8/2017 | Sallas et al. |
| 9,785,255 B2 | 10/2017 | Banning |
| 10,307,908 B2 | 6/2019 | Reekmans |
| 10,318,019 B2 | 6/2019 | Banning |
| 10,372,237 B2 | 8/2019 | Banning |
| 10,372,397 B2 | 8/2019 | Yu et al. |
| 10,402,693 B2 | 9/2019 | Chen |
| 10,459,535 B2 | 10/2019 | Banning |
| 10,521,778 B2 | 12/2019 | Bull |
| 10,565,599 B2 | 2/2020 | Rodkey |
| 10,698,502 B2 | 6/2020 | Banning |
| 10,878,692 B2 | 12/2020 | Sallas et al. |
| 10,939,159 B1 | 3/2021 | Fuchs et al. |
| 11,073,919 B2 | 7/2021 | Banning |
| 11,244,561 B1 | 2/2022 | Fuchs et al. |
| 2001/0010514 A1 | 8/2001 | Ishino |
| 2001/0043719 A1 | 11/2001 | Harakawa |
| 2001/0045940 A1 | 11/2001 | Hansen |
| 2001/0046896 A1 | 11/2001 | Miyamoto et al. |
| 2002/0024675 A1 | 2/2002 | Foxlin |
| 2002/0027548 A1 | 3/2002 | Yoneno |
| 2002/0042699 A1 | 4/2002 | Tanaka |
| 2002/0057275 A1 | 5/2002 | Parikh et al. |
| 2002/0067350 A1 | 6/2002 | Ben Ayed |
| 2002/0075386 A1 | 6/2002 | Tanaka |
| 2002/0079143 A1 | 6/2002 | Silverstein |
| 2002/0080094 A1* | 6/2002 | Biocca ................. H04N 13/344 345/8 |
| 2002/0084980 A1 | 7/2002 | White |
| 2002/0085097 A1 | 7/2002 | Colmenarez |
| 2002/0089489 A1 | 7/2002 | Carpenter |
| 2002/0190946 A1 | 12/2002 | Metzger |
| 2002/0197584 A1 | 12/2002 | Kendir |
| 2003/0006959 A1 | 1/2003 | Varanda |
| 2003/0017872 A1 | 1/2003 | Oishi et al. |
| 2003/0030622 A1 | 2/2003 | Vaarala |
| 2003/0076299 A1 | 4/2003 | Trajkovic |
| 2003/0107607 A1 | 6/2003 | Nguyen |
| 2003/0117370 A1 | 6/2003 | Van Brocklin et al. |
| 2003/0169233 A1 | 9/2003 | Hansen |
| 2003/0193572 A1 | 10/2003 | Wilson |
| 2003/0202089 A1 | 10/2003 | Alhadef et al. |
| 2003/0222892 A1 | 12/2003 | Diamond |
| 2004/0027328 A1 | 2/2004 | Yang |
| 2004/0046736 A1 | 3/2004 | Pryor et al. |
| 2004/0070564 A1 | 4/2004 | Dawson |
| 2004/0073360 A1 | 4/2004 | Foxlin |
| 2004/0090423 A1 | 5/2004 | Bisset |
| 2004/0095317 A1 | 5/2004 | Zhang |
| 2004/0125073 A1 | 7/2004 | Potter et al. |
| 2004/0164926 A1 | 8/2004 | Schonlau |
| 2004/0207597 A1 | 10/2004 | Marks |
| 2004/0233461 A1 | 11/2004 | Armstrong |
| 2004/0246229 A1 | 12/2004 | Tamada |
| 2004/0252102 A1 | 12/2004 | Wilson |
| 2005/0021470 A1 | 1/2005 | Martin et al. |
| 2005/0059488 A1 | 3/2005 | Larsen et al. |
| 2005/0110778 A1 | 3/2005 | Ben Ayed |
| 2005/0083248 A1* | 4/2005 | Biocca ................. H04N 13/194 345/8 |
| 2005/0091297 A1 | 4/2005 | Sato et al. |
| 2005/0093823 A1 | 5/2005 | Hinckley |
| 2005/0116931 A1 | 6/2005 | Olbrich |
| 2005/0129325 A1 | 6/2005 | Wu |
| 2005/0150697 A1 | 7/2005 | Altman |
| 2005/0162384 A1 | 7/2005 | Yokoyama |
| 2005/0174324 A1* | 8/2005 | Liberty ................. G06F 3/0346 345/156 |
| 2005/0270494 A1 | 12/2005 | Banning |
| 2006/0109245 A1 | 5/2006 | Wilson et al. |
| 2006/0261247 A1 | 11/2006 | Chen |
| 2006/0284792 A1 | 12/2006 | Foxlin |
| 2007/0060383 A1 | 3/2007 | Dohta |
| 2007/0066394 A1 | 3/2007 | Ikeda |
| 2007/0200847 A1 | 8/2007 | Rossler et al. |
| 2007/0298882 A1 | 12/2007 | Marks |
| 2008/0136796 A1 | 6/2008 | Dowling |
| 2011/0095980 A1 | 4/2011 | Sweetser |
| 2019/0317613 A1 | 10/2019 | Banning |

FOREIGN PATENT DOCUMENTS

| | | |
|---|---|---|
| JP | S60-138628 A | 7/1985 |
| JP | S62-281025 A | 12/1987 |
| JP | H03-176718 A | 7/1991 |
| JP | 04-253220 | 9/1992 |
| JP | H5-80925 | 4/1993 |
| JP | H6-308879 | 11/1994 |
| JP | H07-160411 A | 6/1995 |
| JP | H7-191797 | 7/1995 |
| JP | H7-230354 | 8/1995 |
| JP | H07-508586 A | 9/1995 |
| JP | 07-121293 | 10/1995 |
| JP | H7-271508 | 10/1995 |
| JP | H07-295737 A | 11/1995 |
| JP | H08-19062 A | 1/1996 |
| JP | H8-71252 | 3/1996 |
| JP | 08-234900 | 9/1996 |
| JP | H08-331667 A | 12/1996 |
| JP | H8-335136 | 12/1996 |
| JP | H09-80372 A | 3/1997 |
| JP | H09-81308 A | 3/1997 |
| JP | H10-91328 A | 4/1998 |
| JP | H10-207631 A | 8/1998 |
| JP | H10-228349 | 8/1998 |
| JP | H10-232739 | 9/1998 |
| JP | H11-85395 A | 3/1999 |
| JP | H11-167453 A | 6/1999 |
| JP | H11-211474 A | 8/1999 |
| JP | H11-211480 A | 8/1999 |
| JP | H11-319316 A | 11/1999 |
| JP | 2000-200149 A | 7/2000 |
| JP | 2000-267799 A | 9/2000 |
| JP | 2001-013935 A | 1/2001 |
| JP | 2001-500299 A | 1/2001 |
| JP | 2001-125736 A | 5/2001 |
| JP | 2001-148025 | 5/2001 |
| JP | 2001-166881 A | 6/2001 |
| JP | 2001-175411 A | 6/2001 |
| JP | 2001 325069 A | 11/2001 |
| JP | 2002-91692 | 3/2002 |
| JP | 2002-215321 A | 8/2002 |
| JP | 2002-233665 A | 8/2002 |
| JP | 2002-298145 A | 10/2002 |
| JP | 2002-320770 A | 11/2002 |
| JP | 2002-196877 | 12/2002 |
| JP | 2003-044220 A | 2/2003 |
| JP | 2003-44221 | 2/2003 |
| JP | 2003-091366 A | 3/2003 |
| JP | 2003-103050 A | 4/2003 |
| JP | 2003-140830 A | 5/2003 |
| JP | 2003-156335 A | 5/2003 |
| JP | 2003-164667 A | 6/2003 |
| JP | 2003 173235 A | 6/2003 |
| JP | 2003-199973 A | 7/2003 |
| JP | 2003-208260 A | 7/2003 |
| JP | 2003-233460 | 8/2003 |
| JP | 2003-234983 A | 8/2003 |
| JP | 2003-256129 | 10/2003 |
| JP | 2003-279892 A | 10/2003 |
| JP | 2003-280813 | 10/2003 |
| JP | 2004-013383 | 1/2004 |
| JP | 2004-118807 A | 4/2004 |
| JP | 2004-272433 A | 9/2004 |
| JP | 2004-531791 A | 10/2004 |
| JP | 2004-309659 | 11/2004 |
| JP | 2005-122534 A | 5/2005 |
| JP | 2005-215828 A | 8/2005 |
| JP | 2005-284874 A | 10/2005 |
| JP | 2006-236195 | 9/2006 |
| WO | WO 00/60534 A1 | 10/2000 |
| WO | WO 02/07839 A2 | 1/2002 |
| WO | WO 02/075364 | 9/2002 |
| WO | WO 2004/021712 A | 3/2004 |

(56) References Cited

FOREIGN PATENT DOCUMENTS

| | | |
|---|---|---|
| WO | WO 2004/104897 A1 | 12/2004 |
| WO | WO 2005/040991 A2 | 5/2005 |
| WO | WO 2005/108119 A2 | 11/2005 |
| WO | WO 2005/109215 A2 | 11/2005 |
| WO | WO 2005/109847 A2 | 11/2005 |
| WO | WO 2005/109879 A2 | 11/2005 |

OTHER PUBLICATIONS

Matej Andrejasic; "MEMS Accelerometers"; University of Ljubljana; Mar. 2008.
Greg Welch, Eric Foxlin; "Motion Tracking: No Silver Bullet, but a Respectable Arsenal"; IEEE Computer GRaphics and Applications, pp. 24-38; Nov.-Dec. 2002.
Andrew Hogue; "MARVIN: a Mobile Automatic Realtime Visual and INertial tracking system"; York University, Technical Report CSE-2003-13; May 2003.
Ji-Young Oh, Wolfgang Stuerzlinger; "Laser Pointers as Collaborative Pointing Devices"; Graphics Interface; pp. 141-150; 2002.
Leonid Naimark, Eric Foxlin; "Circular Data Matrix Fiducial System and Robust Image Processing for a Wearable Vision-Inertial Self-Tracker"; Proceedings International Symposium on Mixed and Augmented Reality; pp. 27-36; Oct. 1, 2002.
Brad A. Myers, Rishi Bhatnagar, Jeffrey Nichols, Choon Hong Peck, Dave Kong, Robert Miller, A. Chris Long; "Interacting at a Distance: Measuring the Performance of Laser Pointers and Other Devices"; ACM Proceedings of the SIGCHI Conference on Human Factors in Computing Systems; pp. 33-40; 2002.
Dominic Laberge; Jean-Francois Lapointe, Emil M. Petriu; "An Auto-Calibrated Laser-Pointing Interface for Large Screen Displays"; 7th IEEE International Symposium on Distributed Simulation and Real-Time Applications; pp. 190-194; Oct. 23-25, 2003.
Mihran Tuceryan, Yakup Gene, Nassir Navab; "Single-Point Active Alignment Method (SPAAM) for Optical See-Through HMD Calibration for Augmented Reality"; MIT; Presence: Teleoperators and Virtual Environments; pp. 259-276; Jun. 2002.
John L. Sibert, Mehmet Gokturk; "A Finger-Mounted, Direct Pointing Device for Mobile Computing"; ACM; Proceedings of the 10th annual ACM symposium on User interface software and technology; pp. 41-42; Oct. 1997.
Mihran Tuceryan, Douglas S. Greer, Ross T. Whitaker, David E. Breen, Eric Rose, Klaus H. Ahlers, Chris Crampton; "Calibration Requirements and Procedures for a Monitor-Based Augmented Reality System"; IEEE Transactions on Visualization and Computer Graphics; pp. 255-273; Sep. 1995.
Thomas Fuhrmann, Markus Klein, Manuel Odendahl; "Bluewand—A versatile remote control and pointing device"; KiVS Kurzbeiträge, VDE Verlag; pp. 81-88; 2003.
*Ultimatepointer, L.L.C.* vs. *Nintendo Co., Ltd. et al.*; U.S. District Court, E.D. Tex. Civil Action No. 6:11-CV-00571-LED; Invalidity Expert Report of Gregory Welch; Jan. 8, 2014 with Exhibits 1-16.
*Ultimatepointer, L.L.C.* vs. *Nintendo Co., Ltd. et al.*; U.S. District Court, W.D. Wash. Civil Action No. C14-0865RSL; Order Regarding Plaintiff's Motion for Summary Judgment; Dec. 22, 2014.
*Ultimatepointer, L.L.C.* vs. *Nintendo Co., Ltd. et al.*; U.S. District Court, W.D. Wash. Civil Action No. C14-0865RSL; Order Granting Defendants' Motion for Summary Judgment of Non-Infringement; Dec. 22, 2014.
Andrew Wilson, Steven Shafer; XWand: UI for Intelligent Spaces; CHI 2003; Apr. 5-10, 2003; 8 pages.
Rahul Sukthankar, Robert G. Stockton, Matthew D. Mullin; Smarter Presentations: Exploiting Homography in Camera-Projector Systems; Eighth IEEE International Conference on Computer Vision, Proceedings; Jul. 7-14, 2001; pp. 247-253.
Midway Games, Inc.; CarnEvil Arcade Game Operation Manual; Nov. 1998.
Sega Enterprises, Ltd.; House of the Dead Arcade Game Operator's Manual; 1997.
Sega of America, Inc.; Virtua Cop, Sega Saturn Console Game User's Manual and series of Sega Saturn Technical Bulletins1-41, SOA-1 to SOA-12; May 1995 to May 1996.
Atari Games Corp.; Area 51 Operator's Manual; 1995.
Sega of America, Inc.; House of the Dead User's Manual; 1995.
Nintendo of America, Inc.; Kirby Tilt 'n' Tumble Instruction Booklet; 2001.
U.S. Appl. No. 60/566,444; Freespace Pointing Device; Apr. 30, 2004.
U.S. Appl. No. 60/612,571; Free Space Pointing Devices and Methods; Sep. 23, 2004.
U.S. Appl. No. 60/641,410; Free Space Pointing Devices and Methods for Using Same; Jan. 5, 2005.
Mark Ashdown; Personal Projected Displays; Technical Report; No. 585; University of Cambridge Computer Laboratory; Mar. 2004; UCAM-CL-TR-585; ISSN 1476-2986.
Mark Ashdown, Peter Robinson; The Escritoire: A Personal Projected Display for Interacting With Documents; Technical Report; No. 538; University of Cambridge Computer Laboratory; Jun. 2002; UCAM-CL-TR-538; ISSN 1476-2986.
Ronald Azuma, Bruce Hoff, Howard Neely III, Ron Sarfaty, "A Motion-Stabilized Outdoor Augmented Reality System," Proceedings of IEEE Virtual Reality '99 (Houston, TX, Mar. 13-17, 1999), p. 252-259.
Mark Ashdown, Peter Robinson, "The Writing's on the Wall: Large, Remotely Controlled Displays", Proceedings of the First European Conference on Computer-Supported Collaborative Learning, Mar. 22-24, 2001,p. 83-88.
Pierre David Wellner, "Interacting with paper on the DigitalDesk", http://www.cl.cam.ac.uk/techreports/UCAM-CL-TR-330.html, Mar. 1994, p. 1-107.
Forte Technologies. Inc., "VFX1 Headgear Technical Specifications", Jan. 17, 1998, retrieved from archive.org, http://web.archive.org/web/19980117025842/http://www.fortevr.comlvfxtechs.html, Mar. 27, 2017.
Interactive Imaging Systems, Inc., "VFX1", Oct. 13, 1999, retrieved from archive.org, http://web.archive.org/web/19991013120528/http://iisvr.com/99iis/ProductsNFX1.html, Mar. 27, 2017.
Interactive Imaging Systems, Inc., "VFX1 Basics", Oct. 18, 1999, retrieved from archive.org, http://web.archive.org/web/19991008191445/http://iisvr.com/99iis/techsupport/vfx1basics.htm, Mar. 27, 2017.
Interactive Imaging Systems, Inc.,"VFX1 Technical Specifications", Oct. 22, 1999, retrieved from archive.org, http://web.archive.org/web/19991022011340/http://www.iisvr.com/99iis/techsupport/vfx1spec.htm, Mar. 27, 2017.
Interactive Imaging Systems, Inc., "VFX3D", Feb. 4, 2001, retrieved from archive.org, http://web.archive.org/web/20010204045500/http:/iisvr.com/99iis/Product.s/vfx3d/VFX3D.htm, Mar. 27, 2017.
Interactive Imaging Systems, Inc., "VFX3D Specifications", Feb. 4, 2001, retrieved from archive.org, http://Web.archive.org/web/20010204051500/http://iisvr.com/99iis/techsupport/vfx3d/vfx3dspec.htm, Mar. 27, 2017.
Interactive Imaging Systems, Inc., "VFX3D Specifications", Oct. 8, 1999, retrieved from archive.org, http://web.archive.org/web/19991008212309/http://iisvr.com/99iis/techsupport/vfx3dspec.htm, Mar. 27, 2017.
Interactive Imaging Systems, Inc., "CyberPuck VRC", Feb. 4, 2001, retrieved from archive.org, http://web.archlve.org/web/20010204045300/http://iisvr.corn/99iis/Products/vrc/VRC.htm, Mar. 27, 2017.
Interactive Imaging Systems, Inc., "Developer Info VFX3D SDK", Feb. 1, 2001, retrieved from archive.org, http://web.archive.org/web/20010201154600/http://iisvr.com/99iis/developers.html, Mar. 27, 2017.
Interactive Imaging Systems, Inc., "Products", Oct. 8, 1999, retrieved from archive.org, http://web.archive.org/web/19991008110212/http://iisvr.com/99iis/products.html, Mar. 27, 2017.
*Ultimatepointer, L.L.C.* vs. *Nintendo Co., Ltd. et al.*; U.S. Court of Appeals for the Federal Circuit, 2015-1297, Slip Opinion, Mar. 1, 2016.
U.S. Appl. No. 60/566,444, filed Apr. 30, 2004, Liberty et al.
Sega Enterprises, Ltd.; House of the Dead 2 Arcade Owner's Manual; 1998.

(56) References Cited

OTHER PUBLICATIONS

Sega Enterprises, Ltd.; House of the Dead 3 Operator's Manual; Jan. 2003.
Sega Enterprises, Ltd.; Confidential Mission Owner's Manual; Dec. 2000.
Konami; Teraburst Operator's Manual; 1998.
*Ultimatepointer, L.L.C.* vs. *Nintendo Co., Ltd. et al.*; U.S. District Court, E.D. Tex. Civil Action No. 6:11-CV-00571-LED; Nintendo Defendants' Preliminary Invalidity Contentions with claim charts 1-683; Aug. 8, 2012.
*Ultimatepointer, L.L.C.* vs. *Nintendo Co., Ltd. et al.*; U.S. District Court, E.D. Tex. Civil Action No. 6:11-CV-00571-LED; Retailer Defendants' Invalidity Contentions with claim charts 1-707; Oct. 12, 2012.
*Ultimatepointer, L.L.C.* vs. *Nintendo Co., Ltd. et al.*; U.S. District Court, E.D. Tex. Civil Action No. 6:11-CV-00571-LED; Nintendo Defendants' Supplemental Invalidity Contentions claim charts 708-723; Dec. 10, 2012.
*Ultimatepointer, L.L.C.* vs. *Nintendo Co., Ltd. et al.*; U.S. District Court, E.D. Tex. Civil Action No. 6:11-CV-00571-LED; UltimatePointer, L.L.C.'s Second Amended Disclosure of Asserted Claims and Infringement Contentions Pursuant to Patent Local Rule 3-1 and 3-2 for U.S. Pat. No. 7,746,321 with Proposed Second Amended Claim Chart; Dec. 10, 2012.
*Ultimatepointer, L.L.C.* vs. *Nintendo Co., Ltd. et al.*; U.S. District Court, E.D. Tex. Civil Action No. 6:11-CV-00571-LED; UltimatePointer, L.L.C.'s Second Amended Disclosure of Asserted Claims and Infringement Contentions Pursuant to Patent Local Rule 3-1 and 3-2 for U.S. Pat. No. 8,049,729 with Proposed Second Amended Claim Chart; Dec. 10, 2012.
*Ultimatepointer, L.L.C.* vs. *Nintendo Co., Ltd. et al.*; U.S. District Court, E.D. Tex. Civil Action No. 6:11-CV-00571-LED; UltimatePointer, L.L.C.'s Third Amended Disclosure of Asserted Claims and Infringement Contentions for U.S. Pat. No. 7,746,321 Pursuant to Patent Local Rule 3-1 and 3-2 with Claim Chart; Jun. 14, 2013.
*Ultimatepointer, L.L.C.* vs. *Nintendo Co., Ltd. et al.*; U.S. District Court, E.D. Tex. Civil Action No. 6:11-CV-00571-LED; UltimatePointer, L.L.C.'s Third Amended Disclosure of Asserted Claims and Infringement Contentions tor U.S. Pat. No. 8,049,729 Pursuant to Patent Local Rule 3-1 and 3-2 with Claim Chart; Jun. 14, 2013.
*Ultimatepointer, L.L.C.* vs. *Nintendo Co., Ltd. et al.*; U.S. District Court, E.D. Tex. Civil Action No. 6:11-CV-00571-LED; Joint Claim Construction and Prehearing Statement in Compliance With Patent Rule 4-3; Nov. 12, 2012.
*Ultimatepointer, L.L.C.* vs. *Nintendo Co., Ltd. et al.*; U.S. District Court, E.D. Tex. Civil Action No. 6:11-CV-00571-LED; First Amended Joint Claim Construction and Prehearing Statement in Compliance With Patent Rule 4-3; Nov. 19, 2012.
*Ultimatepointer, L.L.C.* vs. *Nintendo Co., Ltd. et al.*; U.S. District Court, E.D. Tex. Civil Action No. 6:11-CV-00571-LED; Ultimatepointer, L.L.C.'s Opening Claim Construction Brief; Nov. 26, 2012.
*Ultimatepointer, L.L.C.* vs. *Nintendo Co., Ltd. et al.*; U.S. District Court, E.D. Tex. Civil Action No. 6:11-CV-00571-LED; Defendants' Responsive Claim Construction Brief; Dec. 17, 2012.
*Ultimatepointer, L.L.C.* vs. *Nintendo Co., Ltd. et al.*; U.S. District Court, E.D. Tex. Civil Action No. 6:11-CV-00571-LED; Ultimatepointer, L.L.C.'s Claim Construction Reply Brief; Jan. 4, 2013.
*Ultimatepointer, L.L.C.* vs. *Nintendo Co., Ltd. et al.*; U.S. District Court, E.D. Tex. Civil Action No. 6:11-CV-00571-LED; P.R. 4-5(D) Joint Claim Construction Charts; Jan. 10, 2013.
*Ultimatepointer, L.L.C.* vs. *Nintendo Co., Ltd. et al.*; U.S. District Court, E.D. Tex. Civil Action No. 6:11-CV-00571-LED; Memorandum Opinion and Order; May 28, 2013.
*Ultimatepointer, L.L.C.* vs. *Nintendo Co., Ltd. et al.*; U.S. District Court, E.D. Tex. Civil Action No. 6:11-CV-00571-LED; Defendants' Motion for Summary Judgment of Invalidity Based on Indefiniteness Under 35 U.S.C. 112 ¶2; Dec. 21, 2012.
*Ultimatepointer, L.L.C.* vs. *Nintendo Co., Ltd. et al.*; U.S. District Court, E.D. Tex. Civil Action No. 6:11-CV-00571-LED; Plaintiff's Response in Opposition to Defendants' Motion for Summary Judgment of Invalidity Based on Indefiniteness Under 35 U.S.C. § 112 ¶ 2; Jan. 14, 2013.
*Ultimatepointer, L.L.C.* vs. *Nintendo Co., Ltd. et al.*; U.S. District Court, E.D. Tex. Civil Action No. 6:11-CV-00571-LED; Defendants' Reply in Support of Motion for Summary Judgment of Invalidity Based on Indefiniteness Under 35 U.S.C. 112 ¶2; Jan. 16, 2013.
*Ultimatepointer, L.L.C.* vs. *Nintendo Co., Ltd. et al.*; U.S. District Court, E.D. Tex. Civil Action No. 6:11-CV-00571-LED; Defendants' First Amended Invalidity Contentions with claim charts 1-760; Jun. 28, 2013.
AIRcable User Manual; 2005.
Ansar, Adnan et al. "Linear Pose Estimation from Points or Lines" IEEE Transactions on Pattern Analysis and Machine Intelligence 25(5):578-589; Jun. 2003.
Bachmann, Eric R. et al. "Inertial and Magnetic Posture Tracking for Inserting Humans into Networked Virtual Environments" ACM Symposium on Virtual Reality Software & Technology 2001.
Badler, Norman I. et al. "Multi-Dimensional Input Techniques and Articulated Figure Positioning by Multiple Constraints" Interactive 3D Graphics; Oct. 1986.
Banning, Erik "Declaration in Support of U.S. Appl. No. 11/135,911—Easily Deployable Interactive Direct-Pointing System and Presentation Control System and Calibration Method Therefore" Dec. 13, 2005.
Benbasat, Ari Y. et al. "Compact, Configurable Inertial Gesture Recognition" CHI '01 Ext. Abstr. Hum. Factors Comput. Syst.. 10.1145/634067.634178; Mar. 2001.
Boritz, James et al. "A Study of Interactive 6 DOF Docking in a Computerized Virtual Environment" Proceedings. IEEE 1998 Virtual Reality Annual International Symposium (Cat. No. 98CB36180), 1998, pp. 139-146.
Cantzler, H. et al. "A Novel Form of a Pointing Device" Vision, Video, and Graphics, pp. 1-6; 2003.
Cao, Xiang et al. "Vision Wand: Interaction Techniques for Large Displays Using a Passive Wand Tracked in 3D" ACM SIGGRAPH 2004 Papers; Aug. 2004.
Cavens, Duncan et al. "Interacting with the Big Screen: Pointers to Ponder" Jun. 2002.
Cheok, Adrian David et al. "Micro-Accelerometer Based Hardware Interfaces for Wearable Computer Mixed Reality Applications" Proceedings. Sixth International Symposium on Wearable Computers, 2002, pp. 223-230.
Cohen, Philip et al. "Multimodal Interaction for 2D and 3D Environment" Projects in VR; Jul./Aug. 1999.
Datamonitor "Logitech International S.A. Company Profile" www.datamonitor.com; Jun. 2008.
Eberly, David "Least Squares Fitting of Data" Geometric Tools, Inc.; Sep. 17, 2001.
Eckert, Rihcard R et al. "The Classroom of the 21st Century: The Interactive Learning Wall" ACM SIGCHI Bulletin, vol. 32, Issue 2; Apr. 2000.
Elrod, Scott et al. "Liveboard: A Large Interactive Display Supporting Group Meetings, Presentations and Remote Collaboration" Proceedings of the SIGCHI Conference on Human Factors in Computing Systems; 1992.
Forum for Detecting Laser Pointer in a Projection Through A Camera and Program . . . AnandTech; Feb. 13, 2003.
Foxlin, Eric et al. "FlightTracker: A Novel Optical/Internal Tracker for Cockpit Enhanced Vision" IEEE/ACM International Symposium on Mixed and Augmented Reality; Nov. 2004.
Fukumoto, Masaaki et al. "Finger-Pointer: A Glove Free Interface" May 1992.
Genc, Y. et al. "Practical Solutions for Calibration of Optical See-Through Devices" ISMAR '02; May 24, 2002.
Hall, Theodore Wayne "Hand-Eye Coordination in Desktop Virtual Reality" CAAD, Future; pp. 177-182; 1997.
Hinckley, Ken et al. "Usability Analysis of 3D Rotation Techniques" In Proc. UIST 1997 Symp. on User interface Software and Technology; Oct. 1997.

(56) References Cited

OTHER PUBLICATIONS

Honeywell "Digital Compass Solutions: HMR3200/HMR3300" Honeywell.com; Form #900266 02-03 Rev. D; Date Unavailable (8 pages).
Honeywell "Digital Compass Solutions: HMR3200/HMR3300" Honeywell.com; Form #900266 Rev. F; Dec. 2005 (11 pages).
Honeywell "Digital Compass Solutions User's Guide: HMR3200/HMR3300" Honeywell.com; 04/02 Rev. A; Date is Unavailable.
Levin, Golan et al. "Bringing Sketching Tools to Keychain Computers with an Acceleration-Based Interface" CHI'99: Conference on Human Factors in Computing Systems; May 1999.
Liu, Yuncai et al. "Determination of Camera Location from the 2-D to the 3-D Line and Point Correspondences" (Abstract Only); IEEE Transactions on Pattern Analysis and Machine Intelligence, vol. 12, No. 1, pp. 28-37, Jan. 1990.
Logitech "MXAir: On the Desk. In the Air.—User's Guide" Date Unavailable.
Matveyev, Serge V. et al. "The Optical Tweezers: Multiple-Point Interaction Technique" Proceedings of the ACM Symposium on Virtual Reality Software and Technology, VRST 2003, Osaka, Japan; Oct. 2003.
Marrin, Teresa "Possibilities for the Digital Baton as a General-Purpose Gestural Interface" Human Factors in Computing Systems, CHI '97: Mar. 1997.
Melexis Integrated Systems "Applications Note: Transmitter and Receiver Antenna Basics" Jan. 16, 2004.
Newsletter of the Academic Computing Center; May 1996.
Olsen, Dan R., Jr. et al. "Laser Pointer Interaction" CHI 2001.
Pausch, Randy et al. "Tailor: Creating Custom User Interfaces Based on Gesture" Proceedings of the 3rd Annual ACM SIGGRAPH Symposium on User Interface Software and Technology; Aug. 1990.
Polhemus "3Space® Fastrak® User's Manual" 2002 Edition, Rev. C.
Polhemus "Isotrack® II Price List" Sep. 2002.
Polhemus "Isotrack® II—The Fast and Affordable Digital Tracker" Feb. 2003.
Polhemus "Liberty™ Price List" Jul. 2003.
Polhemus "Liberty Latus" Jun. 2005.
Proxima "Cyclops Interactive Pointer System" Aug. 1996.
Proxima Desktop Projector 5500 User's Guide; Jun. 21, 1996.
Proxima Desktop Projector 9100 Multimedia LCD Projector User's Guide; Date Unavailable.
Proxima "Lightbook™ Tough Enough for the Rigors of the Road" Jun. 1997.
Raskar, Ramesh et al. "A Self-Correcting Projector" Mitsubishi Electric Research Laboratories; TR2001-46; Dec. 2001.
Rekimoto, Jun et al. "The World Through Computer: Computer Augmented Interaction with Real World Environments" Proceedings of the 8th annual ACM symposium on User interface and software technology. 1995.
Rohs, Michael et al. "Direct Manipulation Techniques for Large Displays Using Camera Phones" Proceedings of 2nd International Symposium on Ubiquitous Computing Systems 2004.
Sawicki, Donald S. Traffic Radar Handbook: A Comprehensive Guide to Speed Measuring Systems: (Abstract Only) copradar.com; 2002.
Sega "House of the Dead: Sega Saturn Console Game with Stunner Peripheral" 1998.
Sega "Sega Saturn Technical Bulletins 1-15" May 1995-May 1996; 170 pages.
Sohn, Misook et al. "SonarPen: A New ultrasonic Pointing Device for an Active TV" (Abstract Only) 2003 IEEE International Conference on Consumer Electronics, 2003. ICCE; Jun. 2003.
Sukthankar, Rahul et al. "Self-Calibrating Camera-Assisted Presentation Interface" Proceedings of International Conference on Control, Automation, Robotics and Vision (ICARCV); 2000.
Tuulari, Esa et al. "SoapBox: A Platform for Ubiquitous Computing Research and Applications" Only Includes an Abstract; Lecture Notes in Computer Science; 2002.

US Department of Transportation—National Highway Traffic Safety Administration "Police Traffic Radar: Issue Paper" Feb. 1980.
Ware, Colin "Using the Bat: A Six-Dimensional Mouse for Object Placement" IEEE Computer Graphics and Applications; vol. 8, Issue: 6; 1988.
Watson, G.A. "Least Squares Fitting of Parametric Surfaces to Measured Data" Anziam J. 42(E); 2000.
Wilson, Andrew D. et al. "Demonstration of the Xwand Interface for Intelligent Spaces" Microsoft; 2016.
Wilson, Andrew D. et al. "Pointing in Intelligent Environment with the WorldCursor" Proceedings of IFIP INTERACT03: Human-Computer Interaction 2003; Sep. 2003.
Wloka, Matthias M. et al. "The Virtual Tricorder: A Uniform Interface for Virtual Reality" Dec. 1995.
Wormell, D. et al. "Advancements in 3D Interface Devices in Virtual Environments" The Eurographics Association; 2003.
You, Suya et al. "Fusion of Vision and Gyro Tracking for Robust Augmented Reality Registration" IEEE Proceedings Virtual Reality; 2001.
International Search Report for International Application No. PCT/US2005/018234, dated May 15, 2006.
Written Opinion for International Application No. PCT/US2005/018234, dated May 15, 2006.
International Preliminary Report on Patentability for International Application No. PCT/US2005/018234, dated Nov. 29, 2006.
Office Action for U.S. Appl. No. 11/135,911, dated Aug. 4, 2009.
Notice of Allowance for U.S. Appl. No. 11/135,911, dated Mar. 22, 2010.
Office Action for U.S. Appl. No. 12/782,980, dated Nov. 10, 2010.
Notice of Allowance for U.S. Appl. No. 12/782,980, dated Jun. 29, 2011.
Office Action for U.S. Appl. No. 13/239,140, dated Jan. 23. 2013.
Notice of Allowance for U.S. Appl. No. 13/239,140, dated May 31, 2013.
Notice of Allowance for U.S. Appl. No. 13/239,140, dated Nov. 14, 2013.
Notice of Allowance for U.S. Appl. No. 13/239,140, dated Mar. 17, 2014.
Notice of Allowance for U.S. Appl. No. 14/175,960, dated Aug. 14, 2014.
Notice of Allowance for U.S. Appl. No. 14/463,405, dated Apr. 9, 2015.
Notice of Allowance for U.S. Appl. No. 14/712,788, dated Jan. 11, 2016.
Notice of Allowance for U.S. Appl. No. 15/098,099 dated Jun. 12, 2017.
Office Action for U.S. Appl. No. 15/696,452, dated Oct. 23, 2017.
Office Action for U.S. Appl. No. 15/696,452, dated May 1, 2018.
Office Action for U.S. Appl. No. 15/696,452, dated Oct. 4, 2018.
Notice of Allowance for U.S. Appl. No. 15/696,452, dated Jan. 31, 2019.
Office Action for U.S. Appl. No. 16/395,802, dated May 22, 2019.
Notice of Allowance for U.S. Appl. No. 16/395,802, dated Jun. 25, 2019.
Notice of Allowance for U.S. Appl. No. 16/582,508, dated May 15, 2020.
Corrected Notice of Allowance for U.S. Appl. No. 16/582,508, dated May 27, 2020.
Notice of Allowance for U.S. Appl. No. 16/812,339, dated Mar. 24, 2021.
Office Action for U.S. Appl. No. 11/483,170, dated Jun. 8, 2009.
Office Action for U.S. Appl. No. 11/483,170, dated Feb. 1, 2010.
Office Action for U.S. Appl. No. 11/483,170, dated Aug. 18, 2010.
Office Action for U.S. Appl. No. 11/483,170, dated Apr. 25, 2011.
Office Action for U.S. Appl. No. 11/483,170, dated Dec. 6, 2011.
Advisory Action for U.S. Appl. No. 11/483,170, dated Feb. 28, 2012.
Examiner's Answer for U.S. Appl. No. 11/483,170, dated Oct. 4, 2012.
Patent Board Decision for U.S. Appl. No. 11/483,170, dated Jun. 3, 2015.
Notice of Allowance for U.S. Appl. No. 11/483,170, dated Aug. 26, 2015.

(56) References Cited

OTHER PUBLICATIONS

Notice of Allowance for U.S. Appl. No. 11/483,170, dated Nov. 6, 2015.
Office Action for U.S. Appl. No. 15/014,879, dated May 17, 2018.
Office Action for U.S. Appl. No. 15/014,879, dated Dec. 27, 2018.
Notice of Allowance for U.S. Appl. No. 15/014,879, dated Apr. 10, 2019.
Office Action for U.S. Appl. No. 16/447,559, dated Mar. 20, 2020.
Office Action for U.S. Appl. No. 16/447,559, dated Jun. 24, 2020.
Office Action for U.S. Appl. No. 16/447,559, dated Nov. 23, 2020.
Examiner's Answer for U.S. Appl. No. 16/447,559, dated Aug. 13, 2021.
Documents filed with U.S. District Court Proceedings for *Ultimatepointer, L.L.C.* vs. *Nintendo Co., Ltd. et al*; U.S. District Court, for the Eastern District of Texas Tyler Division; Civil Action No. 6:11-cv-00496-JRG; Includes publicly available documents filed from Sep. 15, 2011-Oct. 29, 2021; (8,239 pages).
UltimatePointer, L.L.C.'s Second Amended Disclosure of Asserted Claims and Infringement Contentions Pursuant to Patent Local Rule 3-1 and 3-2 for U.S. Pat. No. 7,746,321 filed in the *Ultimatepointer, L.L.C.* vs. *Nintendo Co., Ltd. et al.* for United States District Court for the Eastern District of Texas Tyler Division; Civil Action No. 6:11-cv-00496; Filed Dec. 10, 2012 (84 Pages).
Defendants' Motion for Summary Judgment of Invalidity Based on Indefiniteness Under 35 U.S.C. 112 ¶ 2 filed in the *Ultimatepointer, L.L.C.* vs. *Nintendo Co., Ltd. et al.* for United States District Court for the Eastern District of Texas Tyler Division; Civil Action No. 6:11-cv-00496; Filed Dec. 21, 2012 (20 Pages).
UltimatePointer, L.L.C.'s Third Amended Disclosure of Asserted Claims and Infringement Contentions for U.S. Pat. No. 7,746,321 Pursuant to Patent Local Rule 3-1 and 3-2 filed in *Ultimatepointer, L.L.C.*, vs. *Nintendo Co., Ltd. et al.* in the United States District Court for the Eastern District of Texas Tyler Division; Civil Action No. 6:11-cv-00496; Filed Jun. 14, 2013 (70 Pages).
Defendants' First Amended Invalidity Contentions filed in *Ultimatepointer, L.L.C.*, vs. *Nintendo Co., Ltd. et al.* in the United States District Court for the Eastern District of Texas Tyler Division; Civil Action No. 6:11-cv-00496; Filed Jun. 28, 2013 (130 Pages).
Documents filed with U.S. District Court Proceedings for *Ultimatepointer, L.L.C.* vs. *Nintendo Co., Ltd. et al*; U.S. District Court, for the Eastern District of Texas Tyler Division; Civil Action No. 6:11-cv-005716-JRG; Includes publicly available documents filed from Nov. 1, 2011-Jul. 8, 2016; (5,385 pages).
UltimatePointer, L.L.C's Second Amended Disclosure of Asserted Claims and Infringement Contentions Pursuant to Patent Local Rule 3-1 and 3-2 for U.S. Pat. No. 8,049,729 filed in *Ultimatepointer, L.L.C.*, vs. *Nintendo Co., Ltd. et al.*, in the United States District Court for the Eastern District of Texas Tyler Division; Civil Action No. 6:11-cv-00571; Filed Dec. 10, 2012 (30 Pages).
UltimatePointer, L.L.C.'s Third Amended Disclosure of Asserted Claims and Infringement Contentions for U.S. Pat. No. 8,049,729 Pursuant to Patent Local Rule 3-1 and 3-2 filed in *Ultimatepointer, L.L.C.* vs. *Nintendo Co., Ltd. et al.* in the United States District Court for the Eastern District of Texas Tyler Division; Civil Action No. 6:11-cv-00571; Filed Jun. 14, 2013 (29 Pages).
Nintendo Defendants' Preliminary Invalidity Contentions filed in the United States District Court for the Eastern District of Texas Tyler Division; Civil Action Nos. 6:11-cv-00496 and 6:11-cv-00571; Filed Aug. 21, 2012 (105 Pages).
Retailer Defendants' Invalidity Contentions filed in the United States District Court for the Eastern District of Texas Tyler Division; Civil Action Nos. 6:11-cv-00496 and 6:11-cv-00571; Filed Oct. 12, 2012 (126 Pages).
Joint Claim Construction and Prehearing Statement in Compliance with Patent Rule 4-3 filed in the United States District Court for the Eastern District of Texas Tyler Division; Civil Action Nos. 6:11-cv-00496 and 6:11-cv-00571; Filed Nov. 12, 2012 (70 Pages).
First Amended Joint Claim Construction and Prehearing Statement in Compliance with Patent Rule 4-3 filed in the United States District Court for the Eastern District of Texas Tyler Division; Civil Action Nos. 6:11-cv-00496 and 6:11-cv-00571; Filed Nov. 19, 2012 (71 Pages).
UltimatePointer, L.L.C.'s Opening Claim Construction Brief filed in the United States District Court for the Eastern District of Texas Tyler Division; Civil Action Nos. 6:11-cv-00496 and 6:11-cv-00571; Filed Nov. 26, 2012 (36 Pages).
Memorandum Opinion and Order filed in the United States District Court for the Eastern District of Texas Tyler Division; Civil Action Nos. 6:11-cv-00496 and 6:11-cv-00571; Filed May 28, 2013 (40 Pages).
Expert Report Pursuant to Fed. R. Civ. P. 26(A) of Gregory Francis Welch Ph.D., Concerning The Invalidity of U.S. Pat. Nos. 7,746,321 and 8,049,729 (Including Exhibits 1-6 and 8-16) filed in the United States District Court for the Eastern District of Texas Tyler Division; Civil Action Nos. 6:11-cv-00496 and 6:11-cv-00571; Filed Jan. 8, 2014 (707 Pages).
Documents filed with U.S. District Court Proceedings for *Ultimatepointer, L.L.C.* vs. *Nintendo Co., Ltd. et al*; U.S. District Court, for the Eastern District of Texas Tyler Division; Civil Action No. 6:11-cv-00865-JLR; Includes publicly available documents filed from Sep. 15, 2011-Sep. 1, 2016; (12,950 pages).
Documents filed with United States Court of Appeals for the Federal Circuit in re: Nintendo Co., Ltd.; Includes publicly available documents filed from May 10, 2013-Nov. 25, 2013; (1,006 pages).
Documents filed with United States Court of Appeals for the Federal Circuit for *Ultimatepointer, L.L.C.* vs. *Nintendo Co., Ltd.*; Includes publicly available documents filed from Jan. 29, 2015-Apr. 8, 2016; (2,325 pages).
Documents filed with United States Court of Appeals for the Federal Circuit for *Ultimatepointer, L.L.C.* vs. *Nintendo Co., Ltd.*; Includes publicly available documents filed from Apr. 8, 2015-Apr. 8, 2016; (3,151 pages).
Documents filed with United States Court of Appeals for the Federal Circuit for *Ultimatepointer, L.L.C.* vs. *Nintendo Co., Ltd.*; Includes publicly available documents filed from Apr. 8, 2015-Apr. 8, 2016; (103 pages).
Documents filed with United States Court of Appeals for the Federal Circuit for *Ultimatepointer, L.L.C.* vs. *Nintendo Co., Ltd.*; Includes publicly available documents filed from Apr. 23, 2015-Apr. 8, 2016; (265 pages).
U.S. Appl. No. 17/690,868, filed Mar. 9, 2022, Banning.
U.S. Appl. No. 17/690,883, filed Mar. 9, 2022, Banning.
Office Action for U.S. Appl. No. 17/690,868, dated May 6, 2022.
Office Action for U.S. Appl. No. 17/690,883, dated May 5, 2022.
Decision on Appeal for U.S. Appl. No. 16/447,559, dated May 16, 2022.
Patent Trial and Appeal Board Oral Hearing Transcript for U.S. Appl. No. 16/447,559, mailed May 21, 2022.

* cited by examiner

MULTI-SENSOR DEVICE WITH AN ACCELEROMETER FOR ENABLING USER INTERACTION THROUGH SOUND OR IMAGE

CROSS-REFERENCE TO RELATED APPLICATIONS

This application is a continuation of application Ser. No. 16/812,339, filed Mar. 8, 2020, now U.S. Pat. No. 11,073,919, which in turn is a continuation of application Ser. No. 16/582,508, filed Sep. 25, 2019, now U.S. Pat. No. 10,698,502, which in turn is a continuation of application Ser. No. 16/395,802, filed Apr. 26, 2019, now U.S. Pat. No. 10,459,535, which in turn is a continuation of application Ser. No. 15/696,452, filed Sep. 6, 2017, now U.S. Pat. No. 10,318,019, which in turn is a continuation of application Ser. No. 15/098,099, filed Apr. 13, 2016, now U.S. Pat. No. 9,785,255, which in turn is a continuation of application Ser. No. 14/712,788, filed May 14, 2015, now U.S. Pat. No. 9,411,437, which in turn is a continuation of application Ser. No. 14/463,405, filed Aug. 19, 2014, now U.S. Pat. No. 9,063,586, which in turn is a continuation of application Ser. No. 14/175,960, filed Feb. 7, 2014, now U.S. Pat. No. 8,866,742, which in turn is a continuation of application Ser. No. 13/239,140, filed Sep. 21, 2011, now U.S. Pat. No. 8,723,803, which in turn is a continuation of application Ser. No. 12/782,980, filed May 19, 2010, now U.S. Pat. No. 8,049,729, which in turn is a continuation of application Ser. No. 11/135,911, filed May 24, 2005, now U.S. Pat. No. 7,746,321, which in turn claims priority from U.S. Provisional Application No. 60/575,671 filed on May 28, 2004 and from U.S. Provisional Application No. 60/644,649 filed on Jan. 18, 2005, all of which are hereby incorporated by reference.

STATEMENT REGARDING FEDERALLY SPONSORED RESEARCH OR DEVELOPMENT

Not applicable.

BACKGROUND OF THE INVENTION

1. Field of the Invention

The invention relates generally to devices for making presentations in front of audiences and, more specifically, to devices and methods for making presentations for which interaction with the displayed information through direct-pointing is desired or for which verbal interaction with the audience may be anticipated.

2. Background Art

Technology for presenting computer-generated images on large screens has developed to the point where such presentations are commonplace. For example, the software package POWERPOINT, sold by Microsoft Corp., Redmond, Wash., may be used in combination with a so-called 'beamer' to generate interactive presentation material and project for viewing by an audience. Often, such presentations are held in rooms not specifically equipped for the purpose of showing presentations, in which case use is made of a portable beamer in combination with a so-called 'laptop' computer. Under these circumstances the projection surface may be a wall of the room.

During a presentation it is desirable for the presenter to be able to move freely in front of the audience while retaining the capability to interact with the presentation and point to specific features on the displayed images. It would also be desirable for the presenter to be able to capture verbal comments made by members of the audience so as to amplify and/or play them back to the larger audience.

In general, interaction with a computer is often facilitated by pointing devices such as a 'mouse' or a 'trackball' that enable manipulation of a so-called 'cursor'. Traditionally, these devices were physically connected to the computer, thus constraining the freedom-of-movement of the user. More recently, however, this constraint has been removed by the introduction of wireless pointing devices such as the GYROMOUSE, as manufactured by Gyration, Inc.

Broadly speaking, pointing devices may be classified in two categories: a) devices for so-called 'direct-pointing' and b) devices for so-called 'indirect-pointing'. Direct pointing devices are those for which the physical point-of-aim coincides with the item being pointed at, i.e., it lies on the line-of-sight. Direct pointing devices include the so-called 'laser pointer' and the human pointing finger. Indirect pointing devices include systems where the object of pointing (e.g., a cursor) bears an indirect relationship to the physical point-of-aim of the pointing device; examples include a mouse and a trackball. It needs no argument that direct-pointing systems are more natural to humans, allowing faster and more accurate pointing actions.

Indirect pointing devices known in the art include the following. U.S. Pat. No. 4,654,648 to Herrington et al. (1987), U.S. Pat. No. 5,339,095 to Redford (1994), U.S. U.S. Pat. No. 5,359,348 to Pilcher et al. (1994), U.S. Pat. No. 5,469,193 to Giobbi et al. (1995), U.S. Pat. No. 5,506,605 to Paley (1996), U.S. Pat. No. 5,638,092 to Eng et al. (1997), U.S. Pat. No. 5,734,371 to Kaplan (1998), U.S. Pat. No. 5,883,616 to Koizumi et al. (1999), U.S. Pat. No. 5,898,421 to Quinn (1999), U.S. Pat. No. 5,963,134 to Bowers et al. (1999), U.S. Pat. No. 5,999,167 to Marsh et al. (1999), U.S. Pat. No. 6,069,594 to Barnes et al. (2000), U.S. Pat. No. 6,130,664 to Suzuki (2000), U.S. Pat. No. 6,271,831 to Escobosa et al. (2001), U.S. Pat. No. 6,342,878 to Chevassus et al. (2002), U.S. Pat. No. 6,388,656 to Chae (2002), U.S. Pat. No. 6,411,277 to Shah-Nazaroff (2002), U.S. Pat. No. 6,492,981 Stork et al. (2002), U.S. Pat. No. 6,504,526 to Mauritz (2003), U.S. Pat. No. 6,545,664 to Kim (2003), U.S. Pat. No. 6,567,071 to Curran et al. (2003) and U.S. Patent Application Publication No. 2002/0085097 to Colmenarez et al. (2002). Each of the foregoing publications discloses a system for which the 2 dimensional or 3 dimensional position, orientation and/or motion of an object, such as a handheld pointing device, are measured with respect to some reference coordinate system using appropriate means. Such means include acoustic devices, electromagnetic devices, infrared devices, visible light emitting diode (LED) devices, charge coupled devices (CCD), accelerometer and gyroscopic motion detectors, etc. Although for some of the foregoing devices the reference coordinate system may be positioned close to the display means, no information on the actual position of the presentation display with respect to the system is used, causing the resulting pointing action to be inherently indirect and, hence, less natural to the human operators of such systems.

Other inherently indirect-pointing systems that do not require the position or orientation of the pointing device to be known include devices such as disclosed in U.S. Pat. No. 5,095,302 to McLean et al. (1992) and U.S. Pat. No. 5,668,574 to Jarlance-Huang (1997). The foregoing patents describe indirect-pointing methods that do not provide the speed and intuitiveness afforded by direct-pointing systems.

Direct pointing devices are disclosed, for example, in U.S. Pat. No. 4,823,170 to Hansen (1989), which describes a direct-pointing system comprising a light source, a position-sensing detector located adjacent to the light source and a focusing reflector that, in one application, is parabolic shaped and is attached to the pointing device. Additionally, procedures are described to calibrate the system. In the understanding of current applicant, however, the physical location of the position-sensing detector needs to be, at least preferably, adjacent to the display means. The system disclosed in the Hansel '170 patent cannot easily be ported to a room not specifically equipped for this system.

U.S. Pat. No. 5,929,444 to Leichner (1999) discloses a system primarily intended for target shooting practice, but an application as a direct-pointing cursor control apparatus may arguably be anticipated. The system includes transmitting and detecting equipment in a fixed reference base and a moveable pointing device. A calibration routine is described that aligns the detecting and transmitting means while keeping the pointing device (i.e., a gun) aimed at the center of the target. The Leichner '444 patent does not describe methods or means that allow determination of a point-of-aim of a pointing device on a target of which the size and/or orientation have not been predetermined. Consequently, the system disclosed in the Leichner '444 patent is not suitable to be used as a cursor control means for projection surfaces not specifically adapted to be used with such system.

U.S. Pat. No. 5,952,996 to Kim et al. (1999), U.S. Pat. No. 6,184,863 to Siben et al. (2001) and U.S. Patent Application Publication No. 2002/0084980 to White et al. (2002) disclose direct-pointing systems where the 3 dimensional position and/or orientation of the pointing device is measured with respect to sources and/or detectors, the physical position of which in relation to the display means is presumed known. Such systems only work in rooms specifically equipped for their use.

U.S. Pat. No. 5,484,966 to Segen (1996), U.S. Pat. No. 6,335,723 to Wood et al. (2002) and U.S. Pat. No. 6,507,339 to Tanaka (2003) disclose methods suitable for direct-pointing that are useful only if the pointing device is physically close to or touching the display area or volume, for example used with so-called 'interactive whiteboards'. Some of the foregoing patents describe appropriate pointer calibration routines. Such systems are not suitable for presentations where the display surface is out of the presenter's physical reach.

U.S. Pat. No. 6,104,380 to Stork et al. (2000) discloses a direct-pointing system in which at least the 3 dimensional orientation of a handheld pointing device is measured by appropriate means. Additionally, a direct measurement is made of the distance between the pointing device and the displayed image. However, the system disclosed in the Stork et al. '380 patent does not include methods to ascertain the position and orientation of the display means relative to the pointing device. In the foregoing system, these appear to be presumed known. This is also the case for a system disclosed in U.S. Pat. No. 4,768,028 to Blackie (1988), in which the orientation of a helmet-mounted direct-pointing apparatus is measured electromagnetically. The foregoing systems therefore appear to be ill-suited to operate in rooms not specifically equipped for presentation purposes.

U.S. Pat. No. 6,373,961 to Richardson et al. (2002) discloses a direct-pointing system using helmet-mounted eye tracking means. The point-of-gaze relative to the helmet is measured as well as the position and orientation of the helmet relative to the display. The latter is accomplished by equipping the helmet either with means to image sources mounted at fixed positions around the display or with means to image a displayed calibration pattern. Of course, the foregoing system relies on sophisticated helmet mounted equipment capable of, among other things, tracking eye-movement. Moreover, such a system relies on an unobstructed line-of-sight with respect to the display and a substantially constant distance from the display to the helmet-mounted equipment. The disclosed invention does not lend itself to be easily used by a human operator in an arbitrary (not predetermined) presentation setting.

U.S. Pat. No. 6,385,331 to 'Harakawa et al. (2002) discloses a system that uses infrared technology in combination with image recognition software to distinguish pointing gestures made by the presenter, without the need for an artificial pointing device. The disclosed system, however, requires the presentation room to be set up with highly tuned and sophisticated equipment, and is therefore not easily ported to a different venue.

U.S. Pat. No. 6,404,416 to Kahn et al. (2002) discloses a direct-pointing system where a handheld pointing device is equipped with an optical sensor. In such system either the display is required to be of a specific type (e.g., a cathode ray-based display that uses an electron beam) or the displayed image is required to be enhanced by timed and specific emanations. When pointed to the display, a handheld pointing device may detect the electron beam or the timed emanations, and the timing of these detections may then be used to ascertain the point-of-aim. The disclosed system is somewhat similar to the technologies used for so-called light guns in video games as disclosed, for example, in U.S. Pat. No. 6,171,190 to Thanasack et al. (2001) and U.S. Pat. No. 6,545,661 to Goschy et al. (2003). Of course, such systems require either a specific display apparatus or a specialized modification of the displayed images. Moreover, an uncompromised line-of-sight between the pointer and the display is a prerequisite for such systems.

U.S. Patent Application Publication No. 2002/0089489 to Carpenter (2002) discloses a direct-pointing system that, in one embodiment, positions a computer cursor at a light spot projected by a laser-pointer. The system relies on the use of an image capturing device to compare a captured image with a projected image. As such, the system disclosed in the '489 patent application publication makes use of calibration routines in which the user is required to highlight computer-generated calibration marks with the laser pointer. The system disclosed in the '489 patent application publication is not unlike a system disclosed in U.S. Pat. No. 5,502,459 to Marshall et al. (1996). Also, U.S. Pat. No. 5,654,741 to Sampsell et al. (1997), U.S. Pat. No. 6,292,171 to Fu et al. (2001), U.S. Patent Application Publication No. 2002/0042699 to Tanaka et al. (2002) and U.S. Patent Application Publication No. 2002/0075386 to Tanaka (2002) all disclose systems that can detect a light-spot using optical means. Such systems specifically generally require the use of computationally expensive image processing technologies. All of these inventions require a projection surface with adequate diffusion properties, as well as some form of optical system with a steady and uncompromised view of the display area. As such, they limit the freedom-of-movement of the presenter and place limitations on the position and optical characteristics of the necessary equipment. Also, in some of these inventions fast and involuntary movement of the user's hand may result in a cursor that does not move smoothly or a cursor•that does not perfectly track the light spot, causing possible confusion with the user.

Other pointing systems known in the art may be classified as other than entirely direct-pointing or indirect-pointing systems. Such systems include one disclosed in U.S. Pat. No. 6,417,840 to Daniels (2002), which is combination of a cordless mouse with a laser pointer. Although this system incorporates a direct-pointing device (i.e., the laser pointer), the method used by the system for interacting with the presentation is indirect (i.e., by means of the mouse) and therefore does not afford the fast and more accurate interactive pointing actions provided by some other direct-pointing systems described in some of the foregoing publications.

Another system known in the art that uses both direct and indirect-pointing methods is described in U.S. Pat. No. 6,297,804 to Kashitani (2001). The disclosed system is a system for pointing to real and virtual objects using the same pointing device. In the disclosed system, the pointing means switch between a computer controlled light source (e.g., a laser) and a conventional computer cursor, depending on whether or not the user's intended point-of-aim has crossed a boundary between the real and virtual display (i.e., computer-displayed imagery). Various methods are described to establish these boundaries. Although the computer-controlled light source may be regarded as pointing in a direct manner, its point-of-aim is essentially governed by the system operator using an indirect-pointing system such as a mouse. Thus, the disclosed system does not allow for the desired flexibility afforded by truly direct-pointing methods.

Other systems known in the art include those such as disclosed in U.S. Pat. No. 5,796,386 to Lipscomb et al. (1998), which discloses a calibration procedure to establish the relation between coordinate systems associated with a handheld device and, in one embodiment, a display unit. The system disclosed in the Lipscomb et al. '386 patent may arguably be applicable as a direct-pointing cursor control system. The disclosed calibration routine requires the user to register at least three 3 dimensional positions of the handheld device with a central processing unit. The disclosed system does not appear to include calibration methods for the case where the display unit is out of physical reach of the system operator. The system is thus not practical for use at an arbitrary venue.

U.S. Pat. No. 6,084,556 to Zwern (2000) discloses a head-mounted display unit that displays information governed by the orientation of the apparatus, as measured by a tracking device. This way, the system creates the illusion of a large virtual display that is being looked at by the system operator. Of course, the large display alluded to does not constitute a projected presentation. Also, no methods are disclosed in the Zwern '556 patent to establish the relative position of the head-mounted apparatus with respect to the display.

U.S. Patent Application Publication No. 2002/0079143 to Silverstein et al. (2002) discloses a system in which the position of a moveable display with respect to a physical document is established. The '143 patent application publication describes calibration routines in which the user is required to activate a registration button when the moveable display is over some predetermined position on the physical document. The disclosed system only relates to 2 dimensional applications and, moreover, cannot be used in situations where the interaction region is out of the system operator's physical reach.

U.S. Pat. No. 5,339,095 to Redford (1994) discloses an indirect-pointing system where the pointing device is equipped with non-directional microphone. Also, U.S. Pat. No. 5,631,669 to Stobbs et al. (1997) discloses the inclusion of a nondirectional microphone unit in an indirect-pointing device.

SUMMARY OF THE INVENTION

One aspect of the invention is a method for controlling a parameter related to a position of a computer display cursor based on a point-of-aim of a pointing device within an interaction region. The method includes projecting an image of a computer display to create the interaction region. At least one calibration point having a predetermined relation to the interaction region is established. A pointing line is directed to substantially pass through the calibration point while measuring a position of and an orientation of the pointing device. The pointing line has a predetermined relationship to said pointing device. The parameter related to the position of the cursor within the interaction region is controlled using measurements of the position of and the orientation of the pointing device.

Another aspect of the invention is a method for controlling a computer display cursor in an interaction region. According to this aspect, the method includes establishing a calibration point having a predetermined relation to the interaction region. At least one of a position and orientation of a pointing line is first measured while directing the pointing line to substantially pass through the calibration point. The first measurement is used to constrain a parameter of the calibration point. The pointing line has a predetermined relationship to at least one of position and orientation of a pointing device. A characteristic feature of the interaction region is used to establish a property of a common point of the pointing line and the interaction region measured relative to the interaction region. At least one of position and orientation of the pointing device is measured, and the characteristic feature of the interaction region and measurement of the pointing device are used to control the cursor on a computer display image.

Another aspect of the invention is a method for controlling a parameter related to position of a cursor on a computer screen image. The method according to this aspect includes measuring a first angle between a pointing line and a first line, and measuring a second angle between the pointing line and a second line. The first line is related in a predetermined way to a geographic reference, and the second line is related in a predetermined way to a geographic reference. The pointing line has a predetermined relation to said pointing device. A first parameter related to the first angle, and a second parameter related to the second angle are used to control the parameter of the cursor on said computer screen image, whereby the cursor position parameter is controlled by movement of the pointing device.

Other aspects and advantages of the invention will be apparent from the following description and the appended claims.

DETAILED DESCRIPTION

Figure 1:
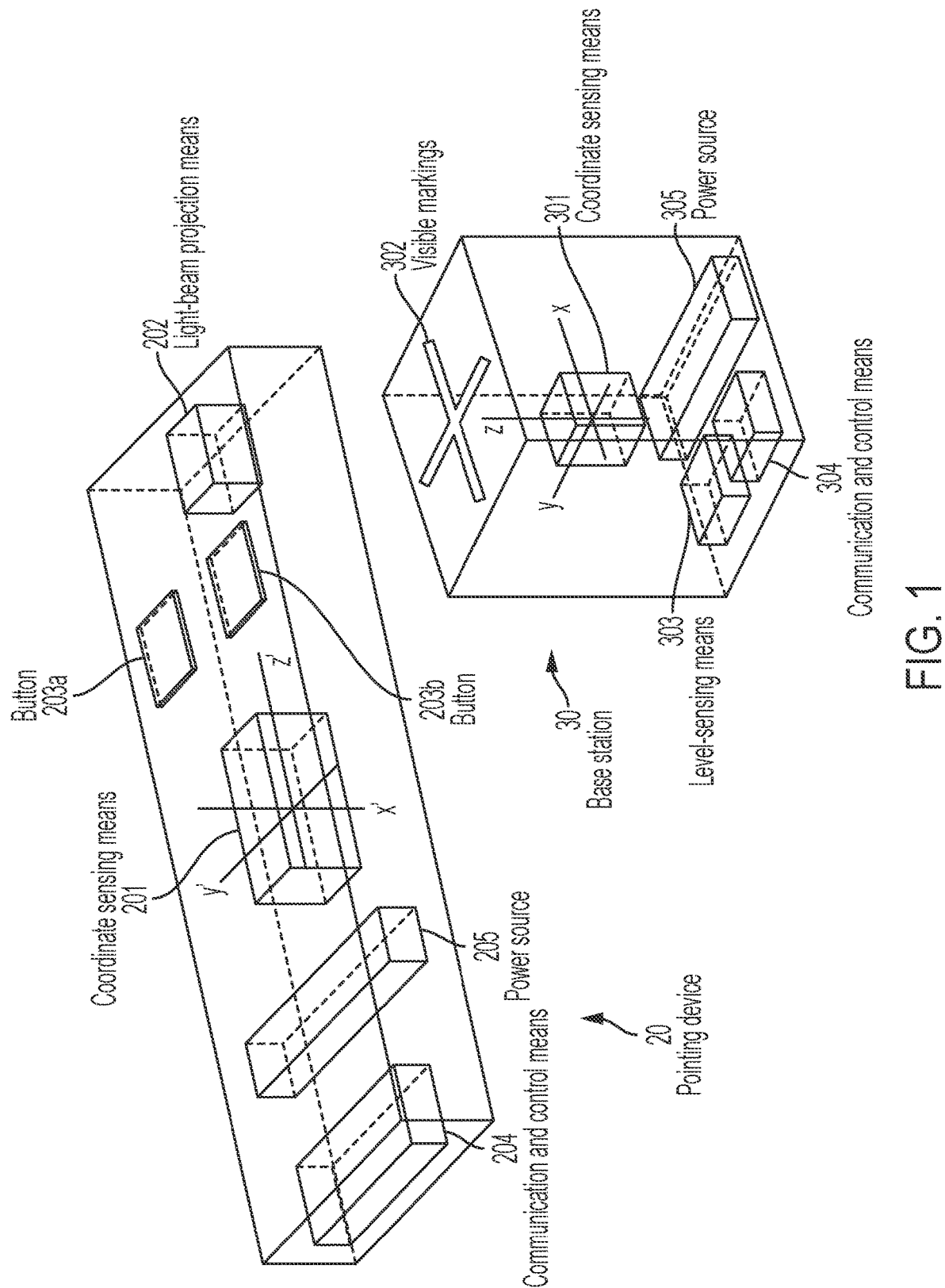
FIG. 1 shows a pointing device and base station according to a first embodiment.

A first embodiment of the invention will be described with reference to FIG. 1. A pointing device 20 has associated with it a coordinate system x'y'z'. A portable base station 30 has associated with it a coordinate system x y z. Pointing device 20 and base station 30 may be equipped with coordinate sensing devices, 201 and 301, respectively, that enable measurement of the 3 dimensional position and 3 dimensional orientation of pointing device 20 and, therefore, of a pointing line 21 (see also FIG. 2) that substantially intersects pointing device 20, all measured relative to the x y z coordinate system. Pointing line 21 may substantially coincide with the long axis of pointing device 20. For example, coordinate sensing devices 201 and 301 may be electromagnetic tracking devices, such as the 3SPACE FASTRAK® system, manufactured by Polhemus, a Kaiser Aerospace & Electronics Company, Colchester, Vt. Alternatively, coordinate sensing device 201 and 301 may be based on ultrasonic tracking systems such as those used in the LOGITECH 2D/6D computer mouse, commercially available from Logitech Inc., Fremont, Calif. Other embodiments for coordinate sensing device 201 and 301 may include, without limitation, sensors based on LEDs, CCDs, accelerometers, inclinometers, gyroscopes, compasses, magnetometers, etc. Also, combinations of such different types of sensors may be used to acquire redundant measurements for quality control purposes. For example, a controlled-source electromagnetic position tracking system may be combined with compasses and inclinometers. Those skilled in the art will appreciate that independent measurements of the Earth's magnetic field and gravity may be used to enhance the measurements made by a controlled-source position detecting system. In the invention, any system may be used that is capable of determining at least parts of the orientation and position in three dimensions, with respect to coordinate system x y z, of a line-segment that substantially intersects pointing device 20.

Base station 30 may comprise a plurality of related physical entities, such as described in U.S. Pat. No. 6,608,668 to Faul et al. (2003); for clarity of explanation one of these physical entities will be associated with coordinate system x y z and be denoted as base station 30, the center of which substantially coincides with the origin of coordinate system x y z. For purposes of explanation of the invention, the origin of coordinate system x'y'z' substantially coincides with the center of pointing device 20, and the z'-axis is substantially aligned with the long axis of pointing device 20.

Pointing device 20 may also be provided with a light-beam projector 202, for example a laser. The physical position and orientation of the projected beam of light with respect to coordinate system x'y'z' may be established with suitable accuracy at the place of manufacture of the pointing device 20 and may be presumed to be known. For purposes of explanation, the beam of light from the light beam projector 202 substantially coincides with the z'-axis. Additionally, one or more control buttons 203a, 203b or the like may be provided, as well as communication and control device 204. Communication and control device 204 may be used to control various features of pointing device 20 and may also communicate via wire, or wirelessly, with base station 30 and/or a central processing unit (not shown separately), such as a COMPAQ Armada M700 as manufactured by Hewlett Packard Company, Palo Alto, Calif. The central processing unit may also control a presentation with which user interaction is desired. For clarity. of the description which follows, the central processing unit will be referred to hereinafter as "the computer." Furthermore, pointing device 20 may include an internal power source 205, for example a battery, or instead may be connected such as by wire to an external power source.

In addition to coordinate sensing device 301, base station 30 may be provided with communication and control device 304. Communication and control device 304 may be used to control various features of base station 30. Communication and control device 304 may communicate with pointing device 20. and/or with the computer (not shown) that may control the presentation images. The communication and control device 304 may use wired or wireless technology. In the present embodiment communication with the computer occurs via a universal serial bus (USB) compatible device or the like (not shown). Communication and control device 304 may communicate wirelessly with a relay device (not shown) that communicates via a USB compatible device or the like with the computer (not shown) that may control the presentation with which user-interaction is desired. There may be visible markings 302 on base station 30 that indicate the orientation of one or more coordinate planes defined by prescribed relations between coordinates x, y, z, as well as features of the position of the origin of the x y z coordinate system. For example, a line may be used to indicate the z-x-plane of the x y z coordinate system, for which the y-coordinate is zero; another line may be used to indicate the z-y plane, for which the x-coordinate is zero. Base station 30 may be provided with a level sensing device 303 to determine whether or not one of the coordinate planes of coordinate system x y z is substantially horizontal. Level-sensing device 303 may measure two angles or equivalent characteristics that define the orientation of one of the coordinate planes of coordinate system x y z with respect to a horizontal surface. Level sensing device 303 can be a device such as disclosed in U.S. Pat. No. 6,466,198 to Feinstein (2002), which makes use of model ADXL 202 accelerometers sold by Analog Devices Inc., Norwood, Mass. The disclosed accelerometers provide tilt angle information depending on their inclination relative to Earth's gravity. It will be apparent to those skilled in the art that many other types of sensors may be used as embodiment for level-sensing device 303, for example, capacitance-type bubble levels. See, for example, U.S. Pat. No. 5,606,124 to Doyle et al. Finally, base station 30 may be equipped with a power source 305, for example a battery, or may have a connection to an external power source.

Figure 2:
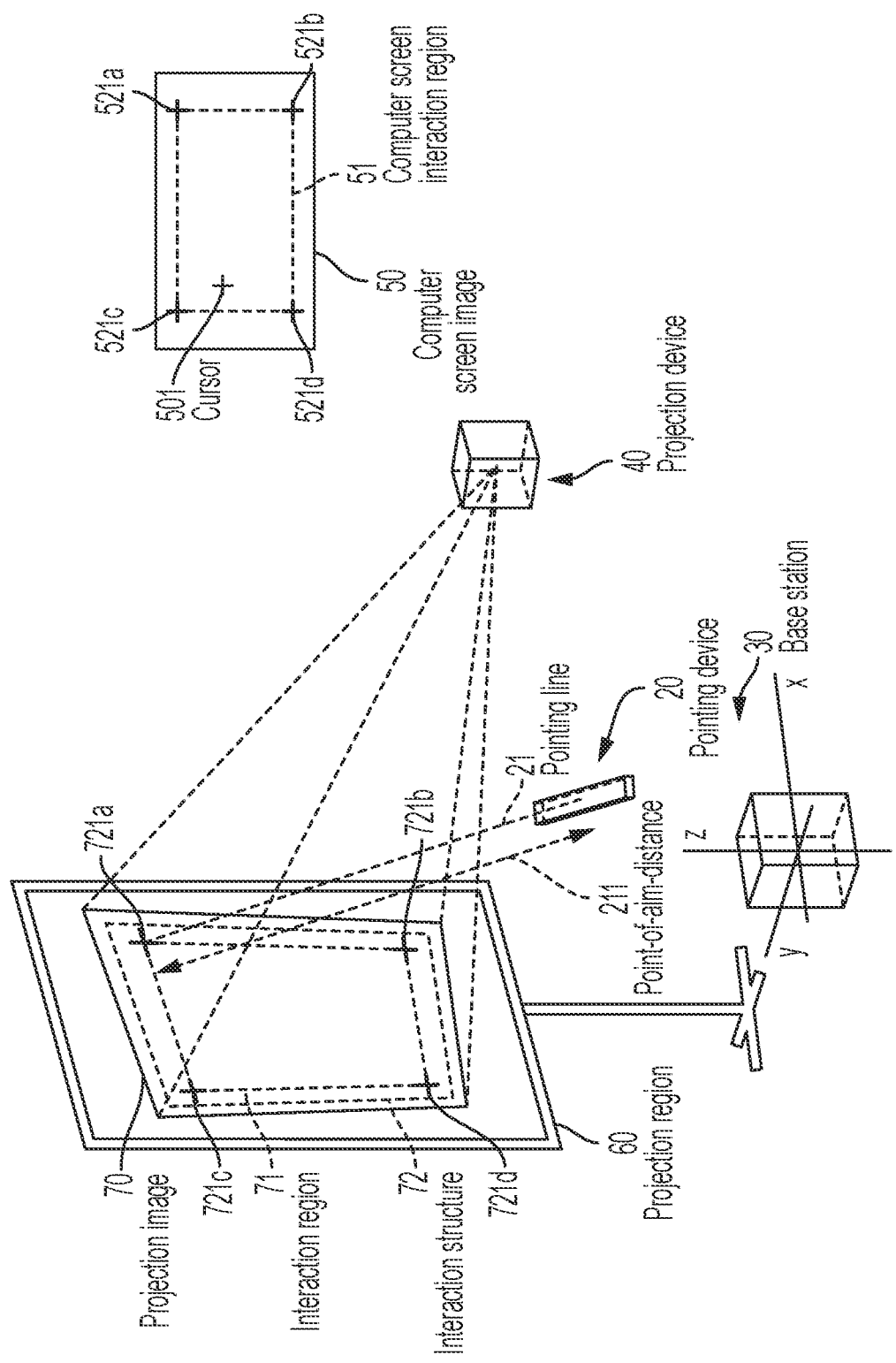
FIG. 2 shows a presentation venue and computer screen.

Referring to FIG. 2, a projection device 40 is arranged to project an image 50 generated by, for example, the computer (not shown). The projection device 40 may be used to generate a projection image 70 on a projection region 60. For example, projection device 40 may be a 2000 lumen projector, model XL8U, manufactured by Mitsubishi Corp. Projection region 60 may be a surface, such as a wall or a projection screen. The projection region 60 may define a flat plane or a may define a more elaborate 2 dimensional (2D) or even 3 dimensional (3D) structure. In FIG. 2, projection region 60 is shown as a screen, but this is only for purpose of illustrating the principle of the invention and is not intended to limit the scope of the invention. Alternatively the combination of projection device 40 and projection region 60 may be incorporated in one and the same physical device, such as a television receiver (cathode ray tube display), liquid crystal display (LCD) screen or the like.

There is a region of space that is designated as a region on which interaction with the user is desired. This region is denoted as the interaction region 71. The interaction region 71 may be flat (planar) or may be a more elaborate 2D or even 3D structure. The interaction region 71 may have features in common with projection image 70 and may be associated in some way with a computer screen interaction region 51. In the present embodiment, however, it will be assumed that interaction region 71 or a scaled version thereof, is substantially part of or substantially coincides with projection image 70. Moreover, it will be assumed in this embodiment that interaction region 71 substantially coincides with the projection of computer screen interaction region 51 as projected by projection device 40.

For display systems which include a separate projection device 40 and projection region 60, the optical axis of projection device 40 may not be aligned with any vector normal to projection region 60. Moreover, projection region 60 may not be flat and therefore may not even be a 2D shape. Consequently, projection image 70 and interaction region 71 may in general not be flat or rectangular, even if the imagery generated by the computer is scaled so as to be presented in rectangular form. In this embodiment, however, it is assumed that projection region 60, projection image 70 and interaction region 71 are substantially flat. Furthermore, it is assumed in this embodiment that interaction region 71 is substantially a quadrangle and that the associated computer screen interaction region 51 is substantially rectangular.

Additionally, calibration points 721a, 721b, 721c, 721d may be provided that may define characteristic features of interaction region 71. For example, interaction region 71 may be trapezoidal in shape, in which case calibration points 721a, 721b, 721c, 721d may define corners of interaction region 71 or corners of a scaled version thereof. Furthermore, screen marks 521a, 521b, 521c, 521d may be provided, and may but need not be associated with calibration points 721a-721d. For example, calibration points 721a-721d may coincide with the projected versions of screen marks 521a-521d and may in this way be identified by projection device 40. Calibration points 721a-721d may also be identified by other means than projection, for example by unique descriptions such as the 'upper right corner of interaction region 71', 'center of interaction region 71,' etc.

The operation of the present embodiment will now be described with reference to FIGS. 1,2 and 3. A display system is set up at the venue where a presentation is to made, which can be a combination of a portable projection device 40 and projection surface 60, for example a wall. The display system is connected, using appropriate interconnection devices, to the computer (which may be in the base station 30 or located elsewhere) that generates the presentation images.

The system user positions base station 30 at a convenient location, preferably not far from where the user intends to make the presentation display. The user may position base station 30 in such a way that one of the coordinate planes of the x y z coordinate system is substantially parallel or substantially coincident with projection region 60. The visual markings 302 may assist in such positioning. Subsequently, the user connects base station 30 to the computer (not shown), for example via a USB compatible device connection (not shown), or using a wireless relay device (not shown). The computer may be disposed in the base station 30 in some embodiments. In some embodiments, the computer may recognize the base station connection and start a program, part of which may be contained in the communication and control device 304, in communication and control device 204, or in control logic contained in the wireless relay device (not shown). Alternatively, the user may be required to load the program into the computer manually via a CD-ROM drive, a floppy drive, memory stick (USB mass storage device—not shown) or the like. However it is loaded into the computer, the program may initiate a calibration routine that has as its object establishment of the shape, position, size and orientation of a defined interaction structure 72 relative to the x y z coordinate system. The interaction structure 72 is assumed to substantially coincide with interaction region 71. The operation of the program will now be explained with reference to FIG. 3.

At B0a the program is initiated. During step B0b a default assumption is made regarding interaction region 71. Specifically, interaction region 71 is assumed to substantially coincide with a well-defined interaction structure 72 (FIG. 2 shows an interaction region 71 and an interaction structure 72 that are clearly not identical; this difference is however only meant as an example, and as a practical matter is preferably as small as possible). At B0b default values are entered for the orientation and position of this interaction structure 72. For example, the default setting may assume interaction region 71 to substantially coincide with an interaction structure 72 that is a (flat) quadrangle positioned in a vertical plane that substantially intersects the origin of the x y z coordinate system associated with base station 30. As another example, the default setting may provide that interaction region 71 substantially coincides with an interaction structure 72 that is an isosceles trapezoid of which the parallel edges are horizontal and of which the position is unknown. Using such default values, calibration points 721a-721d not only define characteristic features of interaction region 71 but also of interaction structure 72.

At 80c a decision is made whether the default values for interaction region 71 and interaction structure 72 should be accepted or overridden by the user. In making this decision, input from level-sensing device 303 and visible markings 302 on base station 30 may be used. If the defaults are to be accepted, the program continues to 80*j*, the details of which are explained below with reference to FIG. 4. If the defaults are overridden, the program continues at Sod to 80*i*, during each of which the user may override any of the default settings. The user may be aided during any of 80*d* to 80*i* by a library of predetermined shapes, predetermined orientations and/or predetermined positions, or the user can be provided by the program with the capability to construct custom shapes, orientations and/or positions. In any case, the program continues to 80*j*.

It will be appreciated by those skilled in the art that once an assumption has been made regarding the shape of interaction structure 72, it is possible to construct a set of three dimensionally distributed points in space that completely determines the 3D position, orientation and size of the interaction structure 72. The number of points in the set will depend on the complexity of the assumed shape and the ingenuity with which the points are chosen. For example, a rectangular shape that is arbitrarily oriented in space is completely determined by a set of 3 points that coincide with 3 of its corners, but is also completely determined by a set of 8 points, pairs of which may determine each of the four edges of the rectangle.

Figure 3:
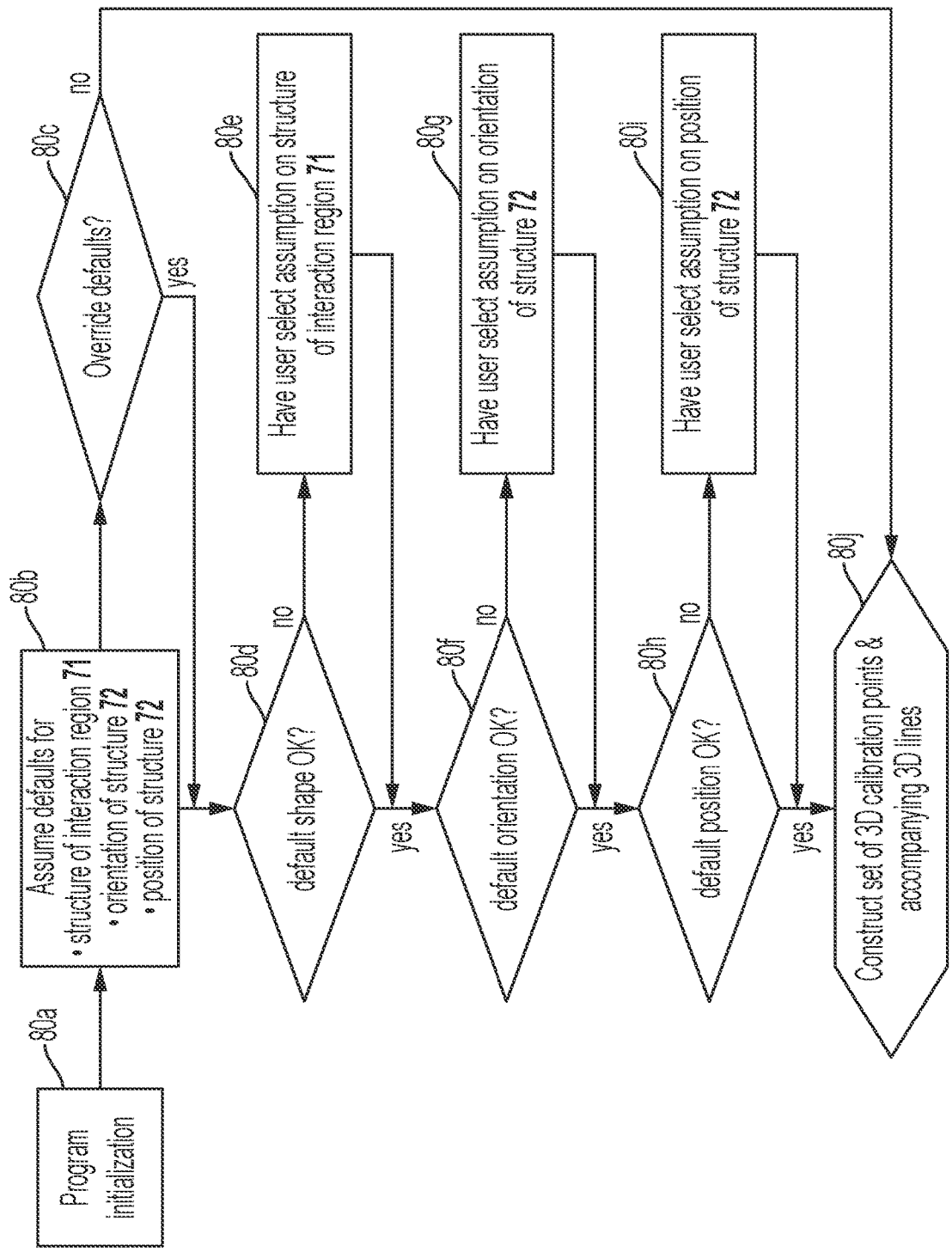
FIG. 3 shows program steps for selection of appropriate assumptions according to embodiments 1, 2 and 3.
Figure 4:
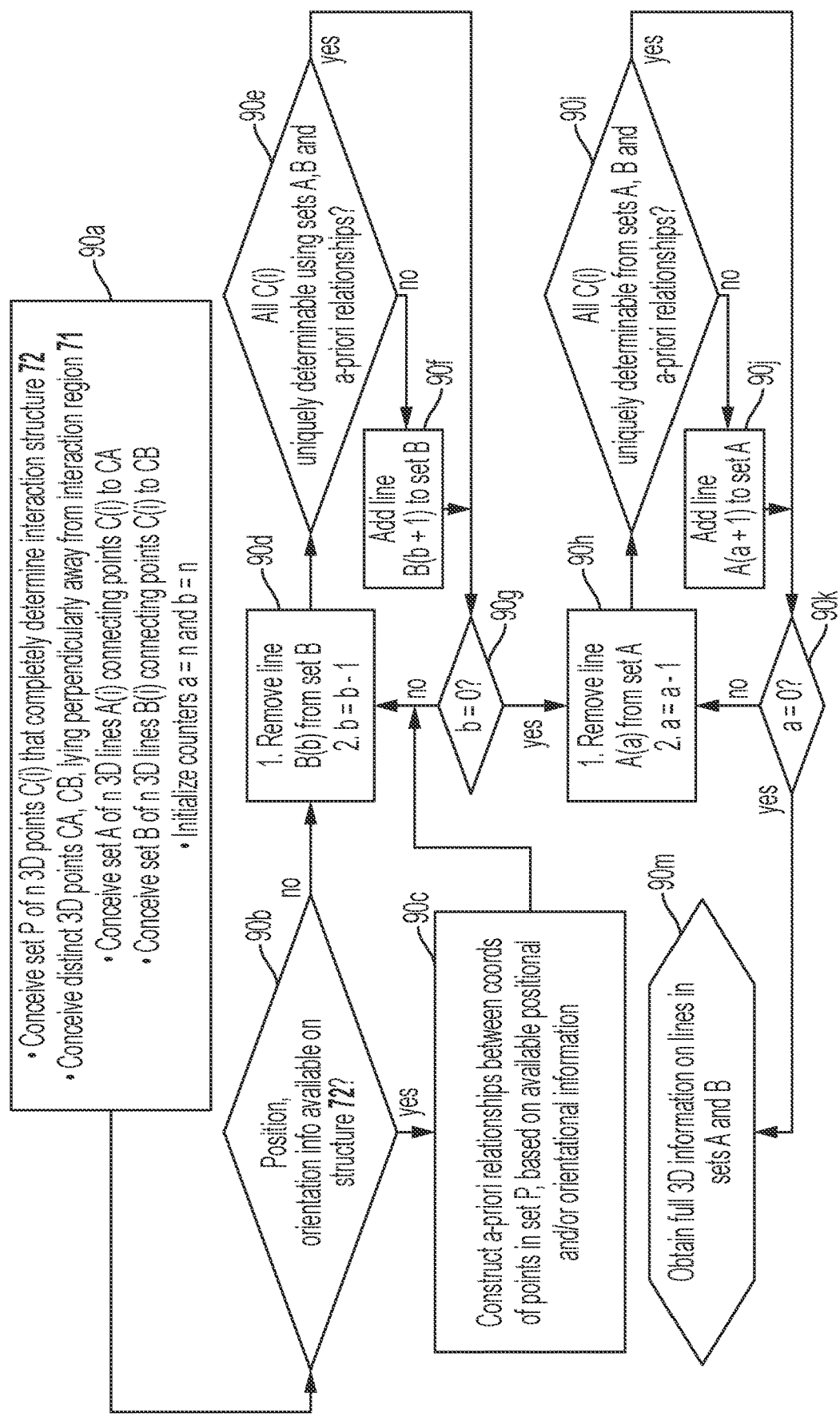
FIG. 4 shows program steps for construction of information set according to a first embodiment.

Referring to FIG. 4, describing details of program element 80*j*, the computer program continues at 90*a*, at which a set P is generated that includes a quantity n of points in space, each represented as $C(i)$ $(0<i<n+1)$, that uniquely determine interaction structure 72, together with descriptions of their roles in determining this structure. For example, if the program elements outlined in FIG. 3 reveal that interaction region 71 is assumed rectangular, set P may hold three points described as the upper-left corner, the lower-left corner and the upper-right corner of a rectangular interaction structure 72. If, alternatively, the projection of computer screen interaction region 51 is substantially rectangular, and this projected rectangle has the same center but is physically two times smaller than interaction structure 72, the three points may be described as the upper-right corner, the lower-left corner and the lower-right corner of a rectangle that has the same center but is two times smaller than interaction structure 72. Thus, by carefully choosing the points in set P together with their description, any interaction structure 72 may be completely determined.

In addition to set P, a 3D point CA and another 3D point CB are determined at 90*a*. These additional 3D points are determined so as to lie away from interaction region 71, that is, they lie at some distance out of the plane that is closest to. or substantially contains interaction region 71. The distance may be comparable to an edge of projection image 70. For example, point CA may be determined to lie near projection device 40 and point CB may be determined to lie at a distance from point CA that may be equal to the distance between projection device 40 and projection surface 60 measured substantially parallel to projection surface 60. Other choices for point CA and point CB may also be used. Additionally, sets A and B are generated during step 90*a*. Set A includes a number n of lines $A(i)$, each of which connects point CA to one of the points $C(i)$ $(0<i<n+1)$ in set P. Likewise, set B holds a number n of lines $B(i)$, each of which connects point Ca to one of the points $C(i)$ $(0<i<n+1)$ in set P. Finally, at 90*a*, counters a, b are both initialized to the value of n.

Flow then continues on to step 90*b*, where a decision is made whether the program elements outlined in FIG. 3 have revealed any information on the 3D position and orientation of interaction structure 72. If the decision is positive flow continues to step 90*c*, where this information is used to establish a priori relationships between the coordinates of the points in set P. For example, the steps outlined in FIG. 3 may have revealed that interaction structure 72 is assumed to coincide with the x-z plane, in which case the a priori relationships may include the requirement that the y-coordinates of all points in set P are equal to zero. A pre-set library of a priori relationships may be provided to aid in the execution of this program element.

The program continues to 90*d*, which may also be reached from gob if the decision at gob is negative. At 90*d*, line $B(b)$ is removed from set B, after which counter b is decremented by 1.

The program continues to 90*e*, where a decision is made whether complete 3D information on the lines in sets A and B, together with a priori information, constitutes enough information to uniquely determine the coordinates of all the points in set P. For example, the program elements outlined in FIG. 3 may have determined that interaction region 71 is assumed to be rectangular, but no information is known regarding its orientation or position. In this case set P may contain three points, corresponding to three corners of a rectangular interaction structure 72. Each point $C(i)$ $(0<i<4)$ in set P would then be uniquely determined by the intersection of a line from set A and a line from set B if and only if sets A and B contained three lines each.

If the decision at 90*e* is negative, the program continues to 90*f*, where line $B(b+1)$ is added once more to set B.

If the decision at 90*e* is positive, program flow continues to 90*g*. The program flow may also continue from 90*f* to 90*g*. At 90*g* a decision is made whether counter b has reached zero, in which case the lines left in set B (which number may be equal to zero) are deemed necessary for unique determination of the coordinates of all the points in set P. If the decision at 90*g* is positive, program flow continues to 90*h*. If the decision at 90*g* is negative, program flow reverts to god.

During 90*h*, line $A(a)$ is removed from set A, after which counter a is decremented by 1. Program flow then continues to 90*i*, where a decision is made whether complete 3D information on the lines in sets A and B, together with the a priori information, constitute enough information to uniquely determine the coordinates of all the points in set P.

If the decision at 90*i* is negative, program flow continues to step 90*j*, where line $A(a+1)$ is added once more to set A.

If the decision at 90*i* is positive, program flow continues to step 90*k*. The program flow also continues from 90*j* to 90*k*. At 90*k*, a decision is made whether counter a has reached zero, in which case the lines left in set A (which number may be equal to zero) are deemed necessary for unique determination of the coordinates of all the points in set P. If the decision at 90*k* is negative, program flow reverts to 90*h*. If the decision at 90*k* is positive, program flow continues to 90*m*, the details of which are described with reference to FIG. 5.

Figure 5:
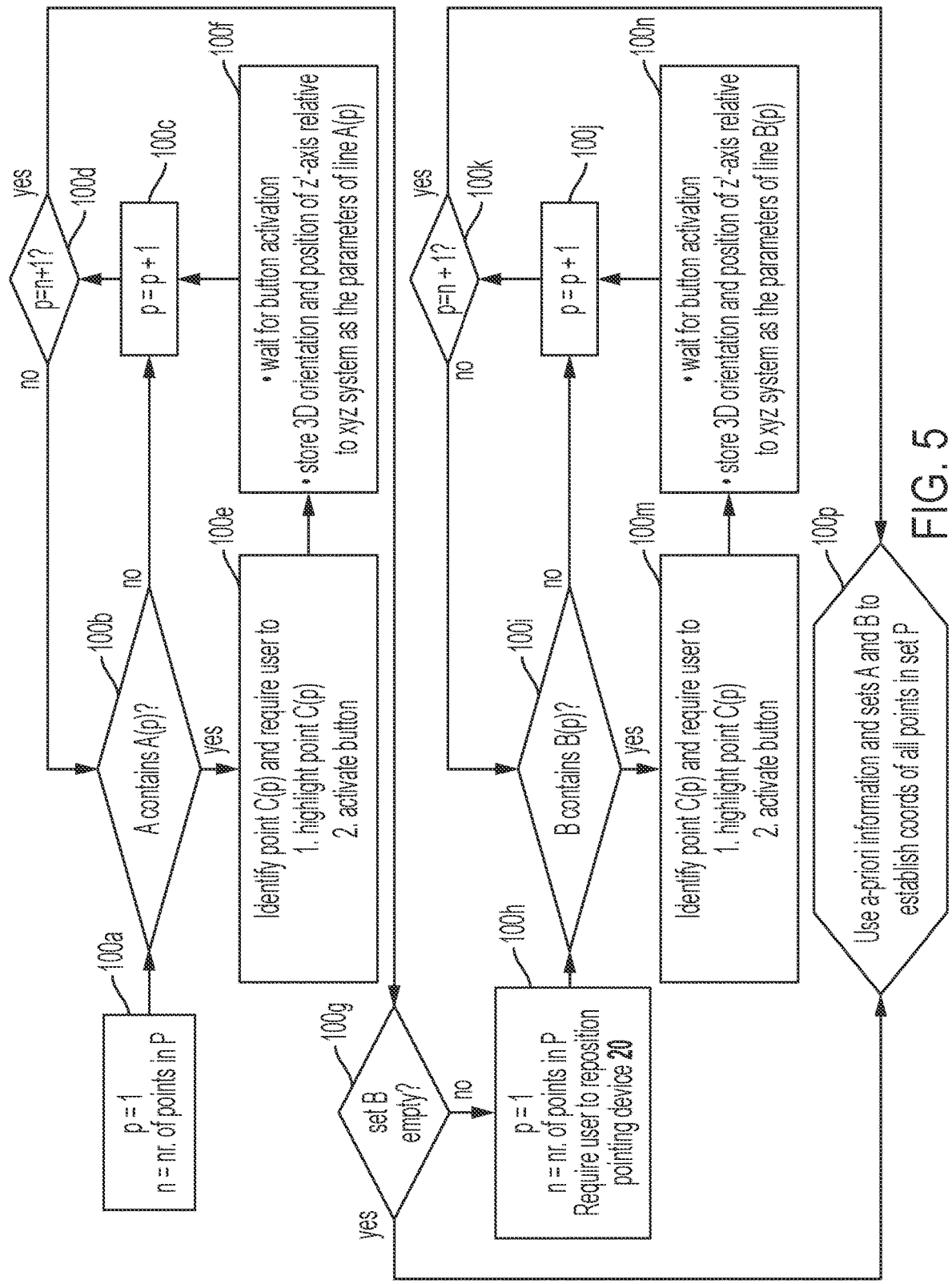
FIG. 5 shows program steps for ascertaining necessary 3D data according to a first embodiment.

In FIG. 5, the program continues to 100*a*, where counter p is initialized to 1 and variable n is set to the number of points in set P.

Program flow then continues to 100*b* where a decision is made whether line $A(p)$ (connecting point CA to point $C(p)$) is included in set A. If the decision is negative, program flow continues to 100*c*, where counter p is incremented by 1.

If the decision at 10 Gb is positive, program flow continues to woe, at which the program identifies point $C(p)$ to the user and then can query the user to highlight this point using light-beam projection device 202, preferably from a position such as point CA, as determined previously at 90a (FIG. 4). The user can also be queried to affirm the highlighting action by, for example, activating one of the buttons 203a or 204b, or the like. The identification of point C(p) may occur, for example, by having the program display a visible screen mark 521a-521d at a position on computer screen interaction region 51 associated with C(p), which may then be projected by projection device 40 to coincide with point C(p). Other means of identification are also possible, such as the characterization of point C(p) as 'upper-right corner' or the like.

Program flow then continues on to 100f, where the program can wait until the highlighting action is affirmed by the user, after which the 3D orientation of the z'-axis and the 3D position of the z'=0 point (of the z'-axis) are measured with respect to the x y z coordinate system, using coordinate sensing device 201 and 301, and communicated to the computer using communication and control device 204 and/or 304. This 3D orientation and position is then associated with line A(p) and stored in memory. Program flow then continues to 100c.

After 100c program flow continues to 100d where a decision is made whether p is equal to n+1. If the decision is positive, it can be concluded that all necessary data on lines A(p) have been ascertained and program flow can continue to 100g. If the decision at 100d is negative, program flow reverts to 100b.

At 100g a decision is made whether set B is empty. If the decision is positive, it can be concluded that enough information to uniquely determine the 3D coordinates of all the points in set P is contained in the a priori relationships combined with the available data on the lines in set A, and program flow continues to loop. If the decision at 100g is negative, program flow continues to 100h.

At 100h counter p is again initialized to 1. The user is subsequently required to reposition the pointing device 20 to a different location, displacing it substantially parallel to projection region 60 over a distance substantially equal to the distance between projection region 60 and his or her present location. Other locations may also be used.

Flow then continues to 100i where a decision is made whether line B(p) (connecting point CB to point C(p)) is included in set B. If the decision is negative, program flow continues to 100j where counter p is incremented by 1.

If the decision at 100i is positive, program flow continues to loom, at which point the program identifies point C(p) to the user and can query the user to highlight this point using light-beam projection device 202. The program can also query the user to affirm the highlighting by, for example, activating one of the buttons 203a or 204b or the like. The identification of point C(p) may occur, for example, by having the program display a visible screen mark 521a, 521b, . . . at a position on computer screen interaction region 51 associated with C( ), which may then be projected by projection device 40 to coincide with point C(p). Other means of identification are also possible, such as the characterization of point C(p) as 'upper-right corner' or the like.

Program flow then continues to loon, where the program may wait until the highlighting action is affirmed. After affirmation, the 3D orientation of the z'-axis and the 3D position of the point z'=0 (of the z'-axis) are measured with respect to the x y z coordinate system, using coordinate sensing device 201 and 301, and are communicated to the program using communication and control device 204 and/ or 304. The 3D orientation and position are then associated with line B(p) and can be stored in memory. Program flow then continues to 100j.

After 100j program flow continues to look where a decision is made whether p is equal to n+1. If the decision is positive, it is concluded that all necessary data for lines B(P) has been ascertained and program flow continues to loop. If the decision is negative, program flow reverts to 100i.

At 100p it is concluded that the combined information of the a priori relationships and the data for lines in sets A and B that is stored in memory is enough to establish the coordinates of all points in P, as is further explained with reference to FIG. 6.

Figure 6:
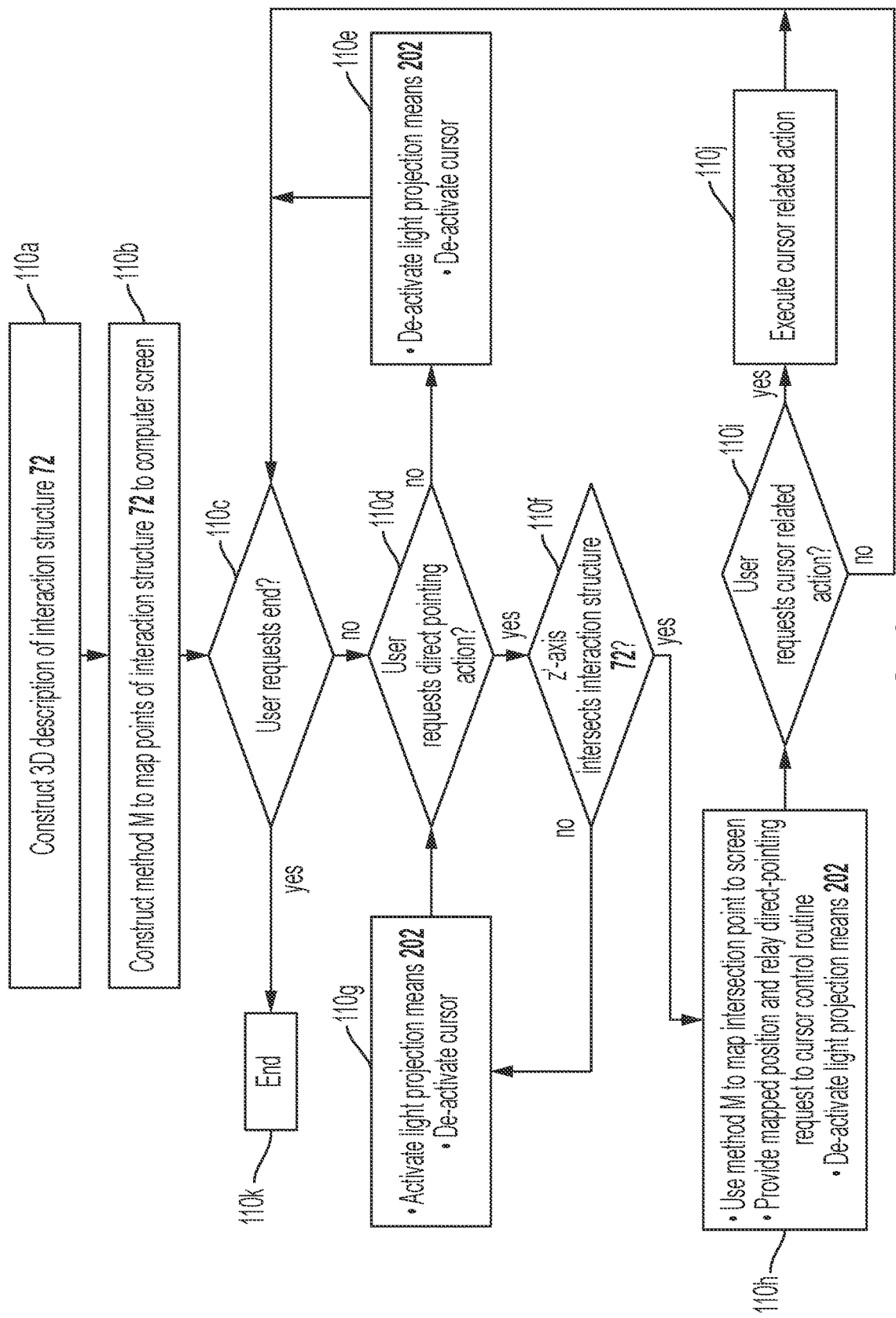
FIG. 6 shows program steps for control of pointing device elements and computer cursor according to several embodiments.

Referring to FIG. 6, as will be appreciated by those skilled in the art, at 110a the available information contained in the a priori relationships and the orientations and positions of the lines in sets A and B may be used to establish the coordinates of each of the points in set P, all measured with respect to the x y z coordinate system. It may happen that the 3D data associated with lines A(p) and B(p) (1<p<n+1) cause them not to intersect at point C(p); for example, this could be the case due to insufficient accuracy in determining the orientations and positions of lines A(p) and B(p). Under such circumstances point C(p) may be estimated or determined in such a way that it lies halfway along the shortest line-segment that connects lines A(p) and B(p). Other methods for determining point C(p) are also possible.

Figure 20:
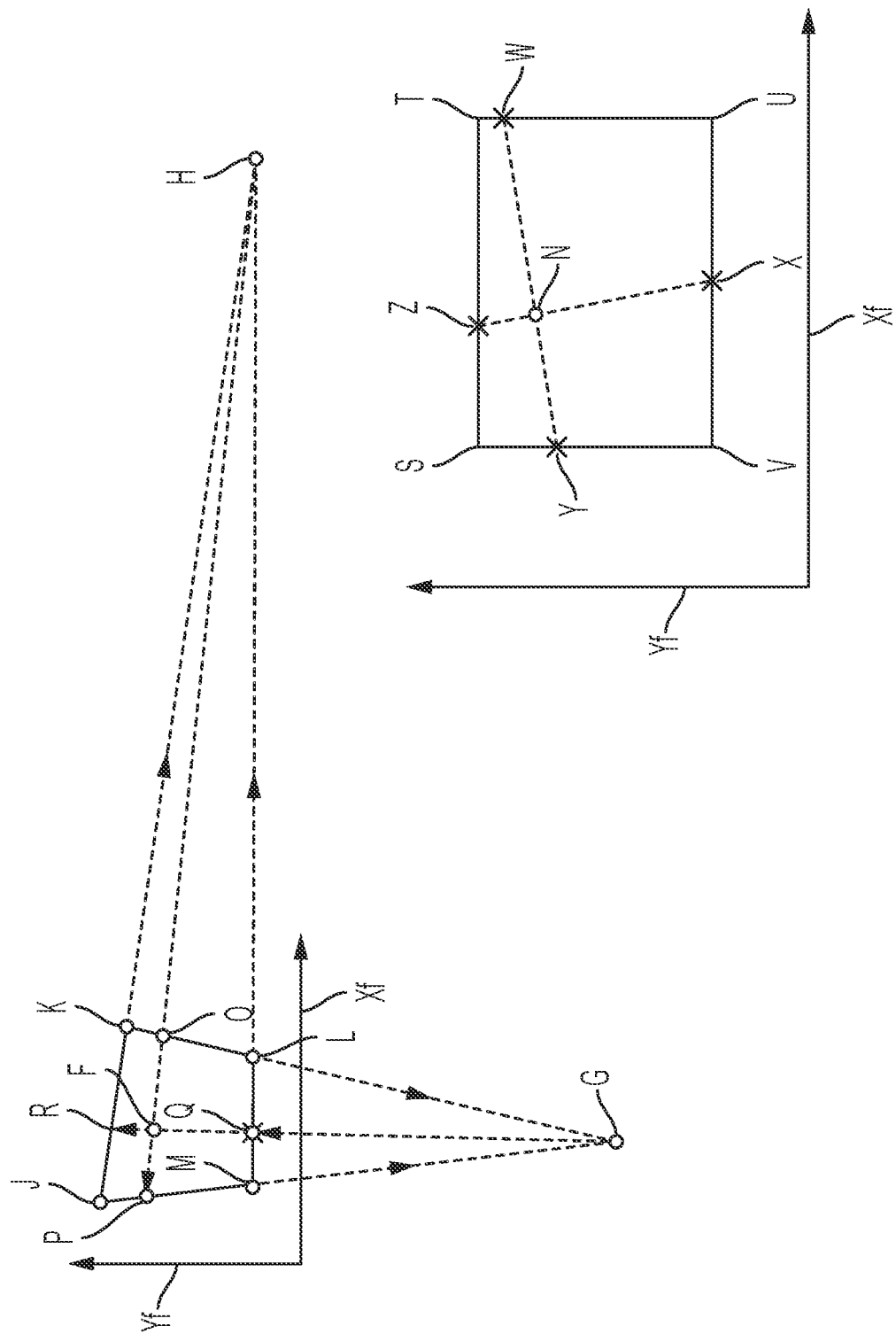
FIG. 20 shows a prior art: construction of method M for a quadrangle.

Once the complete 3D description of interaction structure 72 has been established (given the available data and assumptions), program flow continues to nob. At nob, a method M is constructed that maps points of interaction structure 72 to computer screen interaction region 51. Such methods are well known to those skilled in the art. For example, a method such as that described in U.S. Pat. No. 6,373,961 to Richardson et al. (2002) may be used, but other appropriate methods may also be used. For completeness, the method disclosed in the Richardson et al. '961 patent will briefly be explained here. Referring to FIG. 20, interaction structure 72 may be defined by line segments JK and ML. Furthermore, point F may define point-of-aim 210, which is also the intersection between the z'-axis and interaction structure 72. The line segments JK and ML are generally not parallel. If not parallel, then the line segments JK, ML are extended until they meet at a point H. Then a line is drawn through F and H, that intersects segment JM at point P and segment KL at point O. If the segments JK. and ML are parallel, the a line is drawn instead through F that is parallel to JK, and which intersects the other two line segments as described. The process continues similarly with the other segments, which are extended to meet at point G. A line through F and G intersects segment JK at point R and segment ML at point Q. Subsequently, the following distances are measured and noted as percentages: JR/JK, KO/KL, LQ/LM and MP/MJ. Then four points S, T, U, V are chosen as shown in FIG. 20, that form an exact rectangle STUV; this rectangle may define computer screen interaction region 51. Further, points W, X, Y, Z are chosen on the sides of the rectangle STUV in such a way that SZ/ST=JR/JK, TW/TU=KOIKL, UX/UV=LQ/LM and VY/VS=MP/MJ. Then the points Z and X are joined by a line, and the points Y and W are joined by a line. The point of the intersection of these latter two lines is N, which is the point that results from the operation of method M.

Referring once again to FIG. 6, after nob, program flow continues to 110c where a decision is made whether the user has requested the program to end. If the decision is positive, the program ends at 110k.

If the decision at 110c is negative, program flow continues to 110d, where a decision is made regarding whether the user has requested a direct-pointing action, such as activating button 203a or 203b or the like.

If the decision at 110d is negative, program flow continues to 110e, where the light-beam projection device 202 can be instructed or caused to de-activate (using, for example, control device 204 and/or 304). Furthermore, a software routine (not shown) that controls computer cursor 501 (see also FIG. 2) is instructed that the user does not want to execute a direct-pointing action, after which program flow reverts to 110c. Such cursor control routines are well known to those skilled in the art and are therefore not described here.

If the decision at 110d is positive, program flow continues to 110f, where a decision is made whether the z'-axis intersects interaction structure 72. Those skilled in the art will appreciate that this is possible because all relevant 3D information is known or is measurable by coordinate sensing device 201 and 301. If the decision is positive, program flow continues to 110h, at which method M is used to map the intersection point of the z'-axis with interaction structure 72 to computer screen interaction region 51. This mapped position, as well as the user's desire to execute a direct-pointing action, are communicated to the cursor control routine (not shown) running on the computer.

After 110h, program flow continues to 110i where a decision is made whether the user wishes to execute an action associated with the position of cursor 501. For example, activating button 203a or 203b or the like may indicate such a request. If the decision is negative, program flow reverts to 110c.

If the decision at 110i is positive, program flow continues to 110j, where the cursor control routine (not shown) is requested to execute the intended action. Such an action may, for instance, be a 'double-click' action or the like. Program flow then reverts to 110c.

There may be situations for which the system of equations that allows determination of all coordinates of the points in set P will be somewhat ill-posed. This could for example occur if locations CA and CB are chosen too close together, or if the angles of some pointing lines 21 with respect to interaction region 71 are too small, as will be appreciated by those skilled in the art. In such cases, the user may be directed to choose a different point for locations CA and/or CB from where the various points C(p) are to be highlighted.

Thus, methods and means are disclosed that afford a highly flexible and easily deployable system for interacting with a presentation in a direct-pointing manner at a location not specifically designed or adapted for such a purpose. Moreover, although it is desirable to have highly accurate coordinate sensing device 201 and 301, in some instances such may not be necessary because the visual feedback afforded by a displayed cursor will compensate to a large extent for any errors made in the measurements of coordinate parameters. The same holds true for the importance of any discrepancies between the actual shape of interaction region 71 and that of the interaction structure 72 that is assumed to coincide with it. Also, minor discrepancies between the actual position and orientation of interaction region 71 and the assumed position and orientation of interaction structure 72 (which is assumed to coincide with interaction region 71) need not be of critical importance, as will be appreciated by those skilled in the art.

Mathematically, there are infinite possible shapes for interaction structure 72 as well as infinite a priori relationships, sets P, A, B and methods M. To further explain the invention, what follows is a list of examples that are believed will be encountered most often. These examples are not meant to restrict the scope of the present invention in any way, but merely serve as further clarification.

Figure 7:
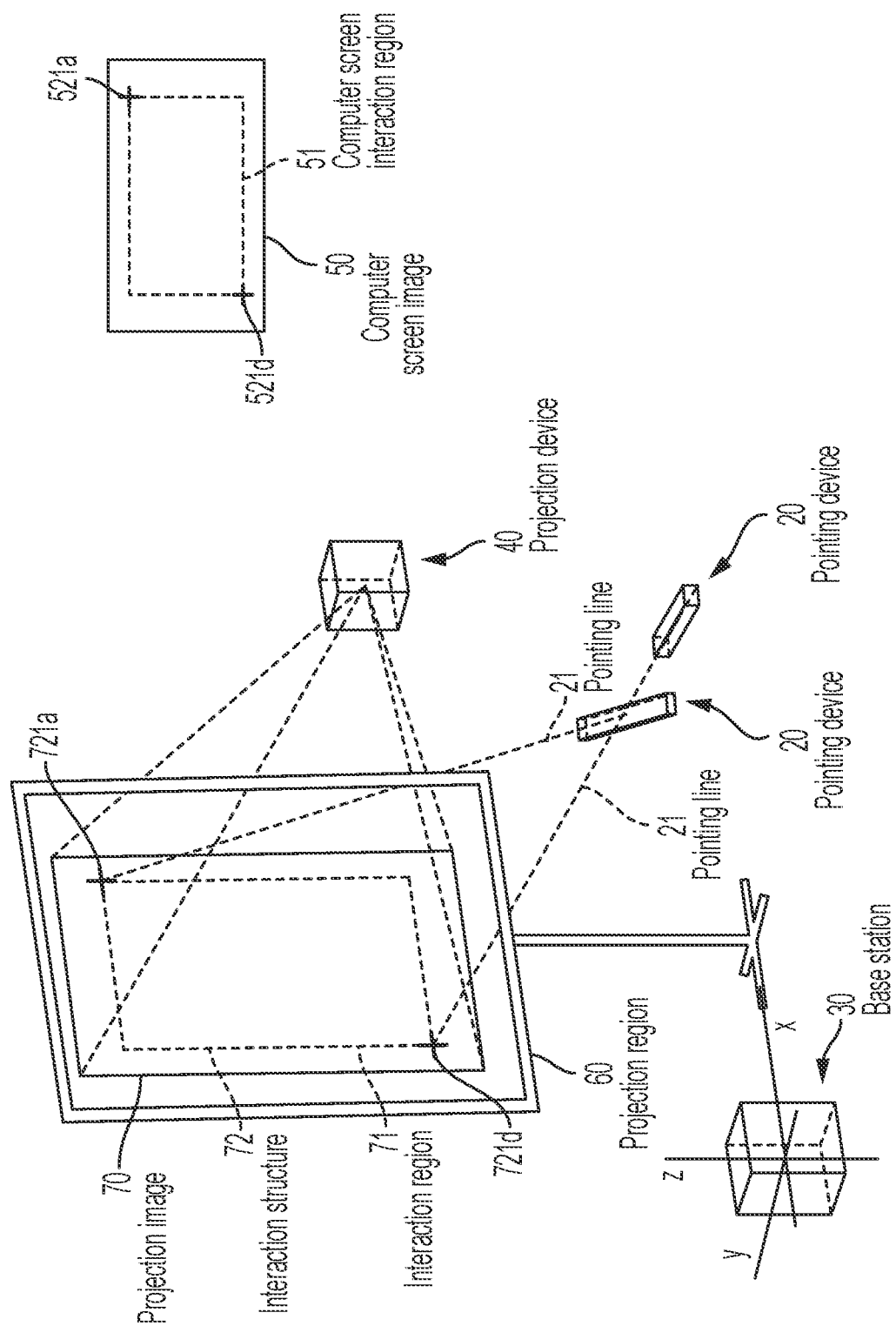
FIG. 7 shows one example of a first embodiment.

Referring to FIG. 7, it can be assumed that the venue where the presentation is to be made is set up such that projection image 70 and interaction region 71 are substantially rectangular. Such may be the case when the optical axis of projection device 40 is substantially parallel to the normal to projection region 60. Projection region 60 may be a projection screen on a stand, as shown, but may also be a wall or any other substantially vertical surface. It can also be assumed that the bottom and top edges of both projection image 70 and interaction region 71 are substantially horizontal. Furthermore, it can be assumed that interaction region 71 is substantially the same size as projection image 70 and that computer screen interaction region 51 is substantially the same size as computer screen image 50. Additionally, it can be assumed that calibration points 721a, 721d substantially coincide with the projected versions of screen marks 521a, 521d. Finally, it is assumed that base station 30 is positioned such that the x-y plane is substantially horizontal and the x-z-plane substantially coincides with the plane of interaction region 71. To facilitate in the positioning of base station 30, the user may•be aided by level-sensing device 303 and visible markings 302.

Referring to FIGS. 3 and 7, process elements 80a-j may then result, either through default settings or through user-supplied settings, in the assumptions that interaction structure 72 is a rectangle that lies in the x-z plane and that its top and bottom edges are parallel to the x-y plane.

Referring to FIGS. 4 and 7, program element 90a may then result in a set P containing three points that define the upper-right corner C(i), the upper-left corner C(2) and the lower-left corner C(3) of interaction structure 72. Additionally, program element 90a may determine point CA (not denoted as such in FIG. 7) to lie away from projection region 60, for example at the center of one of the two instantiations of pointing device 20, as shown in FIG. 7. Point CB may be determined anywhere in space. Program element 90a may also result in sets A and B each containing three lines, connecting the points in set P to points CA and CB respectively. Program element 90c may then result in a priori relationships such that all points in set P have y-coordinate equal to zero, that the upper-left corner will have an x-coordinate equal to the x-coordinate of the lower-left corner and that its z-coordinate will be equal to the z-coordinate of the upper-right corner. It will then be appreciated by those skilled in the art that this a priori information, together with complete 3D information on two lines in set A will be sufficient to uniquely determine the position, size and orientation of interaction structure 72 with respect to the x y z coordinate system. Therefore, program elements god, 90e, 90f, 90g may result in an empty set B. Moreover, program elements 90b, 90i, 90j, 90k may result in the removal from set A of line A(2), connecting point CA to point C(2).

Referring to FIGS. 5 and 7, program elements 100a-p may result in the program identifying point C(1) by instructing the computer (not shown) and projection device 40 to project screen mark 521a onto projection region 60, resulting in the appearance of calibration point 721a. Subsequently, the user is required to use light-beam projection device 202 to highlight calibration point 721*a* and indicate the success of this action to the computer (not shown) by, for example, pressing button 203*a*. As a result, the orientation and position of the z'-axis are assumed to define line A(1). The same actions are then performed for point C(3) and line A(3). Since set B is empty, the user need not be required to reposition pointing device 20. The two depictions of pointing device 20 in FIG. 7 are meant to illustrate that pointing device 20 only needs to be redirected and not repositioned during this exercise. It will be appreciated by those skilled in the art that program element loop will then successfully result in a full 3D description of the three points in set P.

Referring to FIGS. 6 and 7, program element 110*a* may then result in the description of interaction structure 72 as a rectangle with upper-right corner C(I), upper-left corner C(2) and lower-left corner C(3). Step 110*b* may then result in a method M that maps a point δ (not shown) in interaction structure 72 to a point c (not shown) in computer•screen interaction region 51 in such a way that the ratio of distances between δ and any two of the four corners of interaction structure 72 is the same as the ratio of distances between c and the two corresponding corners of computer screen interaction region 51, as will be appreciated by those skilled in the art. Steps 110*c*-*k* may then result in a very intuitive cursor control device that responds to a direct-pointing action by deactivating light-beam projection device 202 and showing cursor 501 at substantially point-of-aim 210 of pointing device 20 whenever point-of-aim 210 lies in projection image 70 (which in this example, by assumption, substantially coincides with interaction region 71). Since there is no necessity for a computer generated cursor and a light spot to be visible simultaneously there will not be any cause for confusion as to which of the two is the 'actual cursor'. Cursor 501 may be hidden from view when point-of-aim 210 does not lie in interaction structure 72, in which case light-beam projection device 202 may be activated automatically. Also, intuitive actions such as 'double click' may be provided by steps 110*c*-*k*.

Figure 8:
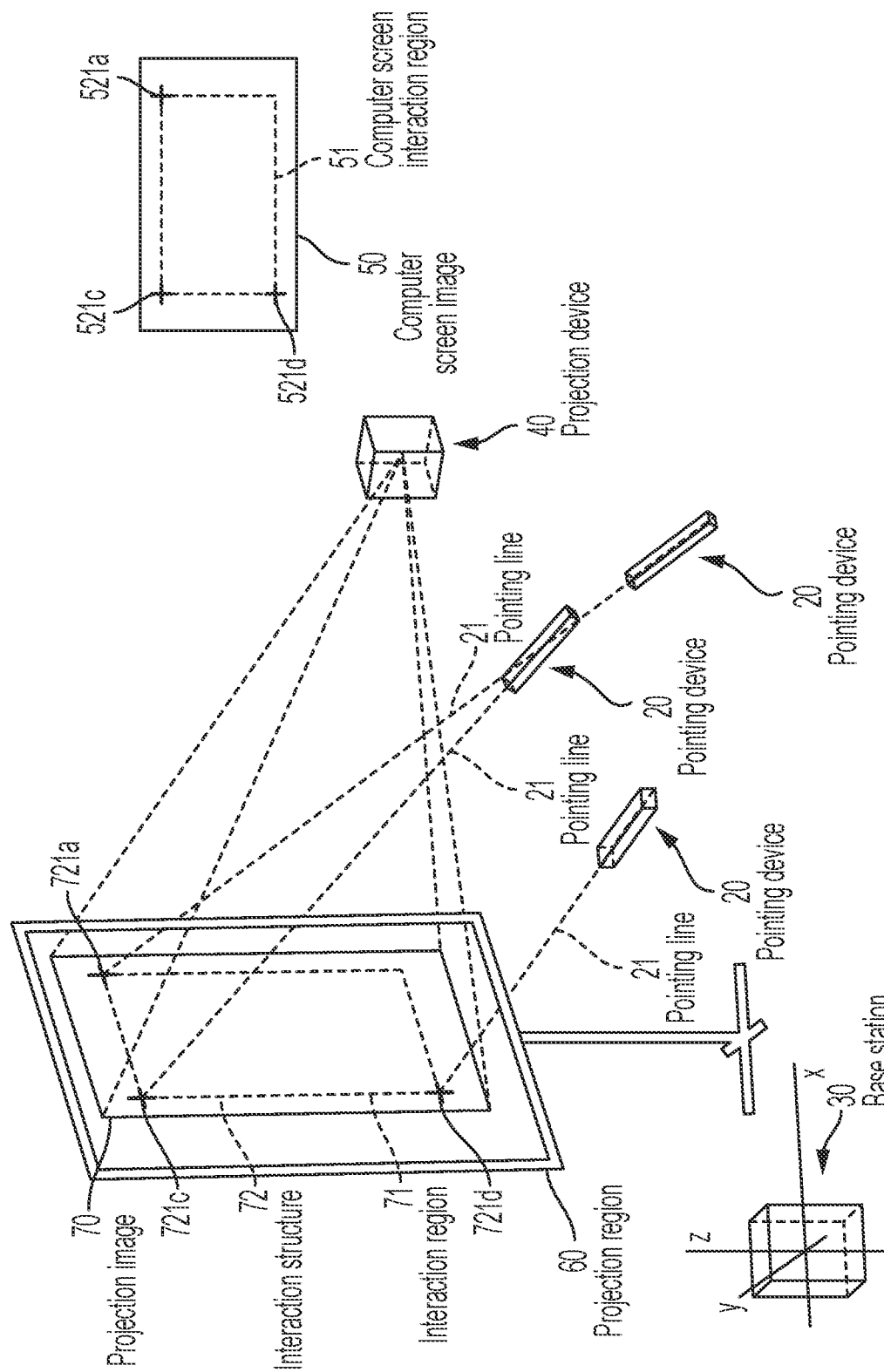
FIG. 8 shows a second example of one embodiment of the invention.

Referring to FIG. 8, it can be assumed that the venue where the presentation is to be given is set up such that projection image 70 and interaction region 71 are substantially rectangular. Such may be the case when the optical axis of projection device 40 is substantially parallel to the normal to projection region 60. Projection region 60 may be a projection screen on a stand, as shown, but may also be a wall or any similar surface. Projection region 60 can be assumed to be oriented substantially vertically. It can also be assumed that the bottom and top edges of both projection image 70 and interaction region 71 are substantially horizontal. Furthermore, it can also be assumed that interaction region 71 is substantially the same size as projection image 70 and that computer screen interaction region 51 is substantially the same size as computer screen image 50. Additionally, it can be assumed that calibration points 721*a*, 721*c*, 721*d* substantially coincide with the projected versions of screen marks 521*a*, 521*c*, 521*d*. Finally, it can be assumed that base station 30 is positioned such that the x-y-plane is substantially horizontal. No assumptions are made regarding the x-z-plane and the y-z plane other than that they are substantially vertical. To facilitate in the positioning of base station 30, the user may be aided by level-sensing device 303.

Referring to FIGS. 3 and 8, program elements 80*a*-*j* may then result, either through default settings or user-supplied settings, in the assumptions that interaction structure 72 is a rectangle of which the top and bottom edges are parallel to the x-y-plane (i.e., they are horizontal) and the left and right edges are perpendicular to the x-y-plane (i.e., they are vertical).

Referring to FIGS. 4 and 8, program element 90*a* may then result in a set P containing three points that define the upper-left corner C(1), the upper-right corner C(2) and the lower-left corner C(3) of interaction structure 72. Additionally, program element 9*oa* may determine point CA (not denoted as such in FIG. 8) to lie away from projection region 60, for example, at the center of one of the three instantiations of pointing device 20, as shown in FIG. 8. Point CB (not denoted as such in FIG. 8) may be determined to be displaced from point CA in a direction substantially parallel to interaction region 71, over a distance that may be the same order of magnitude as the size of interaction region 71. Program element 90*a* may also result in sets A and B each containing three lines, connecting the points in set P to points CA and CB respectively. Program element 90*c* may then result in a priori relationships requiring that the upper-left corner will have x- and y-coordinates equal to the x- and y-coordinates of the lower-left corner and that its z-coordinate will be equal to the z-coordinate of the upper-right corner. As will be explained in detail below, the a priori information together with complete 3D information on two lines in set A and one line in set B will be enough to uniquely determine the position, size and orientation of interaction structure 72 with respect to the x y z coordinate system. Therefore, program elements god, 90*e*, 90*f*, 90*g* may result in set B containing only line B(3). Moreover, program elements 90*h*, 90*i*, 90*j*, 90*k* may result in set A containing only lines A(i) and A(2)

Referring to FIGS. 5 and 8, program elements 100*a*-*p* may result in the program identifying point C(1), C(2) and C(3) by means of projection device 40, in a manner similar to the one described in the previous example. In this case, however, C(i) and C(2) may be highlighted from approximately the same location CA, but C(3) needs to be highlighted from a different location CB. To explain that the above-mentioned information is enough to uniquely establish the position, size and orientation of interaction structure 72, define the points in set P as:

$$C(1) = \begin{pmatrix} x_1 + \lambda_1 \cdot Rx_1 \\ y_1 + \lambda_1 \cdot Ry_1 \\ z_1 + \lambda_1 \cdot Rz_1 \end{pmatrix} \quad (1)$$

$$C(2) = \begin{pmatrix} x_1 + \lambda_2 \cdot Rx_2 \\ y_1 + \lambda_2 \cdot Ry_2 \\ z_1 + \lambda_2 \cdot Rz_2 \end{pmatrix} \quad (2)$$

$$C(3) = \begin{pmatrix} x_1 + \lambda_3 \cdot Rx_3 \\ y_1 + \lambda_3 \cdot Ry_3 \\ z_1 + \lambda_3 \cdot Rz_3 \end{pmatrix} \quad (3)$$

Here, points CA and CB are defined as (x1, y1, z1) and (x3, y3, z3) respectively. Moreover, lines A(1), A(2) and B(3) are defined as passing through CA, CA and CB respectively, lying in directions governed by (Rx1, Ry1, Rz1), (Rx2, Ry2, Rz2) and (Rx3, Ry3, Rz3). All of these quantities are presumed to be measured by coordinate sensing device 201 and 301. For a unique description of the points in set P a solution is required for λ1, λ2 and λ3.

Using these definitions the conditions described above can be written as:

$$\begin{bmatrix} Rz_1 & -Rz_2 & 0 \\ Rx_1 & 0 & -Rx_3 \\ Ry_1 & 0 & -Ry_3 \end{bmatrix} \begin{pmatrix} \lambda_1 \\ \lambda_2 \\ \lambda_3 \end{pmatrix} = \begin{pmatrix} 0 \\ x_3 - x_1 \\ y_3 - y_1 \end{pmatrix} \quad (4)$$

which can be solved in a straightforward manner according to the expression:

$$\begin{pmatrix} \lambda_1 \\ \lambda_2 \\ \lambda_3 \end{pmatrix} = \begin{pmatrix} [Rx_3 \cdot (y_3 - y_1) + Ry_3 \cdot (x_1 - x_3)] / [Rx_3 \cdot Ry_1 - Rx_1 \cdot Ry_3] \\ \left[\frac{Rz_1}{Rz_2}\right] \cdot [Rx_3 \cdot (y_3 - y_1) + Ry_3 \cdot (x_1 - x_3)] / [Rx_3 \cdot Ry_1 - Rx_1 \cdot Ry_3] \\ [Rx_1 \cdot (y_3 - y_1) + Ry_1 \cdot (x_1 - x_3)] / [Rx_3 \cdot Ry_1 - Rx_1 \cdot Ry_3] \end{pmatrix} \quad (5)$$

Note that this solution shows that, if point C(3) was highlighted from any point on the pointing line 21 that is used to highlight point C(1), i.e., $$\begin{pmatrix} x_3 \\ y_3 \\ z_3 \end{pmatrix} = \begin{pmatrix} x_1 + \tau \cdot Rx_1 \\ y_1 + \tau \cdot Ry_1 \\ z_1 + \tau \cdot Rz_1 \end{pmatrix} \quad (6)$$

the solution for the three unknown λ's would collapse to $$\begin{pmatrix} \lambda_1 \\ \lambda_2 \\ \lambda_3 \end{pmatrix} = \begin{pmatrix} \tau \\ \tau Rz_1 / Rz_2 \\ 0 \end{pmatrix} \quad (7)$$

making unique determination of interaction structure 72 impossible. Conversely, the fact that points C(i) and C(2) are, in this example, both highlighted from substantially the same point CA does not cause any problems. It will be appreciated by those skilled in the art that C(i) and C(2) may also be highlighted from different points, without loss of functionality.

Referring to FIGS. 6 and 8, the course and results of program elements 110*a-k* will be similar to those described in Example 1.

Figure 9:
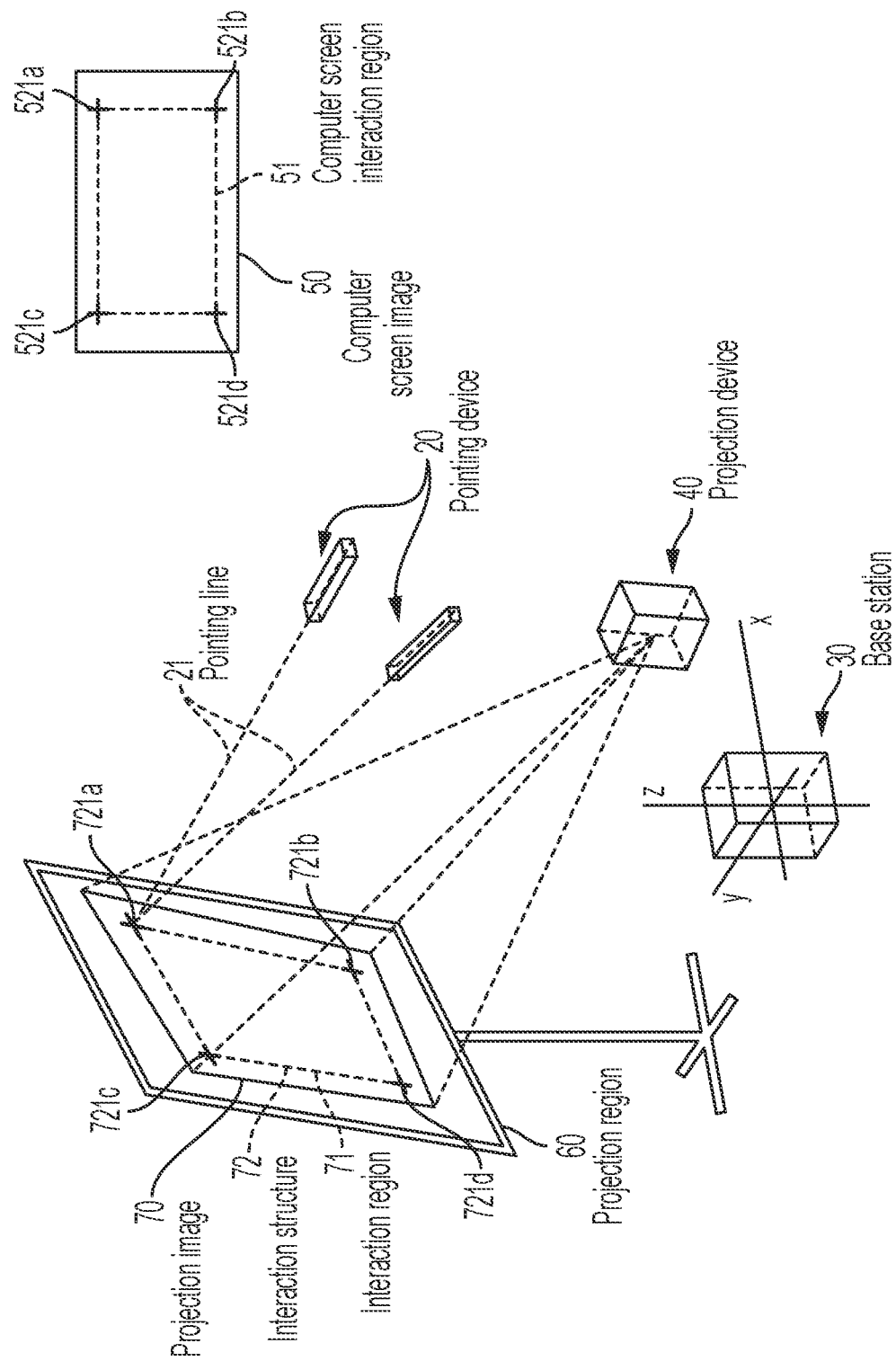
FIG. 9 shows a third example of one embodiment.

Referring to FIG. 9, in another example, the only assumptions made are that interaction region 71 is substantially the same size as projection image 70, computer screen interaction region 51 is substantially the same size as computer screen image 50, calibration points 721*a*, 721*b*, 721*c*, 721*d* substantially coincide with the projected versions of screen marks 521*a*, 521*b*, 521*c* and 521*d* and computer screen interaction region 51 is substantially rectangular. This situation may arise when the optical axis of projection device 40 is not aligned with the normal to projection surface 60.

Referring to FIGS. 3 and 9, program elements 80*a-j* may then result, either through default settings or user supplied settings, in the assumption that interaction structure 72 is a quadrangle; no assumptions are made regarding its position or orientation.

Referring to FIGS. 4 and 9, program elements 90*a* may then result in a set P containing four points that define the upper-right, upper-left, lower-right and lower-left corners of interaction structure 72. Additionally, program element 90*a* may conceive point CA (not denoted as such in FIG. 9) to lie away from projection region 60, for example at the center of the first of the two instantiations of pointing device 20, as shown in FIG. 9. Point CB may, for example, be determined to lie at the center of the second of the two instantiations of pointing device 20, as drawn in FIG. 9. Now, program elements god, 90*e*, 90*f*, 90*g* and steps 90*h*, 90*i*, 90*j*, 90*k* may result in sets A and B each containing 4 lines.

Referring to FIGS. 5 and 9, program elements 100*a-p* may result in the program identifying the four points in set P by means of projection device 40, in a manner similar to the one described in Example 1. In this case, however, all four points in set P may be highlighted from approximately the same location CA first, after which all four points may be highlighted from approximately the same location CB. Note that FIG. 9, for reasons of clarity, only depicts the highlighting of calibration point 721*a*. Each point C(i) may then be constructed as the point lying halfway the shortest line segment connecting lines A(i) and B(i); this line segment may have zero length.

Referring to FIGS. 6 and 9, the course and results of program elements 110*a-k* will be similar to those described with respect to the first example, with the exception of program element 110*b*, the mapping element. Now, a more elaborate method M is needed than the one described in previous examples. For example, a method such as described in U.S. Pat. No. 6,373,961 to Richardson (2002) may be utilized, but other appropriate methods may also be used.

Figure 10:
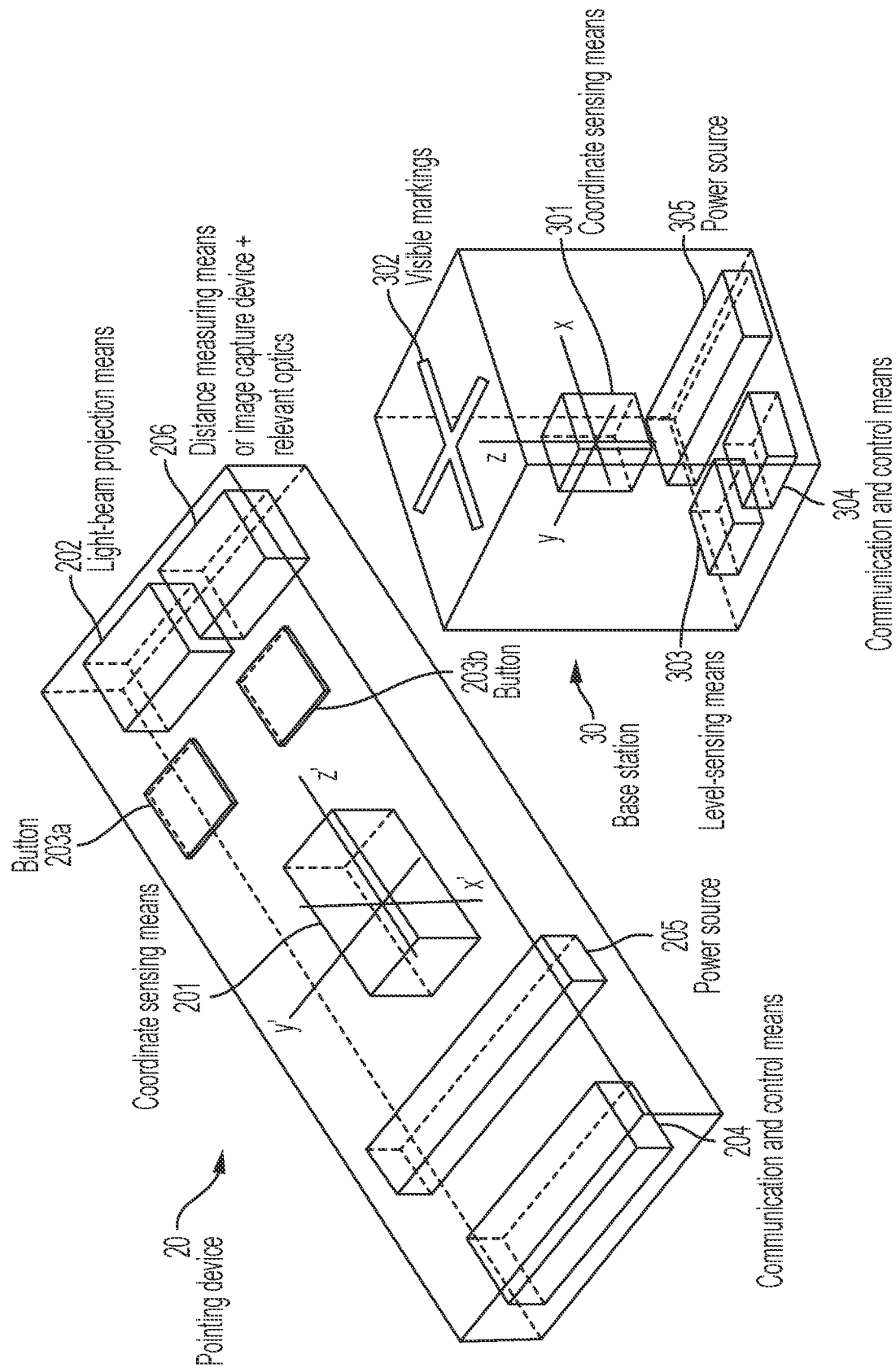
FIG. 10 shows a pointing device and base station according to a second embodiment.

A second embodiment will now be made with reference to FIG. 10, which shows pointing device 20 and base station 30. Here, in addition to any or all of the elements mentioned in the previous embodiment, pointing device 20 is also provided with distance measuring device 206, the position and orientation of which with respect to the x'y'z' coordinate system may be ascertained at the place of manufacture thereof and will be presumed to be known. Distance measuring device 206 may for example be embodied by a focus adjustment, or optical sensor. A digital camera may also be used. Distance measuring device 206 may determine the point-of-aim-distance 211 between the origin of the x'y'z' coordinate system and the point-of-aim, measured substantially parallel to the z'-axis (see also FIG. 2). The point of aim 210 may lie on projection region 60, on which interaction region 71 may lie. Distance measuring device 206 may have associated with it a manual focus adjustment that may be adjusted by the user (manual focus adjustment not shown). Alternatively, distance measuring device 206 may comprise a circuit (not shown) that automatically determines the point-of-aim-distance 211 between the origin of the x'y'z' coordinate system and the point-of-aim. For example, if the point-of-aim lies on projection region 60, distance measuring device 206 may bounce light off of projection region 60. In doing so, use may for instance be made of light-beam projection device 202. Any other appropriate mechanism for determining distance may also be used for distance measuring device 206. The optical axes of light-beam projection device 202 and distance measuring device 206 may coincide, for instance by making use of partially-reflecting elements (not shown) such as disclosed in U.S. Pat. No. 4,768,028 to Blackie (1988).

The operation of the present embodiment will now be described with reference to FIGS. 2, 10, and 3. The process elements in FIG. 3 will be identical to the ones described in the first embodiment, resulting in similar assumptions regarding the shape of interaction region 71 (and interaction structure 72) and possibly orientation and position of interaction structure 72.

Figure 11:
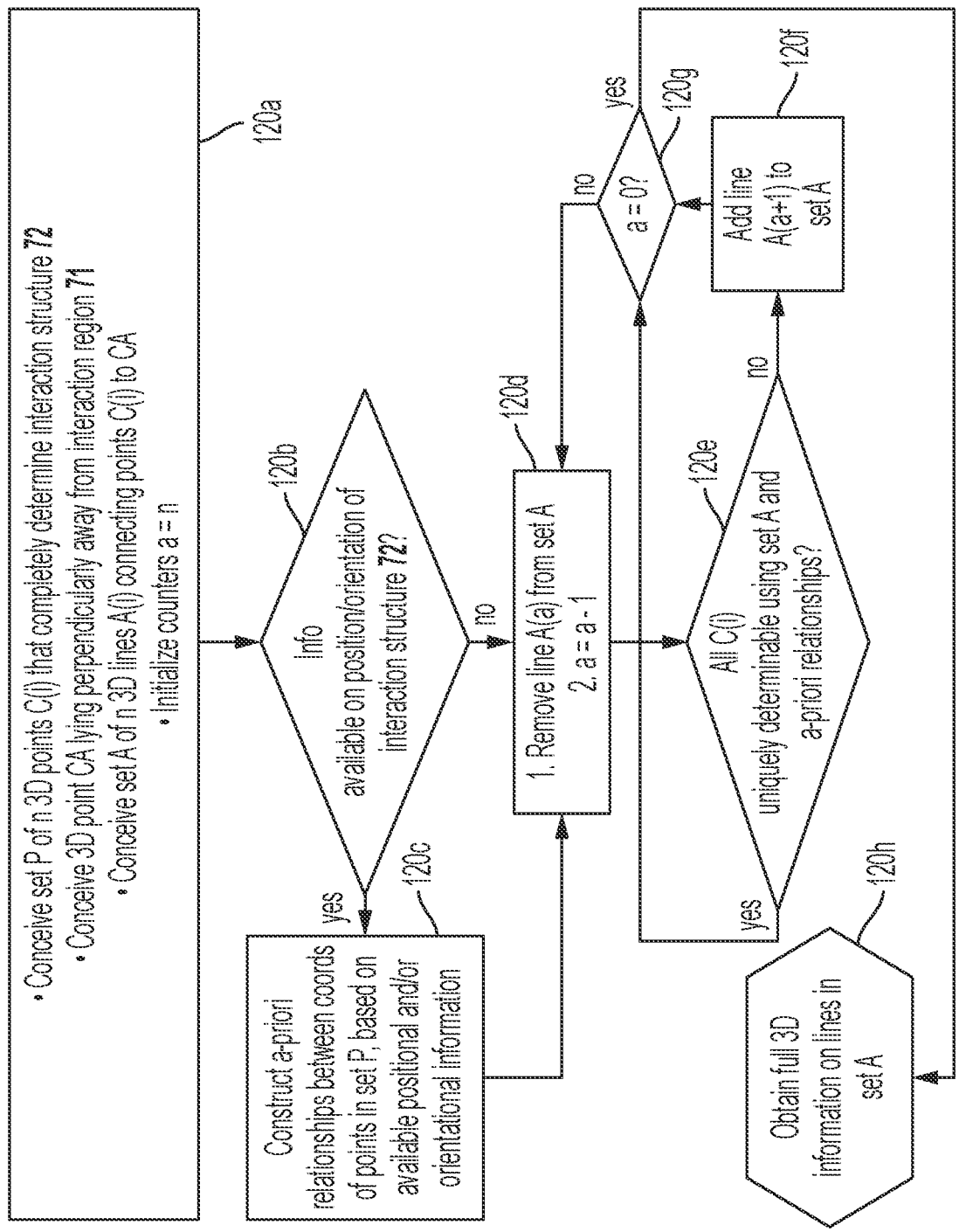
FIG. 11 shows program steps for construction of information set according to a second and third embodiment.

Referring to FIG. 11, instead of the program elements described above with reference to FIG. 4, program flow now continues at 120a. Program elements 120a-120h are shown to be similar to program elements 90a-90m (FIG. 4), except that only point CA, set A and counter a are considered. That is to say, in the present embodiment it is no longer necessary to determine the second point CB and associated repositioning of pointing device 20 during the calibration procedure.

Figure 12:
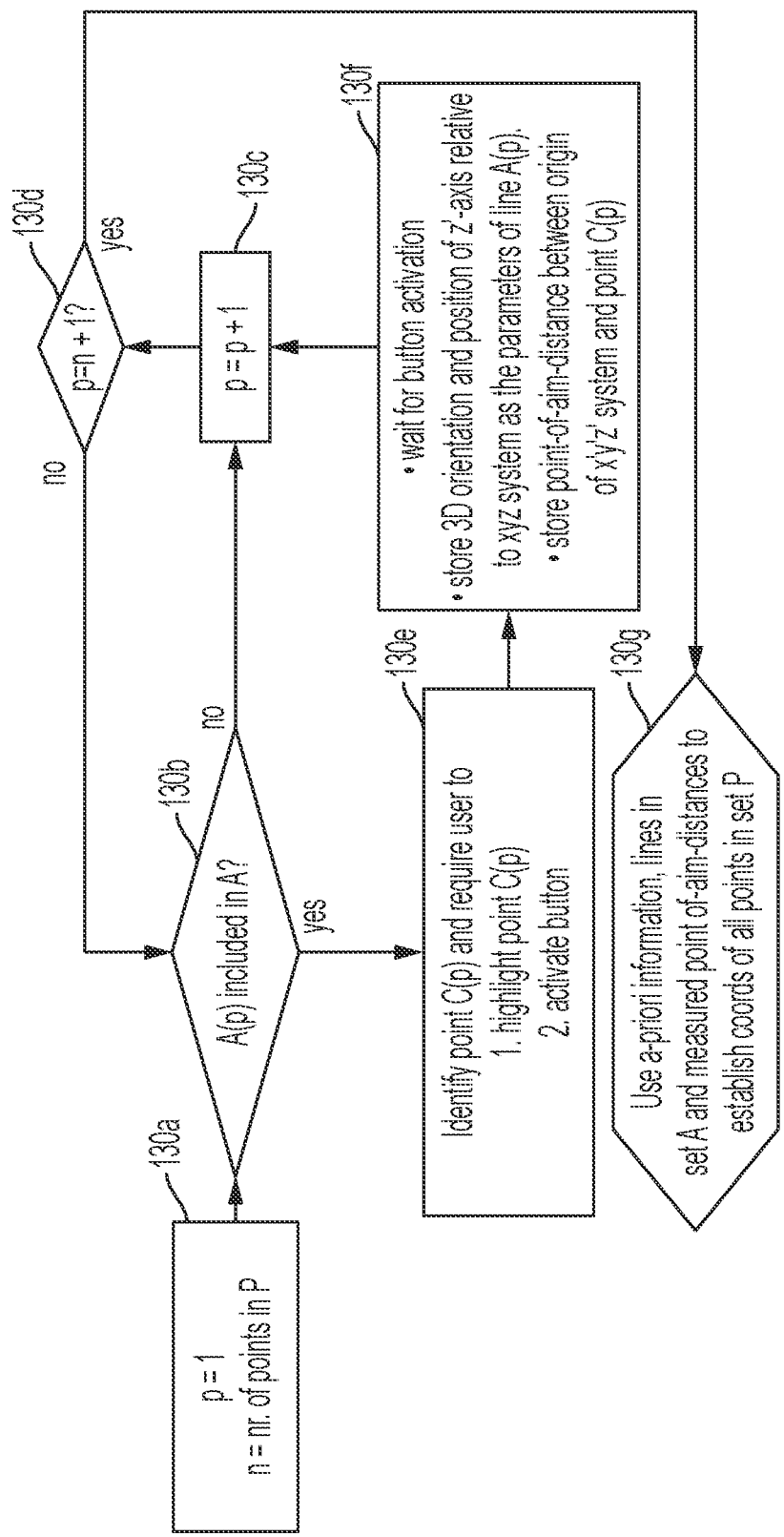
FIG. 12 shows program steps for ascertaining necessary 3D data according to the second embodiment.

After program element 120h, program flow continues with program elements outlined in FIG. 12. Referring to FIG. 12, program elements 130a-130g are seen to be similar to steps 100a-100p (FIG. 5). Comparing program element 130f with program element roof (FIG. 5), it can be seen that at 130f the program also stores information on the point-of-aim-distance (211 in FIG. 2) between the origin of the x'y'z' coordinate system and point C(p). Comparing elements 130g and 100p (FIG. 5), it can be seen that these point-of-aim-distances (211 in FIG. 2) are also used in determining the 3D coordinates of the points in set P.

With complete information on the 3D coordinates of the points in set P, it is then possible to construct a 3D description of interaction structure 72 (in FIG. 2). Therefore, program elements 110a-110k as described above with reference to FIG. 6 may also be followed in the present embodiment.

Thus, methods and means are disclosed that afford a highly flexible and easily deployable system for interacting with a presentation in a direct-pointing manner at a location not specifically equipped for such a purpose. Moreover, when utilizing the second preferred embodiment it is often sufficient for the user to highlight various calibration points 721a, 721b, . . . from one and the same position, making the calibration procedure even more easy to follow.

Figure 13:
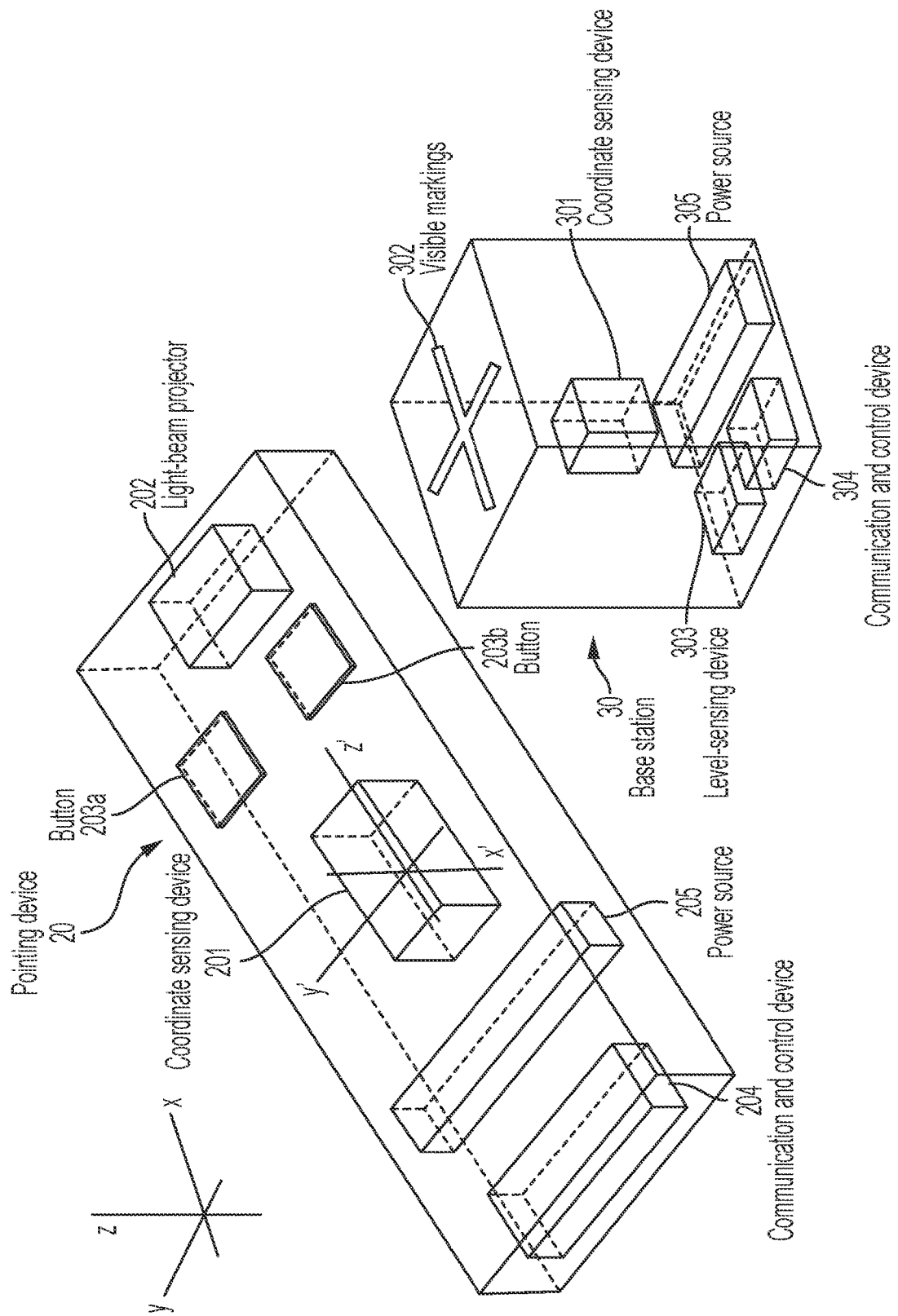
FIG. 13 shows a pointing device and base station according to a third embodiment.

Another embodiment will now be explained with reference to FIG. 13. FIG. 13 shows another embodiment of the pointing device 20. Pointing device 20 may be equipped with any or all of the elements mentioned in the other embodiments, such as described above with reference to FIG. 1 and FIG. 10. The present embodiment may include a base station 30 that has associated with it a coordinate system x y z. However, in the present embodiment it can be assumed that the position of pointing device 20 will remain substantially unchanged relative to interaction region 71 over an extended period of time, and that the origin of coordinate system x y z may be assumed to be virtually anywhere instead of being related to the base station 30. Furthermore, if any of the axes of the x y z system are chosen to be related to locally well-established, independent and stationary directions such as, for example, the Earth's magnetic field and/or the Earth's gravitational field, the Earth itself may be interpreted as embodying base station 30. Under such circumstances there may not be a need for an artificial base station 30; coordinate sensing device 201 may then, for example, be embodied by devices sensing the directions of the Earth magnetic and gravitational fields, such as accelerometers and a compass (for example, model no. HMR3300 device as manufactured by Honeywell International Inc., Morristown, N.J.), and communication and control device 204 may be configured to communicate directly with the computer (not shown).

The operation of the present embodiment will now be described with reference to FIGS. 8, 13, and 3. The remainder of the description of the present embodiment will, for purposes of explanation, include the assumption that any separately embodied base station 30 (FIGS. 8 and 13) is omitted entirely. It is also assumed that one of the axes of the orthogonal coordinate system x y z is substantially parallel to the Earth's gravity field (or has a defined relationship thereto), while the second and third axes of the coordinate system are in a fixed, known relationship to the at least one geographically defined axis. In the present embodiment it is assumed that the relative position of pointing device 20 with respect to interaction region 71 remains substantially unchanged, therefore the origin of coordinate system x y z will, for purposes of explanation, be chosen to coincide with a fixed point in the pointing device 20. For the purpose of the present embodiment, it should be understood that the three instantiations of pointing device 20 as shown in FIG. 8 substantially coincide.

It can be assumed in the present embodiment that a display system is arranged at the venue where a presentation is to be made, as a combination of a portable projection device 40 and projection surface 60, for example a wall. It will furthermore be assumed that this display system is connected, using appropriate means, to the computer (not shown) that generates the image.

Upon arriving at the venue, the user connects pointing device 20 to the computer (not shown), for example via a USB connection (not shown), or using a wireless relay device (not shown). Also, the computer may recognize the connection and start a program, part of which may be contained in communication and control device 204 or in control logic contained in the wireless relay device itself (not shown). Alternatively, the user may be required to load the program into the computer manually via a CD drive, a floppy drive, memory stick or the like (not shown). In any case, the program may initiate a calibration routine that has as its object establishing the shape, position, size and orientation of a well-defined interaction structure 72, relative to the x y z coordinate system, wherein the interaction structure 72 is assumed to substantially coincide with a scaled and parallel version of interaction region 71. The flow of this program will be explained with reference to FIG. 3.

At 80a the program is initiated. At Bob defaults are entered for interaction region 71. Specifically, interaction region 71 is assumed to be a substantially parallel and scaled version of a well-defined interaction structure 72. Moreover, the respective corners of interaction region 71 and interaction structure 72 are assumed to substantially lie on lines intersecting each other in the origin of coordinate system x y z. It should be noted that FIG. 8 shows an interaction region 71 and an interaction structure 72 that are almost coincident, but this is only meant for illustrative purposes and is not a limitation on the scope of the invention. Again referring to FIG. 3, at Bob default values are also established for the orientation and position of the interaction structure 72. For example, the default values may provide that interaction region 71 is substantially a parallel and scaled version of an interaction structure 72 that is a flat rectangle of which the two most vertical sides are substantially parallel to the Earth's gravitational field, and of which the two most horizontal sides are substantially perpendicular to the Earth's gravitational field; moreover, the default values may provide that the respective corners of interaction region 71 and interaction structure 72 substantially lie on lines intersecting each other in the origin of coordinate system x y z. The default values may furthermore provide that the position of interaction structure 72 is such that the distance between pointing device 20 and the lower left corner of interaction structure 72 is equal to 1. Note that other values for the foregoing distance may be equally valid in the present embodiment. Based on the foregoing default values, calibration points 721*a*, 721*c*, 721*d*, . . . can define characteristic features of interaction region 71 and can also define characteristic features of interaction structure 72.

At 80*c* a decision is made whether the default values for interaction region 71 and interaction structure 72 should be accepted or overridden by the user. If the default values are to be accepted, the program flow continues to 80*j*, the details of which are explained below with reference to FIG. 1*i*. If the defaults are to be overridden, the program flow continues with elements 80*d*-80*i*, during which the user may override any of the default settings. The user may be aided during program elements 80*d*-80*i* by a library of predetermined shapes, predetermined orientations and/or predetermined positions. Alternatively, the user can be provided with the capability to construct custom shapes, orientations and/or positions. In any event, program flow continues to 80*j*.

Referring to FIG. 11, program flow now continues to 120*a*. Program elements 120*a*-120*h* are substantially similar to program elements 90*a*-90*m* (FIG. 4), except that only point CA, set A and counter a••are considered. In the present embodiment it is not required to determine a second point CB and an associated repositioning of pointing device 20 during the calibration procedure.

Figure 14:
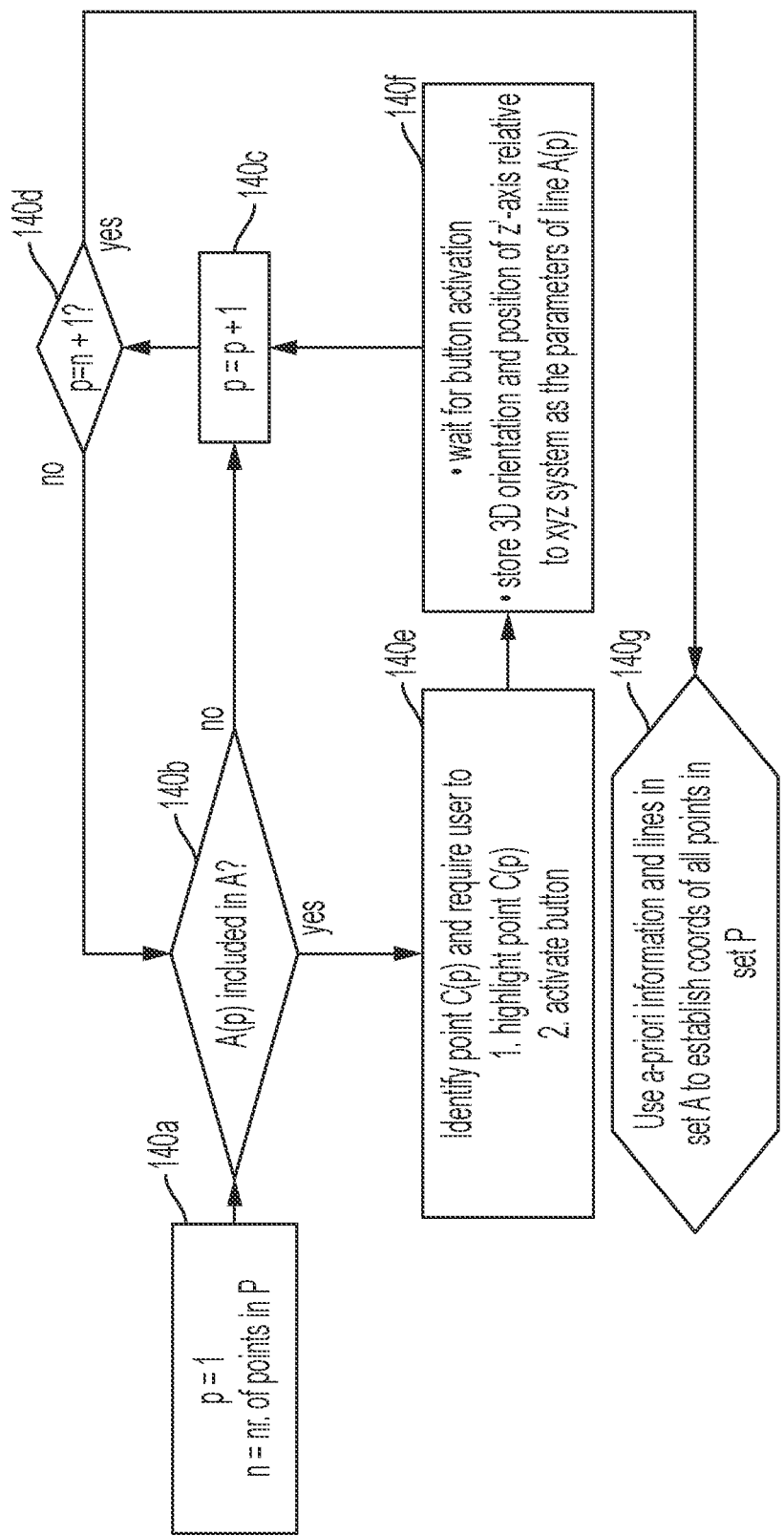
FIG. 14 shows program steps for ascertaining necessary 3D data according to the third embodiment.
Figure 15:
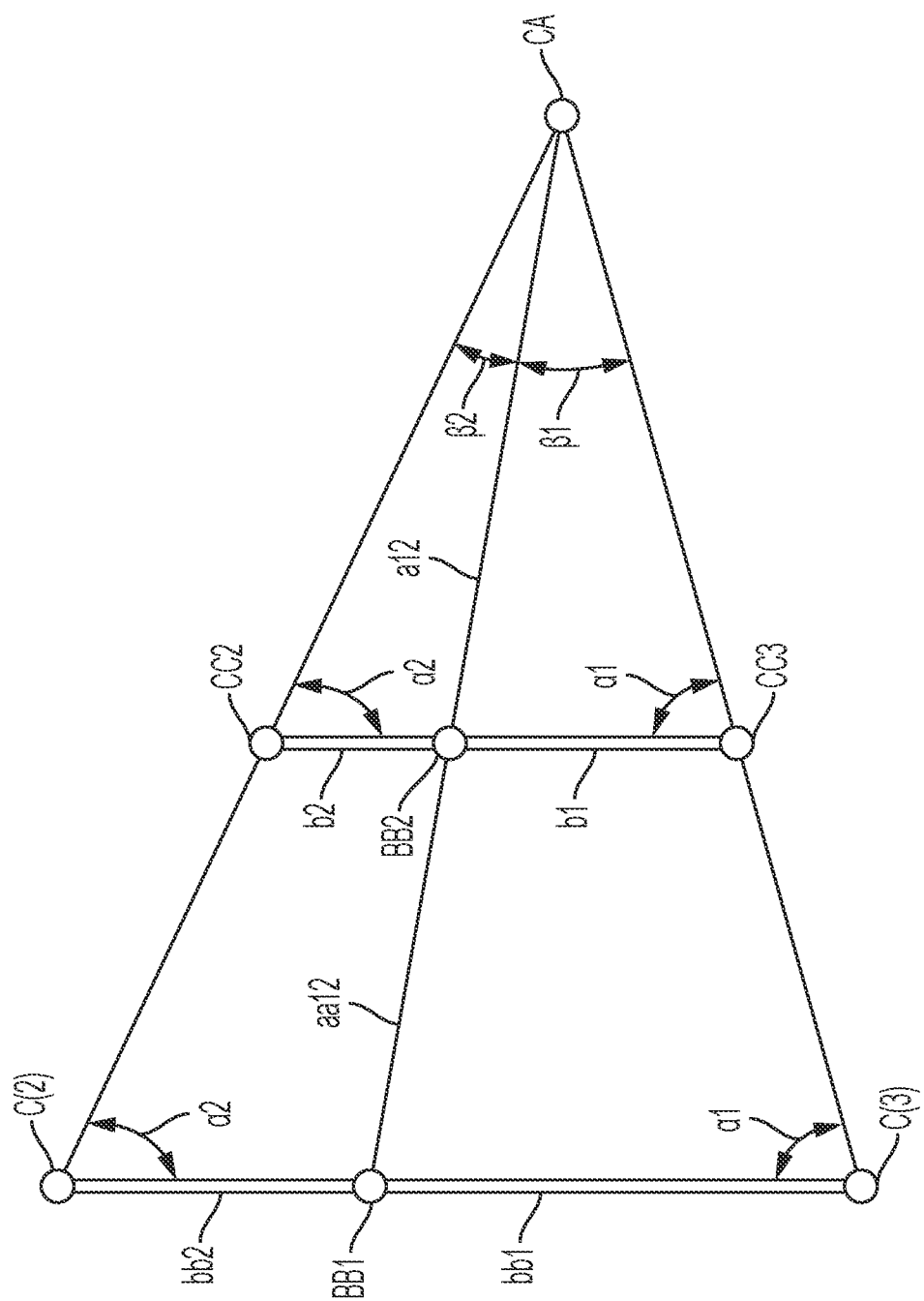
FIG. 15 shows projection of interaction structure on horizontal and vertical planes.

After 120*h*, program flow continues with elements described with reference to FIG. 14. In FIG. 14, program elements 140*a*-140*g* are shown to be similar to steps 130*a*-130*g* (FIG. 12). Comparing element 140*f* with element B of (FIG. 12), it can be seen that element 140*f* does not include storing information for any directly measured distance. Element 140*f* need not include storing information on the position of the z'-axis, because the position of pointing device 20 is assumed to remain substantially unchanged over an extended period of time. Comparing elements 140*g* and B0*g*, it can be seen that any directly measured distance is not needed to determine the 3D coordinates of the points in set P (see FIG. 4). In fact, having the default distance (set to 1) between pointing device 20 and the lower left corner of interaction structure 72 is sufficient for operation of the system in the present embodiment. To explain this fact, reference is again made to FIG. 8. Using the above default values, interaction structure 72 will be completely defined by, for example, its upper-left corner C(i), its upper-right corner C(2) and its lower-left corner C(3)

$$C(1) = \lambda_1 \cdot \begin{pmatrix} Rx_1 \\ Ry_1 \\ Rz_1 \end{pmatrix} \quad (8)$$

$$C(2) = \lambda_2 \cdot \begin{pmatrix} Rx_2 \\ Ry_2 \\ Rz_2 \end{pmatrix} \quad (9)$$

$$C(3) = \lambda_3 \cdot \begin{pmatrix} Rx_3 \\ Ry_3 \\ Rz_3 \end{pmatrix} \quad (10)$$

lying on lines A(1), A(2) and A(3) that connect the origin to points (Rx1, Ry1, Rz1), (Rx2, Rye, Rz2) and (Rx3, Ry3, Rz3) respectively. Using these definitions, the conditions described above determine relationships between the various variables that can be written as $$\begin{bmatrix} Rz_1 & -Rz_2 & 0 \\ Rx_1 & 0 & -Rx_3 \\ Ry_1 & 0 & -Ry_3 \end{bmatrix} \begin{pmatrix} \lambda_1 \\ \lambda_2 \\ \lambda_3 \end{pmatrix} = \begin{pmatrix} 0 \\ 0 \\ 0 \end{pmatrix} \quad (12)$$

which will have non-trivial solutions only if the determinant of the matrix equals zero. Then, it can be shown that any combination of (λ1, λ2, λ3) that can be written in the form:

$$\begin{pmatrix} \lambda_1 \\ \lambda_2 \\ \lambda_3 \end{pmatrix} = \begin{pmatrix} Rz_2/Rz_1 \\ 1 \\ (Rz_2 \cdot Rx_1)/(Rz_1 \cdot Rx_3) \end{pmatrix} \cdot \alpha \quad (13)$$

where α is any arbitrary real number, will generate solutions for interaction structure 72 that are parallel to each other. The assumption that the distance between pointing device 20 and the lower left corner of interaction structure 72 is 1 will hence uniquely generate one of these solutions. To see that other assumptions regarding this distance do not influence the operation of the present embodiment, reference is made to FIG. 15. In FIG. 15, projections of two parallel solutions for interaction structure 72 are shown, obtained for different values of distances CA-C(3). When it is assumed, for purposes of explanation, that these two solutions are parallel to the z-x plane, FIG. 15 may be interpreted as a projection of the two solutions onto the x-y plane. These projections are shown as the thick line segments C(3)-C(2) and CC3-CC2. FIG. 15 also shows the projection of point CA (i.e., the origin of coordinate system x y z), from where the lower left and upper right corners of interaction structure 72 were highlighted, and line-segments C(3)-CA and C(2)-CA which coincide with the (projections of) the highlighting lines A(3) and A(2) (not denoted as such in FIG. 15). Finally, line-segment BB1-CA indicates (the projection of) a pointing line that is consistent with a point-of-aim BB1 on the one and point-of-aim BB2 on the other of the two solutions for interaction structure 72. To show that BB1 and BB2 represent the same horizontal coordinate when measured relative to the appropriate solution for interaction structure 72, the lengths of line segments C(3)-BB1, C(2)-BB1, CC3-BB2, CC2-BB2, BB1-CA and BB2-CA are represented by bb1, bb1, b1, b2, aa12 and a12, respectively. It is sufficient to show that bb1/bb1=b1/b2. Consider the following equalities:

$$\frac{bb1}{\sin\beta 1} = \frac{aa12}{\sin\alpha 1} \quad (14)$$

$$\frac{bb2}{\sin\beta 2} = \frac{aa12}{\sin\alpha 2} \quad (15)$$

while, at the same time $$\frac{b1}{\sin\beta 1} = \frac{a12}{\sin\alpha 1} \quad (16)$$

$$\frac{b2}{\sin\beta 2} = \frac{a12}{\sin\alpha 2} \quad (17)$$

From this it follows that $$\frac{aa12}{bb1} = \frac{a12}{b1} \qquad (18)$$

$$\frac{aa12}{bb2} = \frac{a12}{b2} \qquad (19)$$

which, in turn, provides that $$bb1\frac{a12}{b1} = bb2\frac{a12}{b2} \Rightarrow \frac{bb1}{bb2} = \frac{b1}{b2} \qquad (20)$$

This implies that BB1 and BB2 represent the same horizontal coordinate when measured relative to the appropriate solution for interaction structure 72. Note that, if FIG. 15 is interpreted as a projection onto the z-y-plane, it can be concluded that BB1 and BB2 also represent the same vertical coordinate when measured relative to the appropriate solution of interaction structure 72. Therefore the initial assumption that the distance between C(3) and CA is equal to 1 does not influence the operation of the third preferred embodiment.

It is theoretically possible that there are no non-zero solutions for the parameters λ1, λ2 and λ3 when the determinant referred to above in equation (12) is non-zero. Such may be the case, for example, due to errors in measurements or in the assumed rectangular shape of interaction region 71. In such cases additional techniques may be used to find an acceptable solution for interaction structure 72. For example, a minimization routine may be used to find a solution for interaction structure 72 that minimizes a summation of the distances between some of its corners (which, by assumption, lie on lines connecting the origin of coordinate system x y z with the corners of interaction region 71) and the highlighting lines.

With complete information on the 3D coordinates of C(i), C(2) and C(3) it is possible to construct a 3D description of interaction structure 72. Therefore, program elements 110a-110k as described in the first embodiment and explained above with reference to FIG. 6 may also be followed in the present embodiment.

There may be situations in which the user is not able to hold pointing device 20 continuously at precisely the same position while performing the actions required by the calibration procedure described in FIGS. 3, 11 and 14, or during the use of the system as a direct-pointing device. Such changes in position of the pointing device 20 can cause errors in the calculation of the point-of-aim. It will be appreciated that if the discrepancy between the calculated and the true point-of-aim is small enough, the visual feedback provided by the displayed cursor (501 in FIG. 1) during use of the system as a direct-pointing device will still afford the user the perception that direct-pointing is being performed.

There are many other methods capable of establishing position, size and orientation of interaction structure 72, as will be appreciated by those skilled in the art. For example, if the distance between pointing device 20 and interaction structure 72 is presumed known, if interaction structure 72 is assumed to be rectangular with two vertical and two horizontal sides and if its aspect ratio (the ratio between its horizontal size and its vertical size) is also presumed known, then knowledge of two lines from CA to the upper-right and lower-left corner is sufficient to narrow the number of solutions for interaction structure 72 down to 2, dictated by 2 solutions of a quadratic equation. One further assumption is then required to determine which of these 2 solutions is the correct one; this assumption may be in the form of a third line passing through yet another characteristic point of interaction structure 72, but it may also be in the form of knowledge of the (approximate) angle between the plane in which interaction structure 72 lies and a line connecting the origin to one of its corners. Other scenarios may also be conceived for which solutions may be devised that are within the scope of the general methods set forth herein.

In the present embodiment, using well-established and stationary directions such as, for example, the Earth's magnetic field and the Earth's gravitational field, it may be possible to omit a separately embodied base station, making the present embodiment of the system possibly more compact, less expensive to make and easier to deploy.

Figure 16:
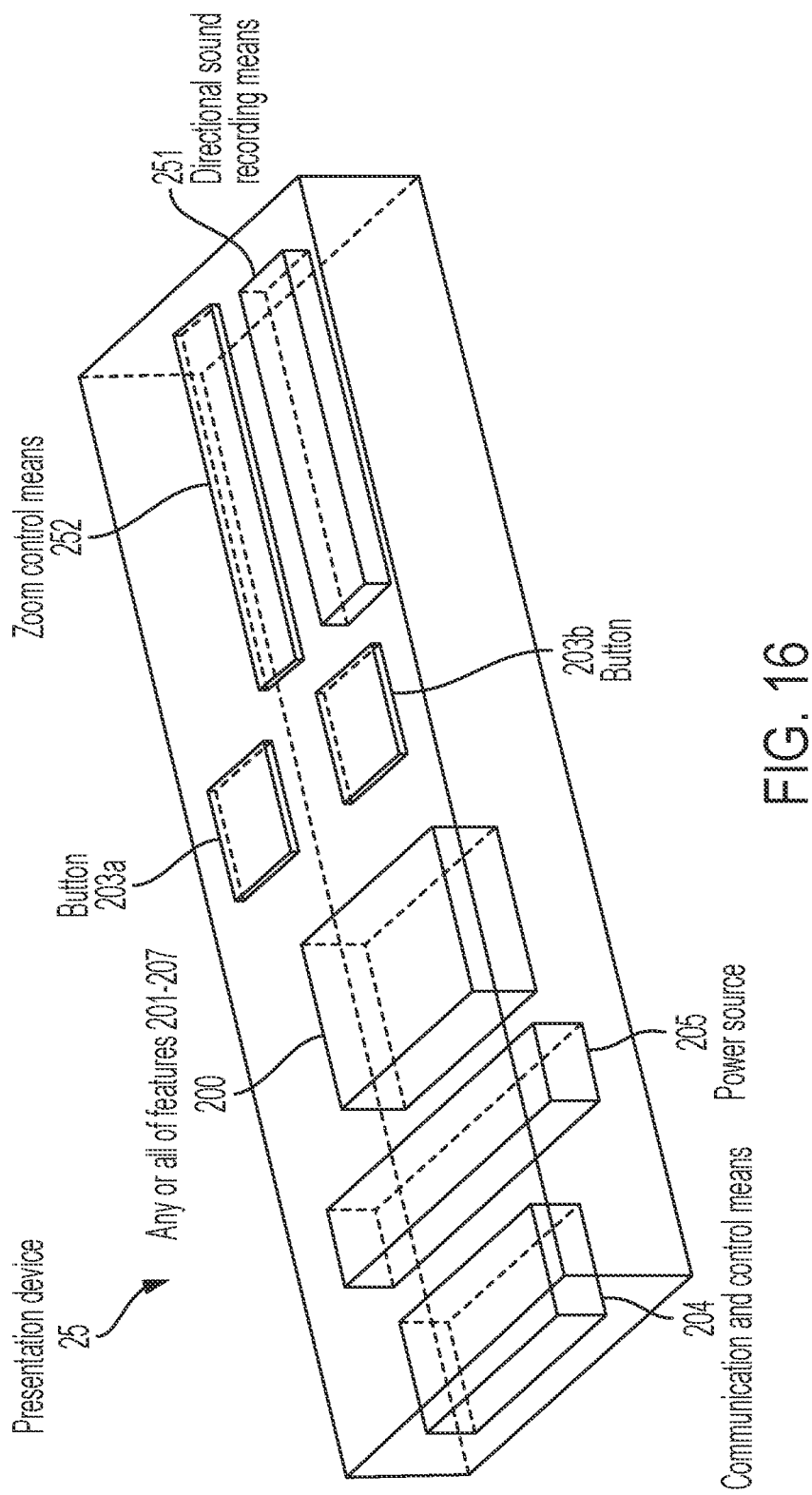
FIG. 16 shows a presentation device according to a fourth embodiment.

Another embodiment of a system according to the invention will now be described with reference to FIG. 16. In the present embodiment a handheld presentation device 25 contains a power source 205, communication and control device 204 and a directional sound recording device 251. The sensitivity region of the directional sound recording device 251 may be substantially oriented along the long axis of presentation device 25. Any or all of the features contained in pointing device 20, already described in previous embodiments or to-be-described in the additional embodiments, may also be contained in presentation device 25; any or all of features 201-207 are collectively depicted as module 200. In the same way, the fourth preferred embodiment also may but need not provide base station 30 and its associated elements, such as elements 301-305 or a wireless relay device (not shown in FIG. 16).

The directional sound recording device 251 may be provided with so-called zoom capabilities, such as those afforded by, for example, the ECM-Z60 Super Zoom Microphone as manufactured by Sony. Alternatively, directional sound recording device 251 may comprise multiple directional microphones (not shown) with different sensitivity regions, so that zoom 'capabilities may be emulated. In these cases, presentation device 25 may also be provided with zoom control device 252, capable of adjusting the sensitive volume of directional sound recording device 251 either by manual control or automatically. Directional sound recording device 251 may communicate with the computer (not shown) and/or base station 30 (not shown in FIG. 16) through communication and control device 204 and/or 304 (not shown in FIG. 16). A control program described in FIG. 17 may be transferred to the computer (not shown) or be incorporated in communication and control device 204 and/or 304. Moreover, there may be provided a storage medium for storage of sound data (not shown) in one of the components of the described system, as well as means to play back sound, such as a loudspeaker (not shown).

During a presentation it may occur that a member of the audience wishes to communicate verbally with the presenter (user). Often, the acoustics of the room preclude other members of the audience from hearing such communication. In such cases, the user may point presentation device 25 in the direction of the member of the audience who wishes to communicate with the user. The user may then activate directional sound recording device 251 by activating controls such as button 203a or zoom control device 252. The latter may also be used to acoustically zoom in on the particular member of the•audience. Directional sound recording device 251 may then communicate with the computer (not shown) and record the communication, for example, in computer memory (not shown). At the same or later time the user may request the recording to be played back, for instance over speakers (not shown) driven by the computer (not shown), by activating controls such as button 203b. The computer program may be configured such that one and the same command from the user, such as the activation of button 203a or zoom control device 252, initiates substantially simultaneous recording and playback. Measures to counteract any acoustical interference when playback and recording occur almost simultaneously may be implemented as well. Such measures are well known in the art.

Figure 17:
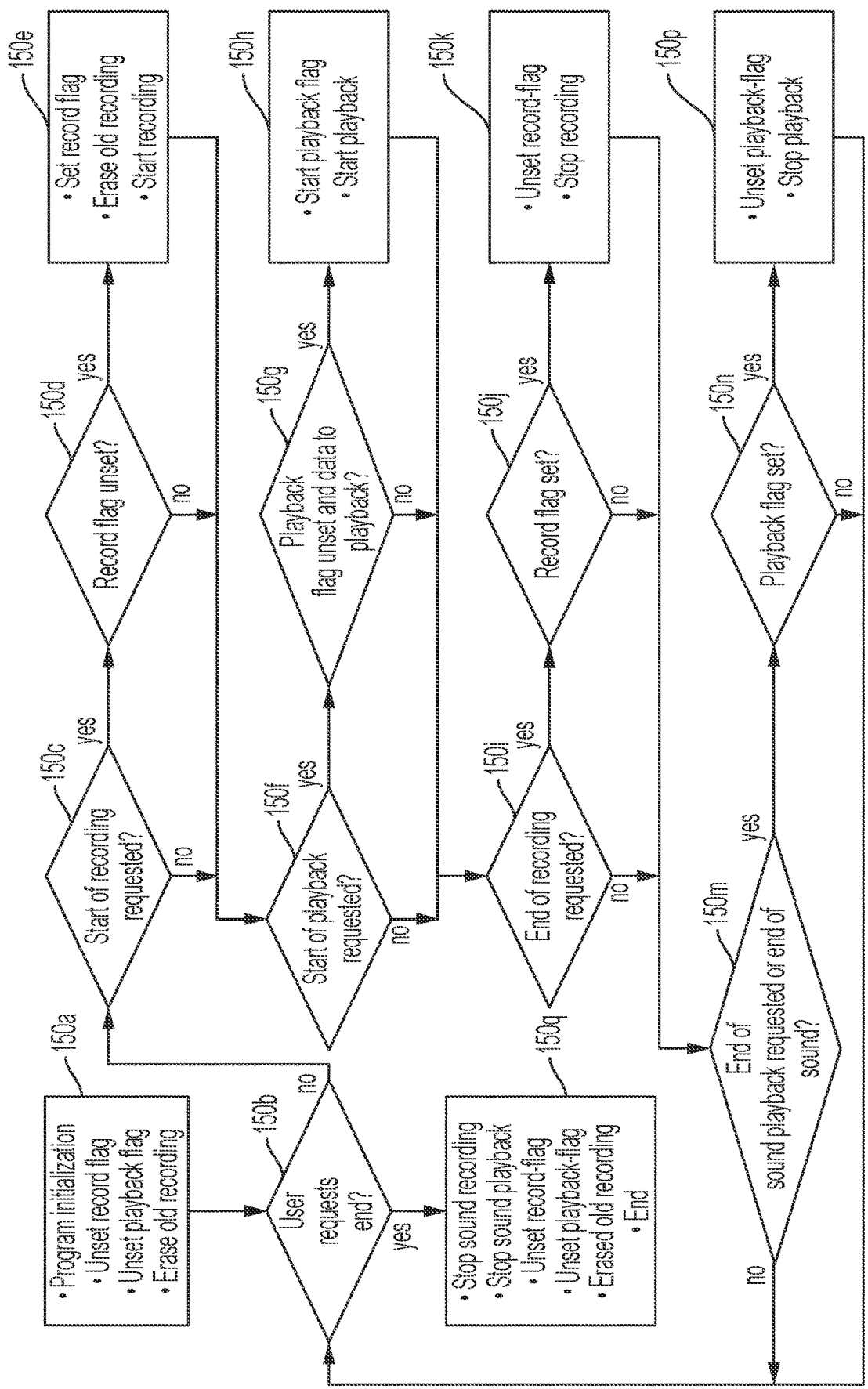
FIG. 17 shows program steps for sound recording and playback according to the fourth embodiment.

Referring to FIG. 17, to facilitate the recording and playback of sounds, general elements, 150a-150q of a program are shown. These program elements may be executed by the computer (not shown), and may be loaded into the computer by such means as floppy discs, memory sticks or CDs (not shown). The programs may be pre-loaded in base station 30, its associated wireless relay device (both not shown in FIG. 16) or presentation device 25, and transferred by means of a USB port or the like (not shown) upon connecting any of these components to the computer (not shown).

At 150a the program is initialized, old recordings are erased and a record-flag and a playback-flag are unset; this indicates that both recording and playback are not activated.

Program flow continues to 150b, where a decision is made whether the user requests the program to end. Buttons (203a, 203b in FIG. 16) or the like may be used for this purpose.

If the decision at 150b is positive, program flow continues to 150q, where any recording or playback is stopped, playback and record flags are unset, old recordings are erased and the program ends. If the decision at 150b is positive, program flow continues to 150c.

At 150c a decision is made whether the user has requested sound recording. If the decision is positive, program flow continues to 150d. If the' decision is negative, program flow continues on to 150f.

At 150d a decision is made whether the record-flag is unset, indicating that recording is not already in progress. If the decision is negative, program flow continues to 150f. If the decision is positive, program flow continues to 150e, where the record flag is set, any old recordings are erased and sound recording is started, after which the program flow continues to 150f.

At 150f, a decision is made whether the user has requested sound playback. If this decision is positive, program flow continues to 150g. If the decision is negative, program flow continues to 150i.

At 150g a decision is made regarding whether the playback flag is unset, indicating that playback is not already in progress. If the decision is negative, program flow continues to 150i. If the decision is positive, and there is some sound data to be played back, program flow continues to 150h, where the playback flag is set and sound playback is started, after which the program flow continues to 150i.

At 150i a decision is made whether the user has requested that sound recording is to be terminated. If the decision is positive, program flow continues to 150j. If the decision is negative, program flow continues on to step 150m.

At 150j a decision is made whether the record-flag has been set, indicating that recording is in progress. If the decision is negative, program flow continues to 150m. If the decision is positive, program flow continues to 150k, where the record flag is unset and sound recording is stopped, after which the program flow continues to 150m.

At 150m a decision is made whether the user has requested that sound playback is to be terminated. If the decision is positive, or if the end of the recorded sound has been reached, program flow continues to 150n. If the decision is negative, program flow reverts to step 150b.

At ion a decision is made whether the playback flag has been set, indicating that playback is in progress. If the decision is negative, program flow reverts to 150b. If the decision is positive, program flow continues to 150p, where the playback flag is unset and sound playback is stopped, after which the program flow reverts to 150b.

Thus, methods and means are disclosed that afford a user the capability to easily capture and playback comments made by a member of the audience, even in the presence of substantial background noise.

While the above description contains many specificities, these should not be construed as limitations on the scope of the invention, Many other variations are possible. For example, presentation device 25 or pointing device 20 may be hand held, but may also be carried by the user in a different manner, such as by means of a headset, finger worn ring or the like.

Although the first, second and third embodiments make use of the assumption that the interaction structure 72 and interaction region 71 are quadrangles, this need not be the case even when the corresponding computer screen interaction region 51 is rectangular in shape. For example, projection region 60 may be spherical in shape. This may cause the projection of a square computer screen interaction region 51 to result in interaction region 71 having the general shape of a sphere-segment. Other shapes are also possible, depending on a number of factors such as the angle between the optical axis of projection device 40 and projection region 60. It will be appreciated by those skilled in the art that set P (see FIG. 4, step 90a and FIG. 11, step 120a) and method M (see FIG. 6, step nob) may become more complicated under these circumstances, but may still be well defined. In fact, method M and sets P, A, B may be constructed in any way that is advantageous to the particular system application. It is also possible to determine more points and associated line sets than just CA and CB, and associated line sets A and B. Specifically, set P may have more or fewer than the number of points described with reference to the foregoing embodiments, depending on the complexity of the presentation venue. Also, sets A and B may contain more lines than the minimum number needed to establish the coordinates of the points in set P.

The present invention may make use of mathematical techniques not described explicitly herein but well known to those skilled in the art to aid with various aspects of the present invention, for example in the determination of position and/or orientation of interaction structure 72. The second example of the first embodiment, for example, was described as relying on three lines highlighting corners of the interaction structure 72. It is also possible that a more accurate solution for the position and/or orientation of interaction structure 72 may be obtained when the user is requested to also highlight the fourth corner of the screen. An appropriate minimization routine may then be used to find a solution characterized by, for example, a minimum accumulated distance between the four corners of interaction structure 72 and the closest highlighting line.

Moreover, although set P is described as containing points that are needed to completely define interaction structure 72, other embodiments of the invention may use so-called "control points" for quality control purposes. Such control points may be used to test the validity of the assumptions made concerning, for example, the shape, the position, size and/or orientation of interaction region 71 and, therefore, interaction structure 72, as well as to test the accuracy of the measurements made to establish the 3D features of the various lines. As an example, consider the case in which interaction structure 72 is taken to be a rectangle for which all data needed to uniquely establish its size, orientation and position with respect to the x y z coordinate system has been ascertained by the program elements described with respect to the foregoing embodiments. Moreover, in this example interaction region 71 and, therefore, interaction structure 72, are assumed to substantially coincide with the projection of a rectangular computer screen interaction region 51. Then, the computer may display a suitable screen mark 521a, 521b, . . . at, for example, the center of computer screen interaction region 51, which may be projected by projection device 40 onto projection region 60. It will be appreciated that the process elements described herein may be used to calculate 3D coordinates of this projected point, based on the available data regarding shape, size, orientation and position of interaction structure 72. The user may then be required to highlight the projected point using light-beam projection device 202 and indicate the success of this action to the computer by, for example, activating button 203a. If all measurements and highlighting actions were accurate enough and no false assumptions were made, the 3D coordinates of the projected point should substantially conform to the 3D characteristics of the z'-axis. If the discrepancy is deemed too large the user may be required to repeat part or all of the calibration steps outlined in the present invention.

There may also be more than one method M and sets P, A and B, each of which may be associated with a different interaction structure 72 and interaction region 71. There may be more than one interaction structure 72 and interaction region 71, each of which may, but need not, lie on projection region 60 and each of which may, but need not, be associated by means of projecting screen marks 521a, 521b, . . . , with one or more computer screen interaction regions 51.

Although coordinate sensing device (201 and 301 in FIG. 1.) were in some embodiments described as being able to provide information on the 3D position and 3D orientation of pointing device (20 in FIG. 2) relative to the x y z coordinate system, it should be understood that such information provision requirements may be relaxed under some circumstances. Specifically, in the first embodiment it is only required that the 3D position and 3D orientation of pointing line (21 in FIG. 2) to be known, instead of having complete information on the position of pointing device (20 in FIG. 2) along the pointing line. That is, in some cases pointing device may be moved along pointing line without loss of functionality. In such embodiments the coordinate sensing devices need only provide information on the 3D position and 3D orientation of a line (as opposed to a line-segment) substantially intersecting pointing device. If coordinate sensing devices are able to provide complete 3D information (i.e., 3D position and 3D orientation) of pointing device, as opposed to pointing line, the extra positional information may, for example, be used to implement the capability to zoom in on a region around point-of-aim (210 in FIG. 2); other actions may also be based on the extra positional information. The foregoing capability may be inferred from the description of the third embodiment, in which the coordinate sensing device only is used to provide information on the angle between the pointing line and two other fixed lines, instead of full position and orientation information about a line segment.

Although the first, second and third embodiments describe the application of the invention as a cursor control device, the invention may also be used to facilitate non-cursor-related applications. Such applications may include "virtual writing" on the interaction region 71, target practice and the like. Also, the invention may be used other than for presentations. For example, methods of the invention may be employed to control a cursor on a television screen in order to make selections from menus associated with such things as Digital Satellite Television; other applications may also be anticipated.

Moreover, the features of the present invention that enable the tracking of point-of-aim relative to an interaction region may be enhanced by algorithms that allow the filtering of involuntary, fast and/or small hand-movements (that may be caused, for example, by the activation of buttons). Such algorithms may be used to control a point that moves less erratically than the actual point-of-aim while still being associated with it. Such motion filtering may produce a more steady motion of cursor 501. Such algorithms may also be used when the user is required to highlight calibration points 721a, 721b, . . . . Filter algorithms are well-known in the art.

The present invention also contemplates the inclusion into pointing device 20 or presentation device 25 of sensors capable of detecting motion or acceleration, both linear and angular, in addition to or as part of coordinate sensing device 201. Such sensors may be used to detect unintended motion or acceleration of pointing device 20 or presentation device 25 that may be caused, for example, by trembling of the user's hand. The programs described above with reference to FIGS. 5, 6, 12 and 14 may be enhanced by algorithms that compare the output of such sensors and/or coordinate sensing device to predefined thresholds, so that a change in measured orientation and/or position by coordinate sensing device 201 may be recognized as significant only if such output exceeds these thresholds. Using threshold selection, a change in cursor position may only be affected if inferred to be intentional, avoiding the type of "jitter" associated with the use of regular laser pointers by a user with an unsteady hand.

Figure 18:
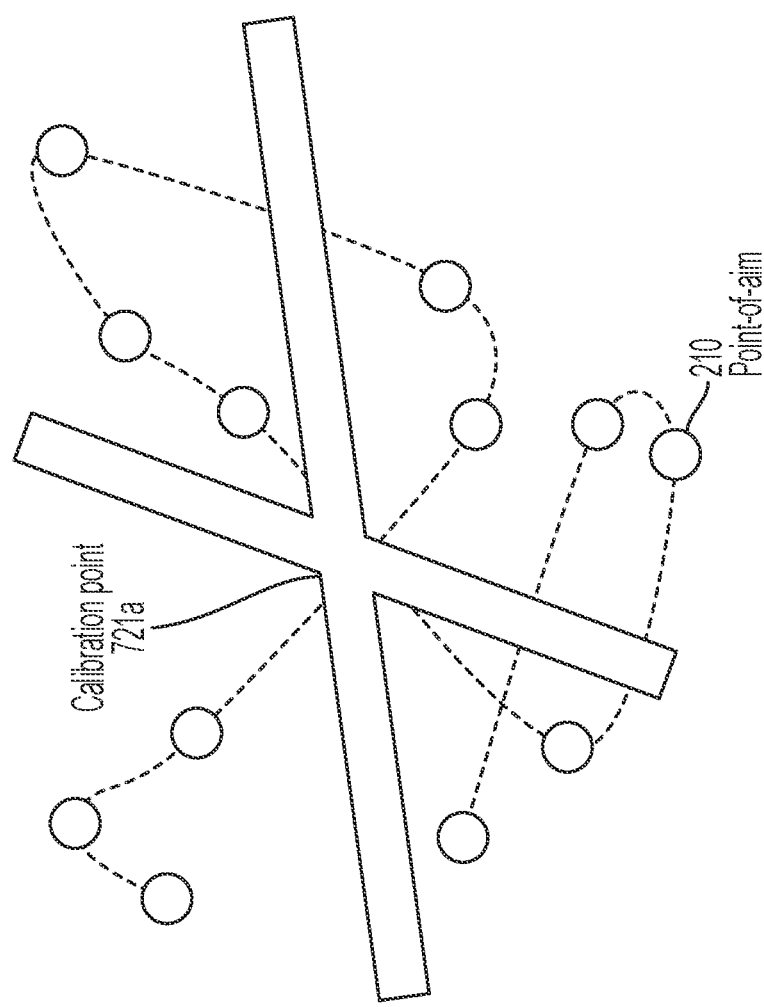
FIG. 18 shows an image of calibration point and light spots at the points-of-aim.

Furthermore, pointing device 20 may be equipped with an image capturing device, such as a digital camera, preferably with zoom and controllable focus capabilities. Other image capturing devices, in combination with appropriate optical devices, may also be used. As stated before, such a digital camera may be used as an embodiment of distance measuring device 206. Referring to FIG. 18, such a digital camera or the like (not shown) may also be used to aid in the process of highlighting the calibration points 721a, 721b. Images of calibration points 721a, 721b, . . . and light spots at point-of-aim 210 may be captured during the time when the user is engaged in the highlighting process. These images may be temporarily stored, together with the position and orientation of the z'-axis at the time the image was acquired. During the highlighting process, it is likely that point-of-aim 210 changes slightly. The resulting sequence of images may then be used to more accurately estimate the orientation and position of the pointing line 21 that connects the origin of the x'y'z' system to calibration point 721a, 721b, . . . . For example, an averaging algorithm may be used. Alternatively, the stored position and orientation of the z'-axis corresponding to the captured image for which the light spot at point-of-aim 210 is closest to the center of calibration point 721a, 721b, . . . may be taken as the position and orientation of the pointing line 21 that connects the origin of the x'y'z' system to calibration point 721a, 721b, . . . .

Some features may also be omitted without affecting the overall applicability of the present invention. For example, level-sensing device (303 in FIG. 1) and visible markings (302 in FIG. 1) may be helpful but are not of critical importance and may be omitted. If level-sensing device 303 are present, the output may also be utilized to correct the orientation of the x y z coordinate system to ensure that its x-y plane is substantially horizontal, as previously explained. In such a case, the visible markings 302 may no longer precisely indicate the position of certain coordinate planes or even the origin of the x y z coordinate system. If the orientation of the uncorrected x-y-plane with respect to a horizontal surface is small enough, though, visible markings 302 may still provide sufficiently reliable information on coordinate planes and origin of the corrected x y z coordinate system.

Furthermore, the programs outlined in FIGS. 3, 4, 5, 6, 11, 12, 14 and 17 may be changed appropriately without loss of functionality, particularly with respect to the order of some of the elements. The programs may also be written in any language that is advantageous to particular the implementation, including without limitation C, Java, and Visual Basic.

Other embodiments that include automatic activation and de-activation of light-beam projection device 202, or include provision for instructing the cursor control routines to show or hide computer cursor 501 are also within the scope of the present invention. For example, automatic activation and de-activation of light-beam projection device 202 may occur depending on whether or not the z'-axis intersects one of the interaction structures 72, or regions of space close to them. This may be performed by instructions to the cursor control routines to show or hide computer cursor 501. Also, means may be provided to activate light-beam projection device 202 manually.

Furthermore, pointing device 20 and presentation device 25 may include a conventional, indirect pointing device such as a trackball or the like, to be used in situations where direct pointing is not possible or not desired. As a practical matter, coordinate sensing device 201, in some embodiments in combination with coordinate sensing device 301, may be used to affect cursor control in an indirect manner if the intended use makes this desirable. To effect cursor control in indirect pointing applications, pointing device 20 or presentation device 25 may include a user input device that enables the user to select whether indirect cursor motion control is desired, or may include sensors and/or algorithms that enable determining when direct pointing actions are not possible. For example, an algorithm or sensor may be included that enables determination of whether pointing device 20 or presentation device 25 is within the operational range of base station 30. The third described embodiment, specifically, may be enhanced with algorithms and/or sensors, such as accelerometers, that enable to determination of whether pointing device 20 or presentation device 25 have been displaced significantly from the position at which the calibration procedure was performed, making direct pointing actions no longer possible without additional calibration steps. As part of the third described embodiment, additional input devices and algorithms may be included that enable the user to mark an orientation in space such that indirect cursor motion control may be effected based on the changes in orientation with respect to this marked orientation, as described in the cited prior art. Other embodiments of a system may also be enhanced by such functionality and input devices.

In addition to the previously described methods to determine size, position and orientation of interaction region 71, other methods are also within the scope of the invention. These include methods based on the use of digital cameras and the like. The position and orientation of such cameras, relative to the x y z coordinate system, may be tracked by using a device such as coordinate sensing device 201 and 301. For example, given sufficient knowledge of the optical characteristics of a digital camera, 3D features of an object may be determined from one or more images taken from one or more positions. Using such images, a complete 3D description of interaction region 71 may be determined.

Another alternative for establishing 3D position, size and orientation of interaction region 71 is provided by a digital camera or the like used in addition to, or as embodiment of, the distance measuring device 206. In such embodiments the direction relative to the x'y'z' coordinate system of the axis along which distance is measured may be controlled and measured by mounting the digital camera and/or distance measuring device 206 in such a way that their orientation relative to the x'y'z' coordinate system may be controlled and measured. Other implementations in which the foregoing components are positionally fixed are also contemplated. For purposes of explanation, the axis along which distance is measured is denoted as the z"-axis, and the z"=0 position is assumed to coincide with the origin of the x'y'z' coordinate system. The orientation of the z"-axis with respect to the x'y'z' coordinate system, and also with respect to the x y z coordinate system may therefore be assumed to be known. In this embodiment, calibration points 721a, 721b, . . . may be displayed simultaneously, as projections of screen marks 521a, 521b, . . . , and may differ in appearance, such that they may be distinguished by image processing software. Alternatively, calibration points 721a, 721b, . . . may appear as projections of screen marks 521a, 521b, . . . in an automatically controlled sequence. The user may then be queried to direct pointing device 20 in the general direction of interaction region 71 in such a way that the digital camera may image the calibration point under consideration. An automated calibration sequence may then be executed, wherein the z"-axis is directed, in sequence, to calibration points 721a, 721b, . . . etc. The image processing software may identify the various calibration points 721a, 721b, . . . and the 3D position of these points may then be determined from knowledge of the orientation of the z"-axis and the coordinates of the z"=0 position with respect to the x y z coordinate system, in addition to the measured point-of-aim-distance 211 between the calibration points 721a, 721b, . . . and the origin of the x'y'z' coordinate system. This embodiment may also provide light-beam projection device 202 mounted in a way that enables control of the direction of the light-beam relative to the x'y'z' coordinate system. This light-beam may be used to aid in positioning the z"-axis. Embodiments where light-beam projection device 202 are fixed or left out entirely are also contemplated.

Figure 21A:
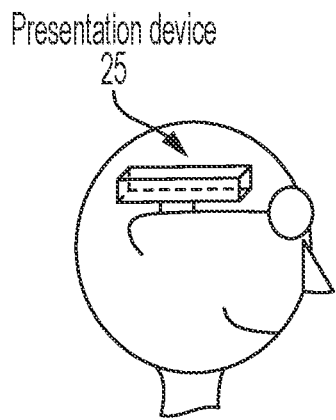
FIG. 21A shows the presentation device carried as a handset.
Figure 21B:
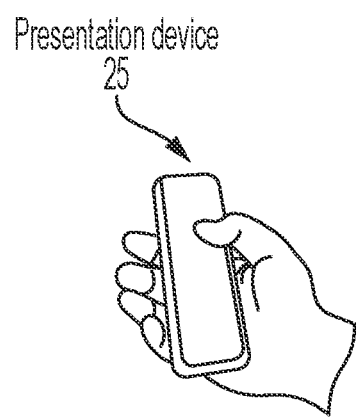
FIG. 21B shows the presentation device being handheld.
Figure 22A:
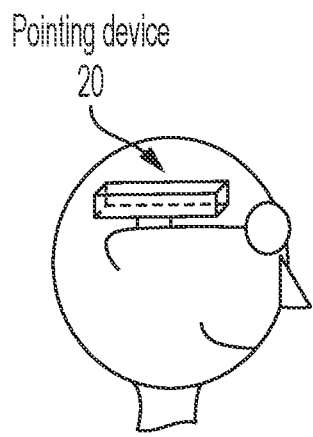
FIG. 22A shows the pointing device carried as a handset.
Figure 22B:
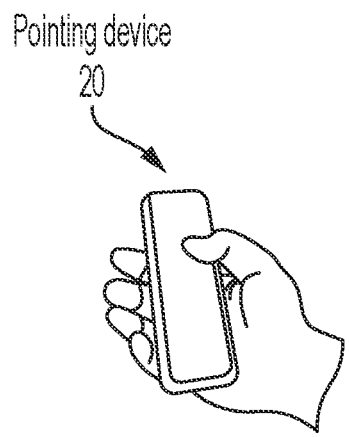
FIG. 22B shows the pointing device being handheld.

FIG. 21A shows the presentation device 25 carried as a headset. FIG. 21B shows the presentation device 25 being handheld. FIG. 22A shows the pointing device 20 carried as a headset. FIG. 22B shows the pointing device 20 being handheld.

The present invention also contemplates situations in which parts of the calibration procedures outlined may be repeated at appropriate times. For example, when the relative position of base station 30 and interaction region 71 changes substantially there may be a need to recalibrate the system. Such may also be the case when the position with respect to interaction region 72 of pointing device 20 or presentation device 25 changes significantly, while operation of a particular embodiment of the invention operated using the assumption that such position remains substantially unchanged. As another example, coordinate sensing device 201 and/or coordinate sensing device 301 may include time-integrated acceleration measuring devices. In such a case accuracy of coordinate sensing may deteriorate over time, because of drift in the base acceleration measurements. When the deterioration has become large enough to be unacceptable to the user, the user may be queried to place pointing device 20 in certain deemed positions with respect to the x y z coordinate system, so as to re-initialize coordinate sensing device 201 and 301.

The present invention also contemplates the use of a plurality of pointing devices 20 and/or presentation devices 25. Each of the plurality of pointing devices 20 or presentation devices 25 may be uniquely identifiable by the computer, for example by carrying a unique ID code inside their respective communication and control device 204. Each of the plurality of pointing or presentation devices may be associated with a specific cursor and/or a specific interaction region 71. For example, a first pointing device may be used to control a corresponding cursor on the left-hand one of two interaction regions 71, and a second pointing device may be used to control a corresponding cursor on the right-hand one of two interaction regions 71. Alternatively, both pointing devices may be used to control a corresponding, identifiable cursor on the same interaction region 71.

Furthermore, the present invention contemplates the use of a plurality of entities such as base station 30, a particular one of which may be associated with the origin of the x y z coordinate system. Such a base station may be designated as the 'master base station'. Each of the base stations may include coordinate sensing device 201, so that their respective position and orientation relative to the master base station can be determined with greater accuracy than that afforded by the coordinate sensing device 201 that is incorporated in pointing device 20. Using such multiple base stations and coordinate sensing devices, 3D data pertaining to pointing device 20 may be determined relative to the closest base station, and the relative position and orientation of that base station with respect to the master base station may be used to establish the 3D data pertaining to pointing device 20 with respect to the x y z coordinate system. Alternatively, signals from multiple base stations, as measured by the coordinate sensing device 201 disposed in pointing device 20, may be used simultaneously to reduce measurement errors. Generally speaking, determining the 3D data pertaining to pointing device 20 with respect to the x y z coordinate system by making use of only one base station 30 may be less accurate than by making use of a plurality of base stations. Hence, the effective range' of operation of pointing device 20 may be enhanced by distributing a plurality of base stations over a large region of space.

Figure 19:
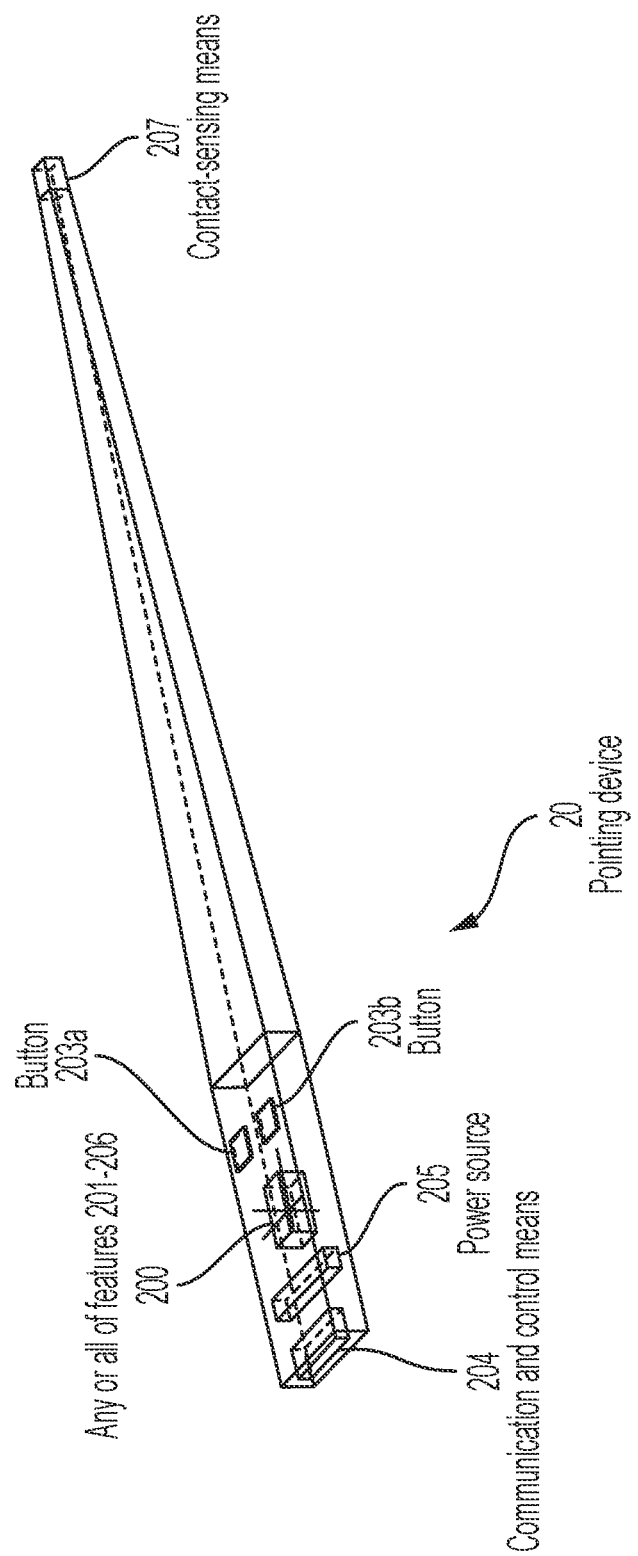
FIG. 19 shows an alternative embodiment of pointing device.

Referring to FIG. 19, in another embodiment, different devices than light-beam projection devices may be used to determine the position of the points in set P. For example, light-beam projection device 202 may be omitted in an embodiment where pointing device 20 has the general shape of an elongated body, such as a pointing stick. The length of this stick may be predetermined or variable. For example, pointing device 20 could be in the shape of an extendable, or telescopic pen such as the INFINITER Laser Baton sold by Bluesky Marketing—Unit 29, Six Harmony Row, Glasgow, G51 3 BA, United Kingdom. The process of highlighting a calibration point 721a 721b, . . . , in this embodiment may be replaced by the action of pointing to the calibration point 721a, 721b, . . . , thereby guided by the elongated shape of pointing device 20 instead of the light spot shown in FIG. 18 at point-of-aim 210. Distance measuring device 206 may also be provided in a related embodiment, similar to the second described embodiment. For example, distance measuring device 206 may include a device to measure the distance from the tip of the elongated body of pointing device 20 to the origin of the x'y'z' coordinate system. In such an embodiment, in order to obtain measurements of point-of-aim distance 211, as described for example at program element 130f (see FIG. 12), the user might be queried to make physical contact between the tip of pointing device 20 and the calibration point. Referring to FIG. 19, pointing device 20 may also comprise contact-sensing device 207, for example at the tip of pointing device 20, capable of indicating physical contact between the tip of pointing device 20 and a surface. Contact-sensing device 207 may be in the form of a pressure-sensor or switch. Such sensors are known in the art.

The present invention also contemplates the use of various other sensors integrated in pointing device 20, presentation device 25 and/or base station 30 to help determine the position and/or orientation of interaction structure 72. For example, pointing device 20, presentation device 25 and/or base station 30 may include ultrasonic emitting and detecting devices to enable measuring substantially the shortest distance between a known point in the x y z coordinate system (e.g., the position of pointing device 20; of presentation device 25 or of base station 30) and the plane in which projection region 60 lies. The user may be queried to align pointing device 20, presentation device 25 or base station 30 such that the distance measuring device is oriented substantially perpendicularly to projection region 60. It should be understood that other types of sensors may be included in pointing device 20, presentation device 25 or base station 30 to help constrain the position and/or orientation of interaction structure 72.

In some cases it may be unnecessary to provide a separately embodied base station 30. For example, coordinate sensing device 201 may partly or completely rely on inertial sensing means such as accelerometers and gyroscopes, or on distance measurements with respect to walls, ceiling and/or floor. In such cases it would be possible to leave out base station 30 entirely and simply choose an appropriate x y z coordinate system. In such embodiments communication and control device 204 could be configured to communicate directly with the computer.

The present invention also contemplates the use of automated procedures to establish the nature of the calibration points 721a, 721b, 721c, 721d, based on the measurements of the orientation and/or position of the pointing lines 21 that substantially pass through them. For example, with reference to FIG. 7, calibration points 721a and 721d need not be explicitly identified to the user as upper-right and lower-left corner respectively, but may merely be identified as diagonally opposite corners. Those skilled in the art will appreciate that in such a case an automated procedure may use the measurements of orientation and/or position of both pointing lines 21, specifically with respect to the x-y-plane, to identify which of the two lines passes through the upper one of the two diagonally opposite corners. The practical consequence to the user is that the user need not be concerned about which of the two calibration points 721a and 721d is highlighted first. Similar arguments can be used to construct automated procedures that determine whether a pointing line 21 substantially passes through a left or a right corner of interaction region 71 (and, by assumption, of interaction structure 72). For example, the a priori assumption may be made that the clock-wise angle between a pointing line 21 through a left corner and a pointing line 21 through a right corner, measured parallel to the x-y-plane, should not exceed 180 degrees, as will be appreciated by those skilled in the art.

Finally, although the methods disclosed by the present invention are described in 3D, the invention may also be applied in 2D scenarios.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer-readable medium or media storing computer-executable instructions to direct a computer to perform a method for determining three dimensional features of an object in conjunction with a first enclosure, the first enclosure configured to be worn as a headset by a user and comprising:
    a first accelerometer to provide a first output,
    a gyroscope to provide a second output, and
    a digital camera to provide digital images,
    the method comprising:
    determining the three dimensional features of the object based at least in part on the first output and the second output and two digital images provided by the digital camera, wherein
    the two digital images are a first digital image and a second digital image,
    the first digital image provided by the digital camera when the digital camera is at a first position,
    the second digital image provided by the digital camera when the digital camera is at a second position that is different from the first position;
    the object has a fixed position relative to a second enclosure that contains a second accelerometer that provides a third output;
    determining the three dimensional futures of the object includes determining parameters that are substantially indicative of the three dimensional orientation of the object; and
    the method further calculating positional coordinates of a feature on an image generated by the computer and further comprising;
    using the parameters, the first output, the second output, the third output, the first digital image and the second digital image to calculate the positional coordinates of the feature on the image.

2. The non-transitory computer-readable medium or media according to claim 1, wherein
    the image generated by the computer is displayed on a flat surface that has a fixed orientation relative to the second enclosure,
    the displayed image is rectangular,
    the object is a part of the surface where a calibration point is displayed,
    there is provided a line with a fixed relation to the first enclosure,
    the positional coordinates of the feature correspond to the center of the displayed image when the line passes through said center, and
    the positional coordinates of the feature correspond to the lower-left corner of the displayed image when the line passes through the lower-left corner of a rectangle that has the same center as the displayed image and that is two times larger than the displayed image.

3. The non-transitory computer-readable medium or media according to claim 1, wherein
    the object is a wall, and
    determining three dimensional features of the object is determining the distance in three dimensions between the first enclosure and the object.

4. A non-transitory computer-readable medium or media storing computer-executable instructions to direct a computer to perform a method for determining three dimensional features of an object in conjunction with a first enclosure, the first enclosure configured to be worn as a headset by a user and comprising:
    a digital camera to provide digital images,
    a first accelerometer to provide a first output, and
    a gyroscope to provide a second output,
    the method comprising:
    determining the three dimensional features of the object based at least in part on the first output and the second output and two digital images provided by the digital camera, wherein
    the two digital images are a first digital image and a second digital image,
    the first digital image provided by the digital camera when the digital camera has a first orientation,
    the second digital image provided by the digital camera when the digital camera has a second orientation that is different from the first orientation,
    the object has a fixed position relative to a human pointing finger,
    determining the three dimensional features of the object includes estimating parameters that are indicative of the three dimensional position of the object; and
    the method further calculating positional coordinates of a feature on an image generated and displayed by the computer and further comprising:
    using parameters, the first output, the second output, the first digital image and the second digital image to calculate the positional coordinates of the feature on the image, and
    causing the computer to display the feature on the image.

5. A non-transitory computer-readable medium or media storing computer-executable instructions to direct a computer to perform a method for determining three dimensional features of an object in conjunction with a first enclosure, the first enclosure configured to be worn as a headset by a user and comprising:
    a digital camera to provide digital images,
    a first accelerometer to provide a first output, and
    a gyroscope to provide a second output,
    the method comprising:
    determining the three dimensional features of the object based at least in part on the first output and the second output and two digital images provided by the digital camera,
    wherein
    the two digital images are a first digital image and a second digital image,
    the first digital image provided by the digital camera when the digital camera has a first orientation,
    the second digital image provided by the digital camera when the digital camera has a second orientation that is different from the first orientation, determining three dimensional features of the object includes determining parameters that are substantially indicative of the orientation of the object, the method further calculating positional coordinates of a feature that are sensitive to changes in orientation of the first enclosure, the positional coordinates being relative to an image generated by the computer, and using the parameters, the first output, the second output, the first digital image and the second digital image to calculate the positional coordinates of the feature on the image.

6. A non-transitory computer-readable medium or media storing computer-executable instructions for directing a computer to perform a method for calculating positional coordinates of a feature on an image in conjunction with an orientation sensing device and a digital camera for providing digital images, wherein the computer is for generating the image and for displaying the image on a surface, the positional coordinates are sensitive to orientation of the surface, the orientation sensing device has at least one of a fixed position relative to the surface and a fixed orientation relative to the surface and for providing an output, and the method comprises the steps of:

using an output from the orientation sensing device and an output from the digital camera to calculate the positional coordinates of the feature; and causing the computer to display the image on the surface.

7. The non-transitory computer-readable medium or media according to claim 6, wherein the orientation sensing device comprises an accelerometer for providing a first output, an enclosure that is designed to be wielded by a user in mid-air contains the digital camera, the output from the orientation sensing device is based at least in part on the first output, and the method further comprises the step of:

using at least one digital image provided by the digital camera to calculate the positional coordinates of the feature.

8. The non-transitory computer-readable medium or media according to claim 7, wherein the orientation sensing device comprises:

a gyro for providing a second output and a magnetometer for providing a third output, and the output from the orientation sensing device is based at least in part on the second output and the third output.

9. The non-transitory computer-readable medium or media according to claim 8, wherein the enclosure is designed to be worn as a headset and contains the orientation sensing device, the orientation sensing device has a fixed position relative to the surface, the digital camera is for providing a first digital image when the digital camera has a first orientation and a second digital image when the digital camera has a second orientation that is different from the first orientation, and the method further comprises the step of:

using the first and the second digital image to calculate the positional coordinates of the feature.

10. The non-transitory computer-readable medium or media according to claim 8, wherein the enclosure is designed to be handheld and contains the orientation sensing device, the orientation sensing device has a fixed position relative to the surface, the digital camera is for providing a first digital image when the digital camera has a first orientation and a second digital image when the digital camera has a second orientation that is different from the first orientation, and the method further comprises the step of:

using the first and the second digital image to calculate the positional coordinates of the feature.

11. The non-transitory computer-readable medium or media according to claim 7, wherein the enclosure is designed to be handheld by the user and contains the orientation sensing device, the enclosure has a fixed position relative to the surface, the digital camera is for providing a first digital image when the digital camera has a first orientation and a second digital image when the digital camera has a second orientation that is different from the first orientation, and the method further comprises the step of:

using the first and the second digital image to calculate the positional coordinates of the feature.

12. The non-transitory computer-readable medium or media according to claim 7, wherein the enclosure is designed to be worn as a headset by the user and contains the orientation sensing device, the digital camera is for providing a first digital image when the digital camera has a first orientation and a second digital image when the digital camera has a second orientation that is different from the first orientation, and the method further comprises the step of:

using the first and the second digital image to calculate the positional coordinates of the feature.

13. A non-transitory computer-readable medium or media storing computer-executable instructions for directing a computer to perform a method for determining three dimensional coordinates of a point using a first orientation sensing device and a light source, the first orientation sensing device for sensing orientation of a first line that is fixed relative to the first orientation sensing device and for providing an output, the light source for emitting light along a second line that has a fixed non-zero angle with the first line, and the method comprising the steps of:

receiving a first output from the first orientation sensing device; and using the first output and light from the light source to determine the coordinates of the point.

14. The non-transitory computer-readable medium or media according to claim 13, wherein the light from the light source substantially coincides with the second line.

15. The non-transitory computer-readable medium or media according to claim 14, wherein an enclosure that is designed to be wielded in mid-air by a user contains the light source, the first orientation sensing device, and an image capturing device for providing digital images, and the method further comprises the step of:

using an output of the image capturing device to determine the coordinates of the point.

16. The non-transitory computer-readable medium or media according to claim 15, wherein the output of the image capturing device comprises a first and a second digital image;

the first digital image containing a first image of a first light-spot generated by the light source, the second digital image containing a second image of a second light-spot generated by the light source, the first digital image being different from the second digital image;

the method is further for changing the position of a feature on an image generated by the computer, the position being sensitive to orientation of the enclosure; and the method further comprises the steps of:

using the first and the second digital images to determine the coordinates of the point, and using the first output to change the position of the feature.

17. The non-transitory computer-readable medium or media according to claim 13, wherein an enclosure that is designed to be worn as a headset by a user contains the light source, the first orientation sensing and an image capturing device, and the method further comprises the step of:

using an output of the image capturing device to determine the coordinates of the point.

18. The non-transitory computer-readable medium or media according to claim 13, wherein the light source is an LED, a base station that is fixed relative to the first line and relative to a surface containing the point contains the first orientation sensing device, the computer is for displaying a rectangular image on the surface, the method further uses a handheld pointing device that contains a second orientation sensing device, and the method is for changing the position of a feature on the image and further comprises the steps of:

receiving a second output from the second orientation sensing device, the second output being indicative of orientation of a third line that is fixed relative to the second orientation sensing device;

using the second output to change the position of the feature in such a way that the feature appears in the top-left corner of the image when the third line passes through the top-left corner of a rectangle that has the same center and is two times as large as the rectangular image.

* * * * *